United States Patent [19]

Balcom et al.

[11] Patent Number: 4,799,039
[45] Date of Patent: Jan. 17, 1989

[54] EMERGENCY LIGHTING SUPERVISORY SYSTEM

[75] Inventors: James E. Balcom, Newtown, Conn.; Edward P. Kozek, Beaconsfield, Canada; Arnold N. Alderman, San Jose, Calif.

[73] Assignee: Dual-Lite Manufacturing, Naguabo, P.R.

[21] Appl. No.: 48,530

[22] Filed: May 8, 1987

Related U.S. Application Data

[63] Continuation of Ser. No. 696,262, Jan. 30, 1985, abandoned.

[51] Int. Cl.⁴ .................................................. G08B 29/00
[52] U.S. Cl. ........................................ 340/333; 340/516; 340/636; 320/48
[58] Field of Search ............... 340/333, 515, 516, 506, 340/635, 636, 825.06; 307/66; 320/22, 48

[56] References Cited

U.S. PATENT DOCUMENTS

| | | | |
|---|---|---|---|
| 2,947,980 | 8/1960 | Lemm et al. | 340/506 X |
| 3,600,661 | 8/1971 | Briggs | 320/48 X |
| 3,659,181 | 4/1972 | Bembenek | 320/22 |
| 3,983,554 | 9/1976 | Goode | 340/508 X |
| 4,061,956 | 12/1977 | Brown et al. | 320/23 X |
| 4,088,986 | 5/1978 | Boucher | 340/516 X |
| 4,125,802 | 11/1978 | Godard | 320/22 X |
| 4,199,754 | 4/1980 | Johnson et al. | 340/333 X |
| 4,388,584 | 6/1983 | Dahl et al. | 320/48 |
| 4,388,615 | 6/1983 | Ford et al. | 307/66 X |
| 4,435,675 | 3/1984 | Adams | 320/22 |
| 4,450,401 | 5/1984 | Lambert et al. | 320/22 |
| 4,544,910 | 10/1985 | Hoberman | 320/48 X |
| 4,577,317 | 3/1986 | Chu et al. | 370/89 X |
| 4,581,604 | 4/1986 | Kimura et al. | 340/825.06 |
| 4,607,246 | 8/1986 | Wada et al. | 340/636 X |

FOREIGN PATENT DOCUMENTS

| | | |
|---|---|---|
| 3224671 | 1/1983 | Fed. Rep. of Germany . |
| 2540305 | 10/1984 | France . |
| 1577603 | 10/1980 | United Kingdom ................ 455/606 |
| 2059196 | 4/1981 | United Kingdom . |
| 2097610 | 11/1982 | United Kingdom . |
| 2101426 | 1/1983 | United Kingdom . |
| 2130735 | 6/1984 | United Kingdom . |

OTHER PUBLICATIONS

"Mawdsley's Autotest", Mawdsley's Ltd., Publ. No. 4.47.05-601 (1981).
"Superglow Automatic Testing Circuit", Bradley and Lomas, (1981).
"Systems Options and Accessories", Dual-Lite Inc., (1984).

Primary Examiner—Joseph A. Orsino
Assistant Examiner—Brian R. Tumm
Attorney, Agent, or Firm—Mattern, Ware, Stoltz & Fressola

[57] ABSTRACT

An emergency lighting supervisory system monitors utility power so as to automatically connect emergency lights to a battery source when utility power fails. The system continuously monitors selected parameters and, automatically, periodically tests the system under simulated full-load emergency conditions and annunciates the results of these tests. Such periodic tests also enhance battery capacity. The system also provides a closed loop three-mode battery charging control circuit. It can optionally communicate its status as well as receive commands from an external computer or other source by means of a data communication interface.

70 Claims, 64 Drawing Sheets

| CHARGER MODE | DESCRIPTION |
|---|---|
| I | CONSTANT CURRENT |
| II | EQUALIZE |
| III | FLOAT |

BATTERY CHARGING PROFILE

FIG. 3A
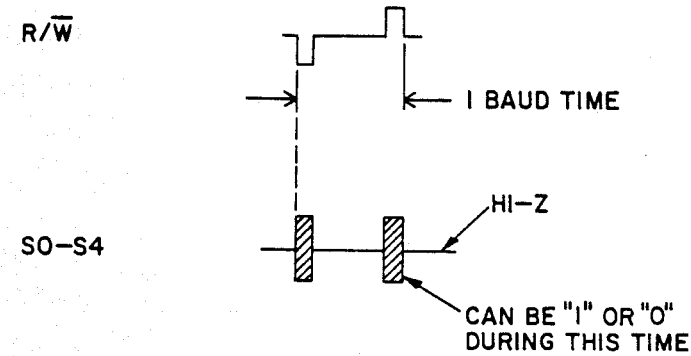
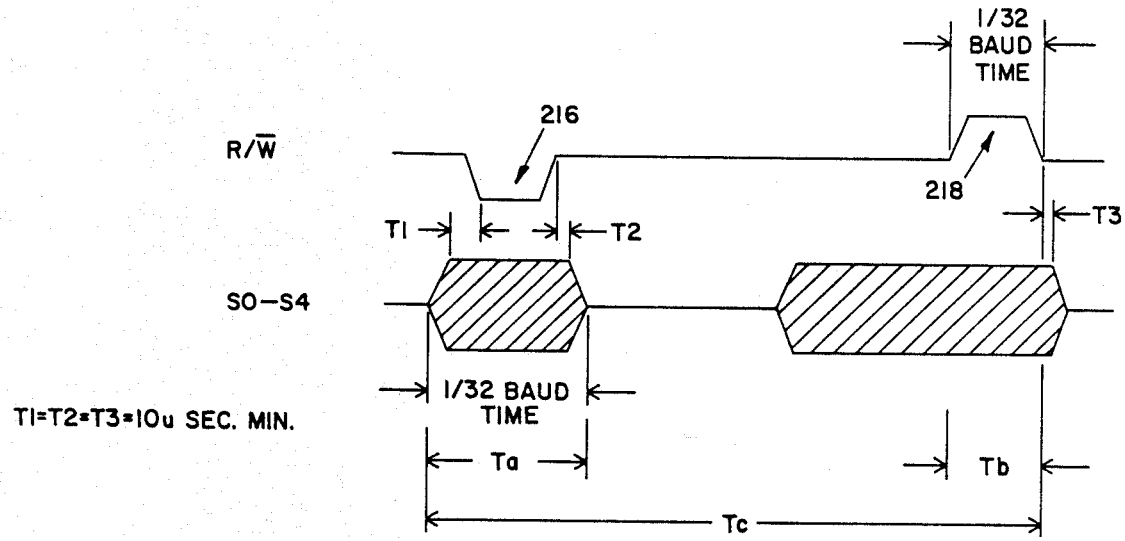
Ta = WRITE INTERVAL-DATA TRANSFER FROM COMMUNICATION CHIP TO SUPERVISORY CIRCUIT.
Tb = READ INTERVAL-DATA TRANSFER FROM SUPERVISORY CIRCUIT TO COMMUNICATION CIRCUIT.
Tc = TOTAL DATA TRANSFER INTERVAL
PARALLEL DATA TRANSFER WAVEFORMS
FIG. 3B

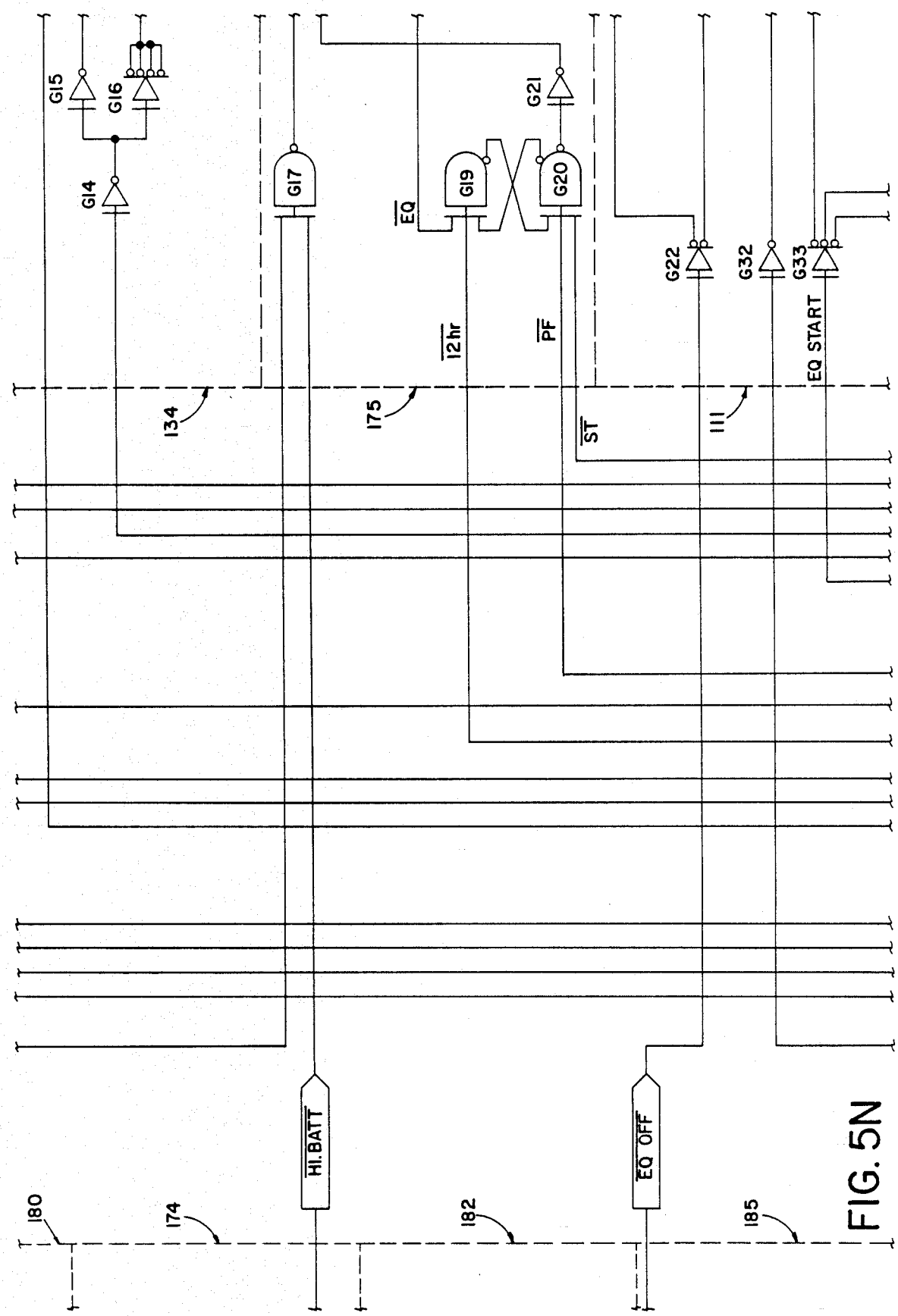

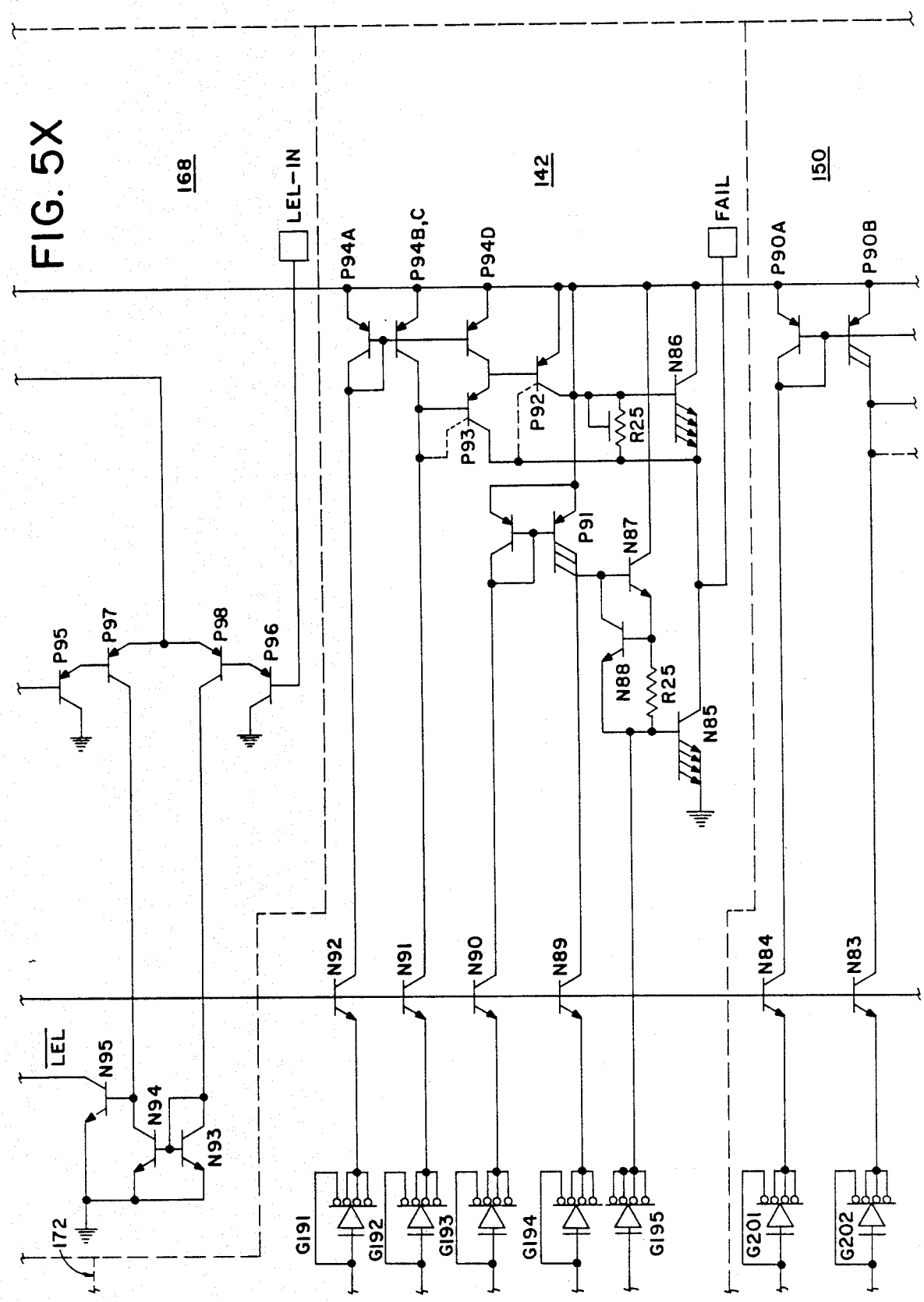

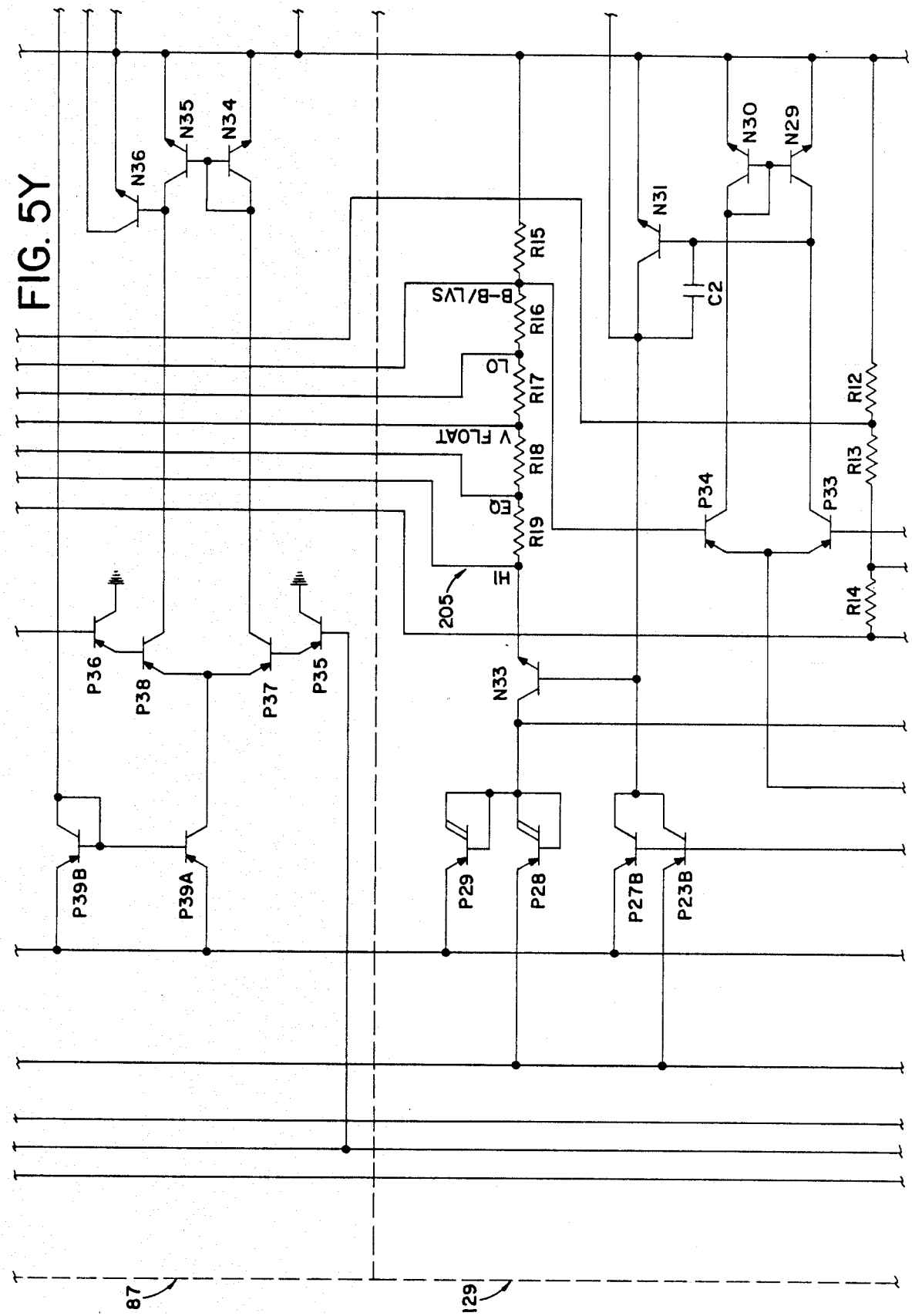

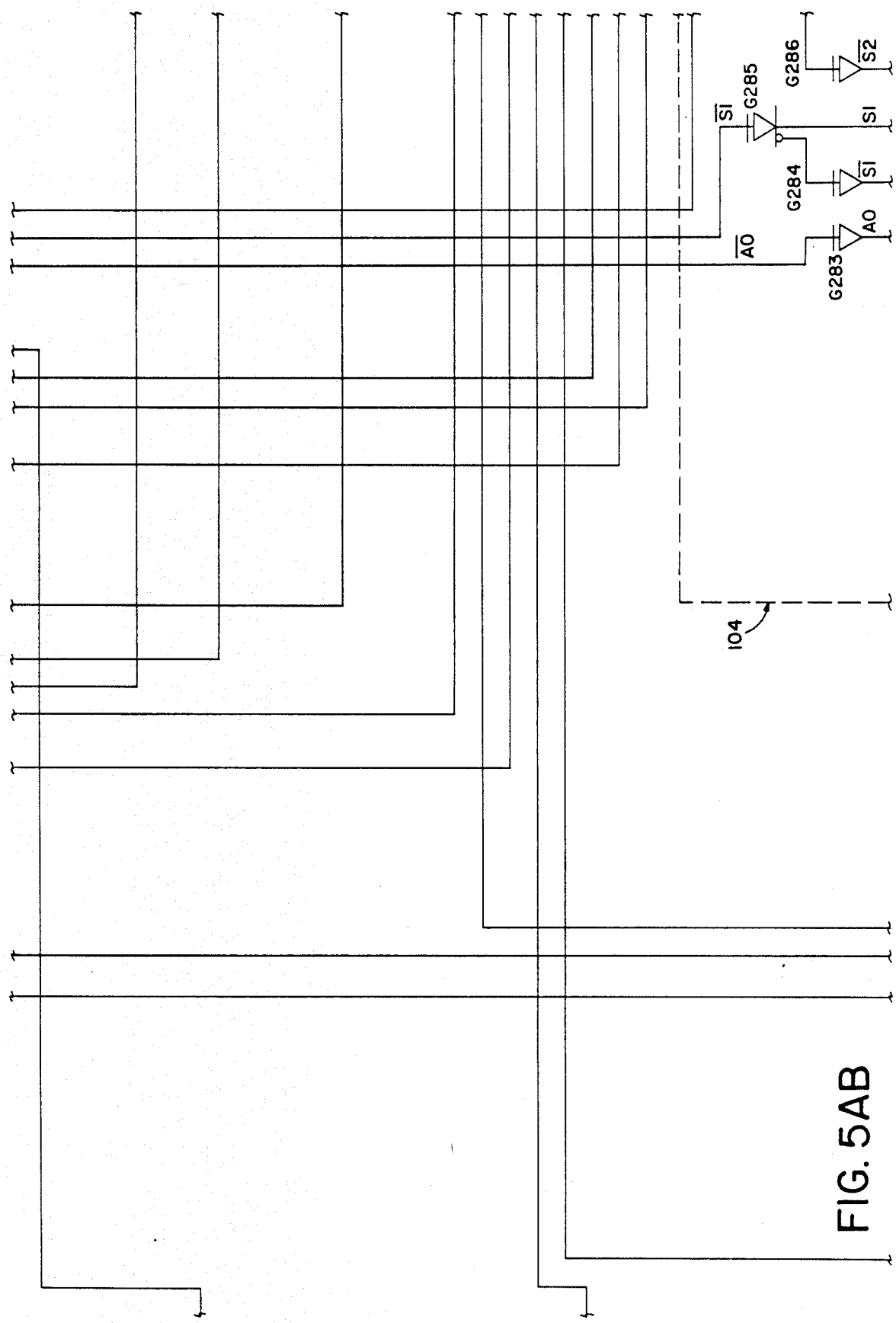

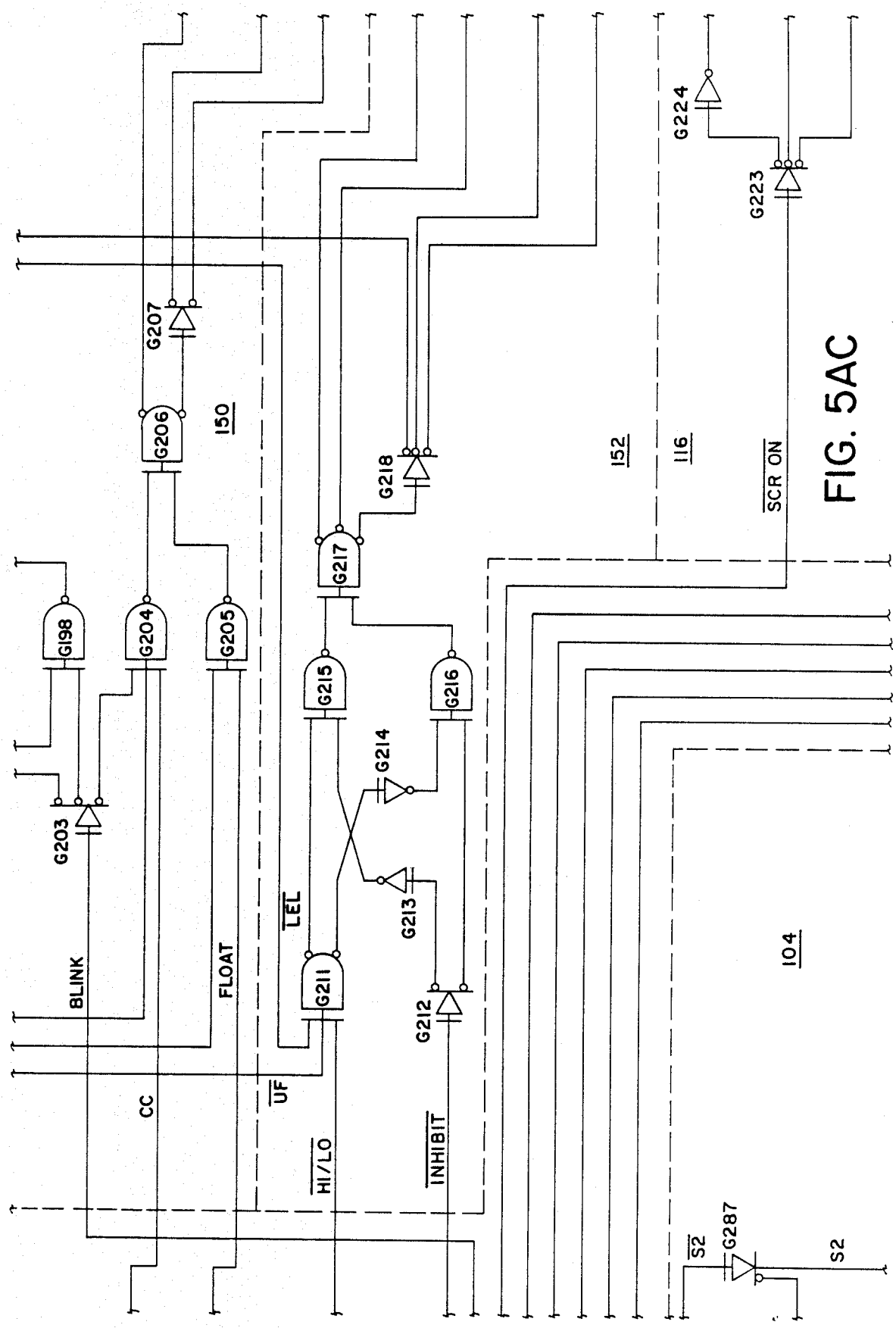

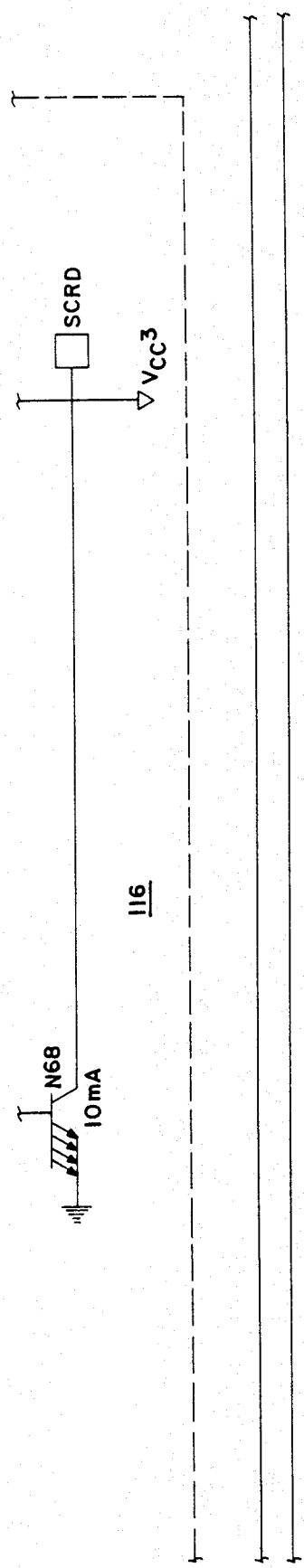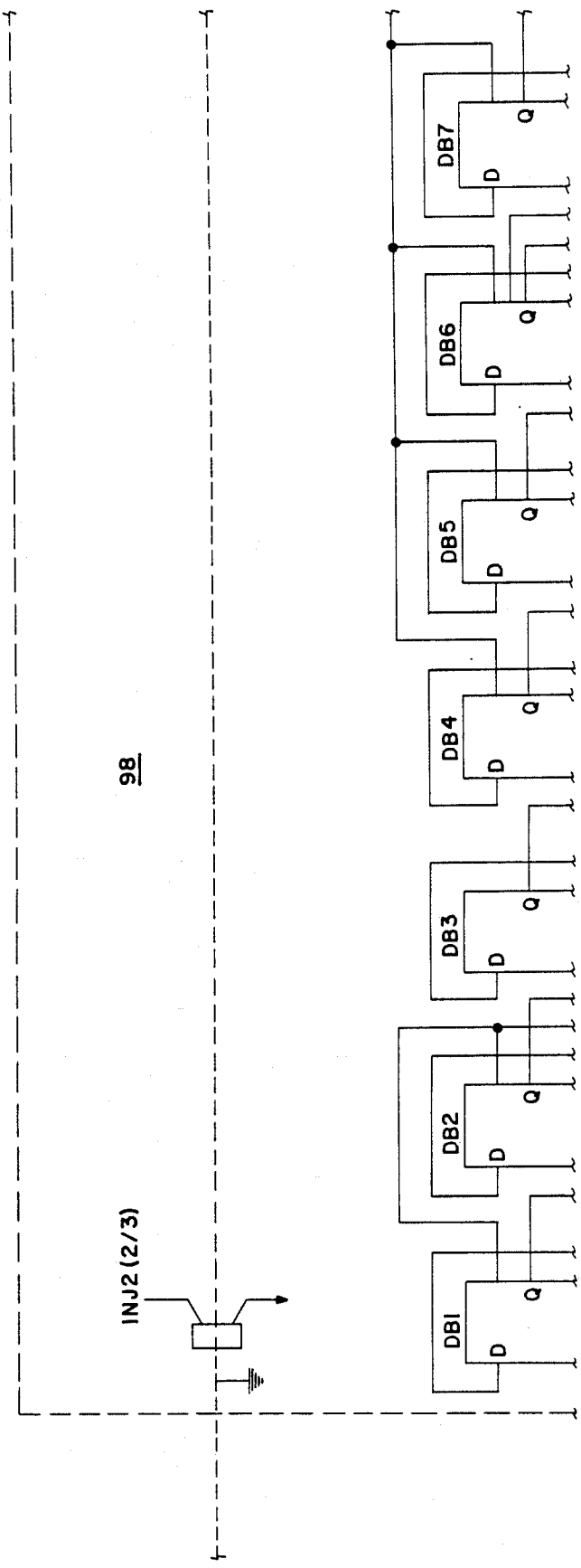
FIG. 5AJ

| FIG. 5A | FIG. 5B | FIG. 5C | FIG. 5D | FIG. 5E |
| --- | --- | --- | --- | --- |
| FIG. 5G | FIG. 5H | FIG. 5I | FIG. 5J | FIG. 5K |
| FIG. 5M | FIG. 5N | FIG. 5O | FIG. 5P | FIG. 5Q |
| FIG. 5S | FIG. 5T | FIG. 5U | FIG. 5V | FIG. 5W |
| FIG. 5Y | FIG. 5Z | FIG. 5AA | FIG. 5AB | FIG. 5AC |
| FIG. 5AE | FIG. 5AF | FIG. 5AG | FIG. 5AH | FIG. 5AI |
| FIG. 5AL | FIG. 5AM | FIG. 5AN | FIG. 5AO | FIG. 5AP |
| FIG. 5AS | FIG. 5AT | FIG. 5AU | FIG. 5AV | FIG. 5AW |

FIG. 5AX

| FIG. 5AX | FIG. 5AY |

FIG. 5AZ

| FIG. 5F | FIG. 5L | FIG. 5R | FIG. 5X | FIG. 5AD | FIG. 5AJ | FIG. 5AK |
|---------|---------|---------|---------|----------|----------|----------|
|         |         |         |         |          | FIG. 5AQ | FIG. 5AR |

FIG. 5AY

EMERGENCY LIGHTING SUPERVISORY SYSTEM

CROSS-REFERENCE TO RELATED APPLICATION

The present application is a continuation application of U.S. Ser. No. 696,262 filed Jan. 30, 1985, now abandoned.

FIELD OF THE INVENTION

The present invention relates to emergency lighting systems, including emergency lighted exit signs. In particular, the system is directed to such emergency lighting systems which further provide self-diagnostic testing and display of their operational state.

BACKGROUND ART

Although emergency lighting systems are well known in the art, including those manufactured by the present assignee, few systems provide self-diagnostic testing of the emergency lighting system other than with the use of a manually initiated testing procedure. Such procedures typically use a test button which momentarily tests some function or functions of the system, such as lamp condition, battery charge condition, etc. It has ben found that manually tested emergency lighting systems often are not periodically tested and, therefore, a defective system may be present whose condition is unknown until an actual emergency condition arises, at which time it fails to operate. Such failure, of course, can be catastrophic and it is the intent of the present invention to provide a simple, yet effective self-diagnostic emergency lighting supervisory system for periodically testing all major components and sub-sections of fhe system to insure their proper operation and to notify responsible personnel of a faulty condition and the nature of that condition so that proper and rapid replacement or repair is achieved. The periodic testing is performed under full lamp load for set periods of time. Such full-load exercising of the battery further insures optimal battery capacity.

Although some prior art devices employ some form of self-diagnostic procedure, they do not provide the comprehensive supervisory testing capabilities of the present invention, nor the ability to communicate such information to a remote location as is disclosed and claimed herein.

More particularly, an Electronic Scanning Process emergency directional sign is manufactured by the Kurt Versen Company, 10 Charles Street, P.O. Box 677, Westwood, N.J. 07675, USA, which includes some periodic testing and self-diagnostic capabilities. According to literature distributed by the Kurt Versen Co., this system on a daily basis scans the compoonents of the system including batteries, lamps and charger to determine their operational state and, if a failure occurs in any of these elements, an external AC powered light is energized and flashes so as to inform maintenance personnel of the problem. In addition to this AC powered lamp, a green light emitting diode (LED) on the charger circuitry is lit when the charger is working and is extinguished if the charger is in need of service. The daily testing of the components of the system appears to be for a relatively brief period of time which is sufficiently long to determine whether the charger, batteries and lamps are operational.

The present invention provides for a monthly five-minute test of the various components in a self-test regime as well as a user programmable 30-, 60-, 90- or 120-minute self-test once every six months. These longer time duration testing procedures not only determine if the battery has sufficient power to illuminate the lamps for a periodd of time, but also determine whether the batteries have sufficient storage capacity to maintain illumination for periods of time which are required by relevant national and state codes. These five minute and longer discharges of the battery also provide the salutory effect of maintaining charge capacity due to the inherent characteristics of the batteries used in emergency lighting equipment which require periodic discharge in order to maintain maximum charge capacity. In addition, the present invention not only determines the state of the various system parameters, but also annunciates this information visually. It can also communicate this information to an external computer or data acquisition device which can monitor many emergency lighting systems installed throughout one or more buildings. Thus, an overall self-diagnostic testing capability is provided which is not disclosed or suggested by the prior art including the above mentioned Kurt Versen Model ESP Series Electronic Emergency Directional Signs.

Furthermore, the present invention includes other features which distinguish it from the prior art. Such features include an enhanced charging circuit with an adjustable float voltage which is temperature compensated and includes a three-step battery charger with an automatic time period for providing a battery equalization voltage. This type of battery charging enhances battery capability and reliability.

The present invention also includes full-time, on-line monitoring of both high and low battery voltage conditions and actual lamp current monitoring during self-test operation. The latter test procedure is unlike prior art systems including the above mentioned ESP system which only tests for open condition of a lamp but cannot monitor lamp failures for a loss of as little as 20–25% of the load current. The present invention can therefore determine the failure of a single lamp out of a multi-lamp system.

The present system also includes circuitry for maintaining the failure condition even if AC power is removed as well as specific annunciation of the particular problem. It further provides AC brown-out sensing and transfer to emergency power when such a condition is sensed.

Thus, the present system not only continuously senses critical system parameters, but also performs periodic self-testing of all major system components.

DISCLOSURE OF THE INVENTION

An emergency lighting supervisory system is disclosed which provides four main functions: (1) monitors utility power and automatically transfers emergency power to lamps when the utility power fails or is reduced below a "brown-out" level; (2) performs self-diagnostic testing of the system parameters, including periodic full-load testing of the battery, emergency lamps and electronic control circuitry so as to determine their operating status; (3) employs a three-mode battery charger through use of a closed loop control circuit which provides constant current, equalization and float voltage charging of the emergency power battery; and (4) includes a communication interface so as to receive commands from an external source for self-testing the system and to transfer status information to that source upon request.

The emergency lighting supervisory circuit includes a power supply for providing the required voltages for operation of other sections of the circuitry, a battery charger for providing the three-mode battery charging profile, an emergency transfer circuit for energizing emergency lamps upon sensing an AC power failure, an AC brown-out condition or a self-test condition; a status monitoring circuit for continuously monitoring the charge status of the battery, the electrolyte level within the battery and the current state of the charger; self-test circuitry for periodically testing the emergency lighting system while under full-load, and communication interfacing circuitry for receipt of commands from an external source and for reporting the status of the various sensed conditions of the system to the external source.

OBJECTS OF THE INVENTION

Therefore, it is a principal object of the present invention to provide an emergency lighting supervisory system which periodically operates the system under full-load while testing the operating conditions of the system to determine its operational state and to annunciate the sensed conditions of the system, including the specific nature of any faulty condition.

It is a further object of the present invention to provide an emergency lighting supervisory circuit of the above description, further including a communication interface so as to transfer status information concerning the system to an interconnected remote device as well as to receive commands from such an interconnected remote device for commencing full-load testing of the system.

Another object of the present invention is to provide an emergency lighting supervisory system of the above description which includes a three-stage charging circuit that provides constant current charging during initial charging of a battery, maintaining a constant voltage at an equalization voltage for a set period of time following constant current charging, wherein the equalization voltage is at a value greater than the normal float voltage to the battery and, at other times, maintaining a constant float voltage to the battery.

A further object of the present invention is to provide an emergency lighting supervisory system incorporating a battery charger with negative temperature voltage compensation so that the optimal float voltage is applied to the battery for any given ambient temperature.

A still further object of the present invention is to provide an emergency lighting supervisory system which incorporates status monitoring which constantly determines the charge status of the battery, the electrolyte level within the battery as well as the state of the battery charger, and annunciates this information as well as reports such information via the communication interface when instructed to do so by a remote source.

Another object of the present invention is to provide an emergency lighting system of the above description that incorporates a low voltage disconnect module that disconnects the battery from the emergency lamp(s) and other selected circuitry while maintaining energization of the portions of the circuitry necessary to maintain annunciation of the sensed system parameters while preventing deep discharge of the battery.

An additional object of the present invention is to provide an emergency lighting system of the above description which maintains emergency battery power for approximately fifteen minutes after utility power is restored and thereby allows sufficient time for high intensity discharge lamps to return to full brightness before the emergency lamp(s) are extinguished.

Other objects of the present invention will, in part, be obvious and will, in part, appear hereinafter.

BRIEF DESCRIPTION OF THE DRAWINGS

For a full understanding of the nature and objects of the present invention, reference should be made to the following detailed description taken in conjunction with the following drawings wherein;

FIG. 3A illustrates waveforms associated with the communication circuitry for both the read/write line and the parallel data lines as a function of time for both receipt and transmission of messages.

FIG. 3B is an enlarged view of the voltage waveforms for writing and reading data over the data lines.

FIGS. 4A–4F are put together.

FIGS. 5AX and 5AY as put together in FIG. 5AZ form a diagram showing how FIGS. 5A–5AW are put together.

BEST MODE FOR CARRYING OUT THE INVENTION

Figure 1:
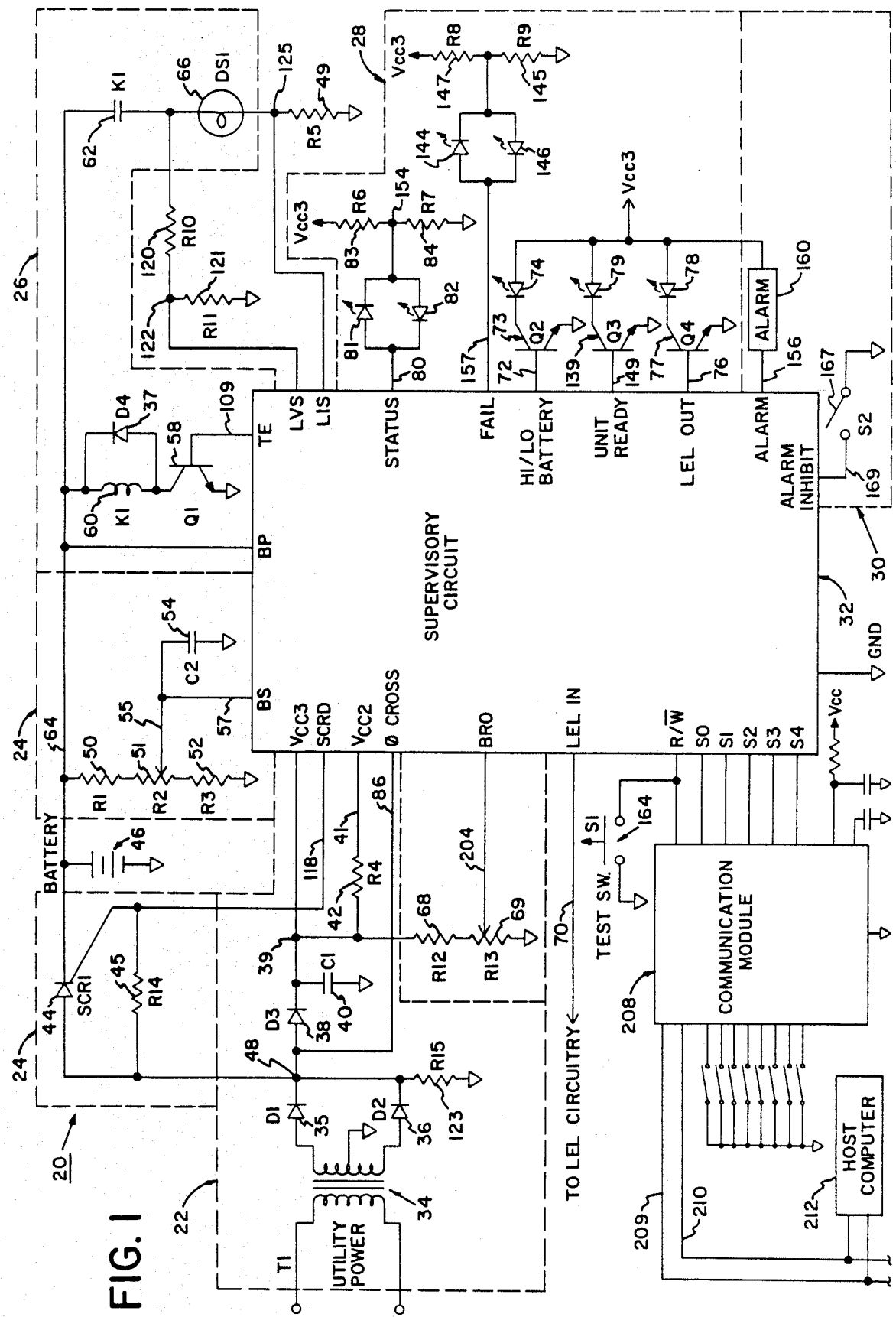
FIG. 1 is an overall block diagram of the emergency lighting supervisory circuit showing its interconnection to a source of utility AC power as well as its interconnection to an associated communication circuit. This figure also shows the indicator lights used to visually annunciate the various conditions monitored by the system as well as the lamp or lamps which are energized by the system both during emergency operation and during self-testing procedures.
Figure 1A:
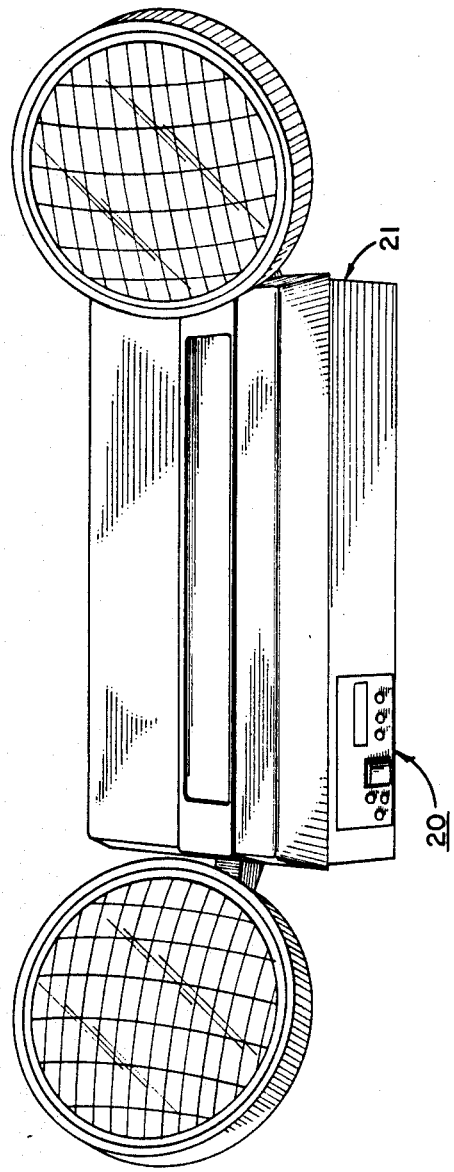
FIG. 1A is a perspective view of a typical emergency lighting unit employing an emergency lighting supervisory system according to the present invention. This figure also shows a typical display panel used with the system.
Figure 1B:
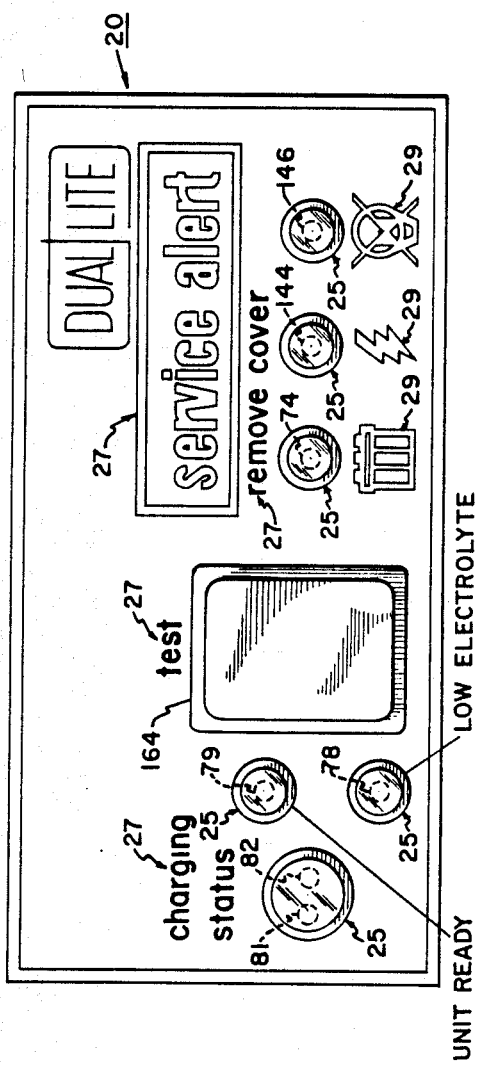
FIG. 1B is an enlarged view of the typical display panel shown in FIG. 1A.

As best seen in FIG. 1, an emergency lighting supervisory system 20 comprises a power supply module 22, a battery charger module 24, an emergency transfer module 26, output indicator modules 28, an alarm module 30 as well as an overall supervisory integrated circuit (IC) 32 which interconnects with these modules to perform the overall operation of the emergency lighting supervisory circuit. This supervisory system is typically mounted within an emergency lighting or exit sign fixture, such as the emergency lighting fixture 21 shown in FIG. 1A. As shown in FIGS. 1A and 1B, the supervisory system has a front panel 23 which typically includes a test switch 164, indicator light domes 25, printed indicia 27 and symbols 29 identifying the switch and indicator light domes. Other configurations of the front panel can, of course, be used if desired.

Referring again to FIG. 1, the power supply module 22 comprises a center tap transformer 34 and diodes 35 and 36 which full-wave rectify the secondary output of the transformer. Also part of the power supply module is diode 38 and filter capacitor 40 which provide a full-wave rectified and filtered output 39 (called $V_{cc3}$) and a reduced voltage output 41 (called $V_{cc2}$) via resistor 42. These two voltages are used by supervisory integrated circuit 32 for its necessary power as well as to provide power to the output indicator modules 28.

The component values and types for the components shown in FIG. 1 are presented in Table 1. The typical voltage values for the identified voltages and outputs are presented in Table 2. Table 1A presents detailed information with respect to the characteristics of transformer 34.

TABLE 1

Typical Values of Components Shown in FIG. 1 for a Nominal 6 VDC Battery Circuit at 77° F.

| Reference No. | Description |
| --- | --- |
| 58, 72, 76, 139 (Q1, 2, 3, 4) | MPS2222 transistor |
| 44 (SCR1) | Selected C106 SCR |
| 35, 36, 37, 38 (D1, 2, 3, 4) | IN4002 diode |
| 40 (C1) | 1000 ufd, 25 V capacitor |
| 54 (C2) | 4.7 ufd, 25 V capacitor |
| 50 (R1) | 75K ohm, ¼ W resistor |
| 51 (R2) | 10K ohm potentiometer |
| 52 (R3) | 12K ohm, ¼ W resistor |
| 42 (R4) | 1.5K ohm, ¼ W resistor |
| 49 (R5) | Shunt resistor - load dependent |
| 83, 147 (R6, 8) | 390 ohm, ¼ W resistor |
| 84, 145 (R7, 9) | 470 ohm, ¼ W resistor |
| 120 (R10) | 43.2K ohm, ¼ W resistor |
| 121, 123 (R11, 15) | 10K ohm, ¼ W resistor |
| 68 (R12) | 24K ohm, ¼ W resistor |
| 69 (R13) | 20K ohm potentiometer |
| 45 (R14) | 5.1K ohm, ¼ W resistor |
| 60, 61 combination (K1) | Relay, n/o contacts, 6 VDC coil (typical) |
| 34 (T1) | Transformer, 120/277 VAC to 18 VAC C.T. (see Table 1A) |
| 66 (DS1) | Emergency lamps (typical 6 volt) |
| 46 (Battery) | 6 V sealed lead-acid type (typical, also 4 VDC and 12 VDC depending on application) |
| 160 (Alarm) | Solid state audible alarm, 6 VDC |
| 135, 137 (Resistors) | 47K ohm each |

TABLE 1A

Typical Transformer Characteristics

| Winding Order | 1 | 2* | 3 |
| --- | --- | --- | --- |
| Volts | 120 | 157 | 18.4 |
| Amps | | | .43 |
| Wire Size | 37 | 40 | 27 |
| Turns | 1607 | 2102 | 245 |
| Taps | | | At Ctr |
| Resistance | 240 | 608 | 3.9 Total |
| Hi Pot Test | 1500 V | 1500 V | 1500 V |
| Core Insulation | Nylon Bobbin | | |
| Lamination Size | EI 21 × ⅛ Stack | | |
| Lamination Thickness | | | 24GA |
| Lamination Grade | | | M27 |
| B Max. | 100,000/IN² | | |
| Interleave | 1 × 1, 2 × 2, 3 × 3, 4 × 4, or, 5 × 5 | | |

TABLE 1A-continued

Typical Transformer Characteristics

| Winding Order | 1 | 2* | 3 |
| --- | --- | --- | --- |
| No Loads Watts | @ 120 VAC, 60 hz - 1.25 W. maximum | | |

*277 VAC primary winding if system to be used with 277 VAC utility power

TABLE 2

Typical Voltages for FIG. 1

| Reference | Description |
| --- | --- |
| $V_{cc2}$, $V_{cc3}$ | 10 VDC |
| BP (battery) | 7.05 VDC at float, 7.50 VDC at equalize |
| Transformer 34 (T1) secondary | 9-0-9 VAC nominal (see Table 1A) |
| BRO input 204 | 1.25 VDC |
| BS input 55 | 1.15 VDC at float |

Overall Operation of the System

Referring agiain to FIG. 1, battery charger module 24 uses a silicon controlled rectifier (SCR) 44 which is controlled by output 118 (called SCRD) from the supervisory IC 32. Resistor 45 provides the necessary gating voltage when the level of output SCRD is at an elevated potential. Thus, when the SCRD output is high, SCR 44 is turned on, which in turn provides charging current to battery 46 from the power supply output 48. The charger also includes monitoring circuitry comprising resistors 50 and 52 in combination with potentiometer 51 and capacitor 54. The wiper contact 55 of potentiometer 51 is connected to capacitor 54 and to the battery sense (BS) input 57 to the supervisory IC 32.

Figure 2:
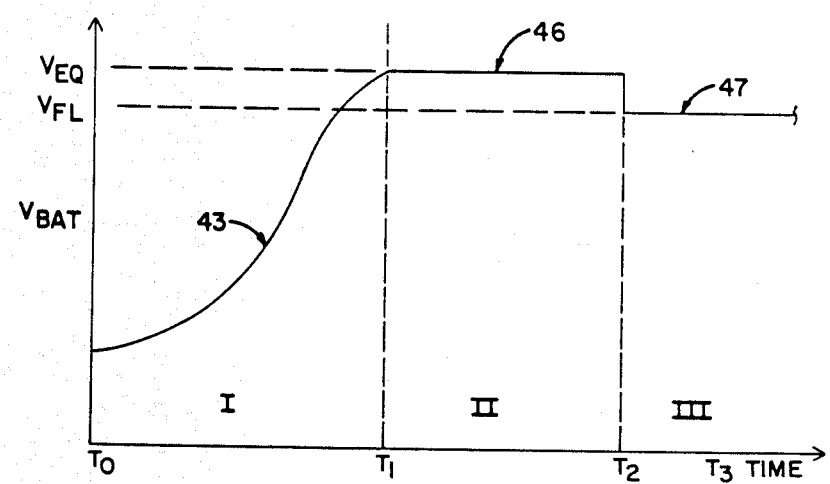
FIG. 2 is a waveform of the voltage applied to a battery by the battery charging circuitry plotted versus time. This figure illustrates the three charging modes of the battery charger.

As shown in FIG. 2 and as will be explained more fully with respect to the operation of the supervisory IC, battery charging, as directly controlled by SCR 44, has a constant current mode 43, an equalization voltage mode 46 and a floating voltage mode 47. Thus, during time period $t_0$ through $t_1$, the current supplied to battery 46 is controlled through gating of SCR 44 so as to limit the current to the battery at a predetermined amount, typically 300–800 milliamperes. This current is limited due to the internal impedance of transformer 34 (see Table 1A). Once an equalization voltage is obtained (typically 7.50 volts for a 6-volt battery), the equalization voltage is maintained for a time period ($t_1$ to $t_2$) of 4 hours after a loss of utility power and for a period of 12 hours after a self-test operation. The equalization voltage helps insure long battery life by causing agitation of the battery electrolyte which, in turn, helps eliminate sulfucation of the battery plates. Following this constant voltage period, the SCR is gated so as to provide a constant voltage to the battery at its float voltage (typically 7.05 volts for a 6-volt battery). This is the voltage that the battery is normally maintained at once a fully charged condition has been achieved. This time period ($t_2$ to $t_3$) is maintained until a discharge of the battery occurs due to loss of utility power, a brown-out condition, or due to a self-test operation.

Figure 4A:
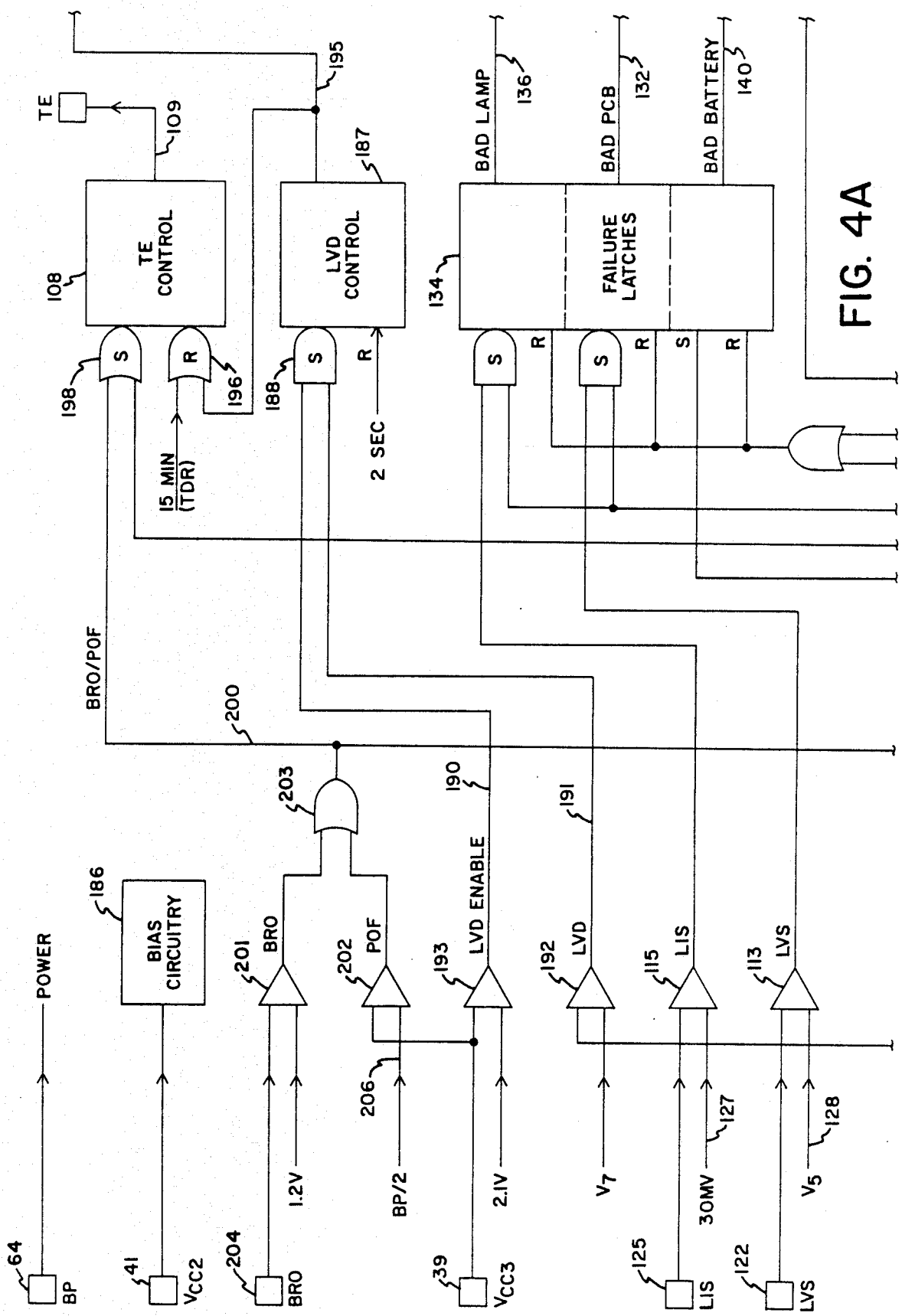
FIGS. 4A–4F form an overall schematic-block diagram of the supervisory integrated circuit shown in FIG. 1.

As shown more fully in FIGS. 4A.–4F with respect to the band-gap reference voltages $V_1$, $V_2$, $V_3$, $V_4$ and $V_5$, the actual float voltage applied to the battery by the charger is inversely proportional to the ambient temperature of the emergency lighting supervisory system. Therefore, as the ambient temperature increases, the charging float voltage decreases by 0.2% per degree Celsius and vice versa. This change in float voltage closely matches the optimal charging voltage desired for sealed lead acid batteries and thereby minimizes overcharging under high ambient temperatures and undercharging under low ambient temperatures.

As shown in FIG. 1, the emergency transfer module 26 provides for the transfer from utility power to battery back-up power when utility power fails or when utility voltage falls below a predetermined "brown-out" level. If utility power fails, voltage $V_{cc3}$ decays by discharge of capacitor 40. This, in turn, causes the supervisory IC 32 to activate (turn on) its transfer enable (TE) output 109 which, in turn, energizes transistor 58. Transistor 58 energizes relay coil 60 having contacts 62 which are closed by the energized state of coil 60. With contacts 62 closed battery current on line 64 passes through emergency light(s) 66 so as to illuminate it.

If emergency light energization is desired when a brown-out condition occurs, resistor 68 in combination with potentiometer 69 are used to sense any reduction in voltage at $V_{cc3}$ and if this sensed voltage falls below a predetermined level (such as a 20% reduction in utility voltage), supervisory circuit 32 activates its transfer enable (TE) output 109 so as to energize emergency light(s) 66.

The emergency lighting supervisory circuit also can continuously monitor several parameters of the system including the charge status of battery 46 through battery sense input 41 (BS), the electrolyte level of the battery via input 70 (LEL IN), and the current state of the overall system. The battery charge status is annunciated by the high/low battery output 72 of supervisory circuit 32. Output 72, when high, activates transistor 73 causing current flow and thus illumination of light emitting diode (LED) 74. Supervisory circuit 32, as explained in detail below, causes the high/low output 72 to be in a pulsed high state when the battery voltage is sensed to be above or below predetermined values (typically 8.4 volts and 6.35 volts). If an improper connection exits between the battery and the remainder of the supervisory system, the battery power input 64 (called BP) is not at the battery potential and therefore the supervisory circuit does not generate a clock pulse. Lack of a clock pulse causes high/low output 72 to be in a constant high state, thereby turning LED 74 on continuously.

If the electrolyte level input 70 (called LEL IN) indicates a low electrolyte levl, supervisory circuit 32 activates the electrolyte level output 76 (called LEL OUT) which, in turn, energizes transistor 77 causing energization of light emitting diode 78. Thus, LED 78 is normally off unless a low electrolyte level is sensed, in which case it is constantly illuminated.

The electrolyte level output signal also is connected to OR gate 112 which, in turn, deactivates charger control module 111. This deactivation prevents battery charging when its electrolyte level is low.

The failure indicator output is summarized in Table 3 below:

TABLE 3

| Failure Indicator Output | |
|---|---|
| High Impedance | no significance |
| High | bad battery (highest priority) |
| One Second Intermittent High | bad printed circuit board (next highest priority) |
| Low | bad lamp (lowest priority) |

The status indicator output 80 annunciates the overall condition of the battery charger in a manner as set forth in Table 4 below:

TABLE 4

| Status Indicator Output | |
|---|---|
| High Impedance | no significance |
| High | charger is in equalize mode |
| Low | charger is in float mode |
| One Second Intermittent Low | charger is in constant current mode |
| One Second Intermittent High | unit failure (highest priority) |

LED's 81 and 82 are associated with resistors 83 and 84 such that the conditions set forth in Table 3 cause the associated action of these LED's.

Supervisory IC Operation

FIGS. 4A-4F, forming FIG. 4, are a detailed schematic-block diagram of supervisory circuit 32 shown in FIG. 1. FIG. 5 comprising FIGS. 5A-5W, as combined together in FIGS. 5AX, 5AY and 5AZ, form the overall schematic diagram of supervisory integrated circuit 32. FIG. 5 presents details of the IC modules shown in FIGS. 4A-4F. Table 4A is a directory of the various components and modules in FIGS. 4A-4F. The supervisory circuit, in association with the interconnected modules referred to above, allow the emergency lighting supervisory system to perform periodic self-tests of the battery control circuitry and emergency light(s) so as to determine their operational status.

TABLE 4A

| Circuit Module or Component Name | Circuit Module or Component Reference Number | FIG. 4 Area (FIG. #'s) | FIG. 5 Primary Area (FIG. #"s) |
|---|---|---|---|
| Brown out comparator | 201 | 4A | 5A |
| Lamp circuit sense (LIS) comparator | 115 | 4A | 5A, 5G |
| Lamp voltage sense (LVS) comparator | 113 | 4A | 5G |
| Bad battery comparator | 138 | 4C | 5G |
| Low electrolyte comparator (LEL) | 168 | 4C | 5R, 5X |
| Low battery comparator | 180 | 4C | 5G, 5M |
| High battery comparator | 174 | 4C | 5M |
| Equalize voltage comparator | 182 | 4C | 5M |
| Float voltage comparator | 185 | 4C | 5M, 5S |
| Alarm inhibit | 169, 157 | 4D | 5S, 5T |
| Low voltage disconnect (LVD) enable comparator | 193 | 4A | 5S |
| Power failure comparator | 202 | 4A | 5S |
| Clock comparator | 87 | 4E | 5S, 5Y |
| Band gap voltage | 129, 205, 206 | 4B | 5Y, 5AE |
| Bias circuitry | 186 | 4A | 5AE, 5AS | 5AL, |
| Low voltage disconnect (LVD) comparator | 192 | 4A | 5AS |
| Initial battery reset comparator | 107 | 4E | 5AS |
| Transfer enable (TE) control | 108 | 4A | 5C, 5D |
| Low voltage disconnect (LVD) | 187 | 4A | 5C, 5I |

TABLE 4A-continued

| Circuit Module or Component Name | Circuit Module or Component Reference Number | FIG. 4 Area (FIG. #'s) | FIG. 5 Primary Area (FIG. #"s) | |
|---|---|---|---|---|
| control | | | | |
| Failure latches | 134 | 4A | 5H, 5J, 5O, | 5I, 5N, 5P |
| High-low battery inhibit control | 175 | 4C | 5N, 5P | 5O, |
| Charger control | 111 | 4C | 5N, 5P, 5U, | 5O, 5T, 5V |
| Self-test control | 110 | 4C | 5T, 5Z, 5AF, | 5U, 5AA, 5AG |
| Timing generator | 92 | 4E | 5AF, 5AH, 5AM, 5AO, | 5AG, 5AI, 5AN, 5AP |
| Clock divider | 88 | 4E | 5AT, 5AV | 5AU, |
| Self-test duration | 104 | 4D | 5AB, 5AH, | 5AC, 5AI |
| Communication input/ output (I/O) port and code/decode (CODEC) | 162 | 4B | 5D, 5F, 5K, 5P, 5R | 5E, 5J, 5L, 5Q, |
| High-low indicator | 178 | 4B | 5Q, | 5R |
| Unit ready indicator | 141 | 4D | 5Q, | 5R |
| Low electrolyte level (LEL) indicator | 172 | 4B | 5Q, | 5R |
| Failure indicator | 142 | 4D | 5W, | 5X |
| Status indicator | 150 | 4D | 5W, 5AC, | 5X, 5AD |
| Alarm driver | 152 | 4D | 5AC, | 5AD |
| SCRD driver | 116 | 4F | 5AC, 5AI, | 5AD, 5AJ |
| Day/month counter | 98 | 4F | 5AJ, 5AP, 5AR | 5AK, 5AQ, |

Figure 4B:
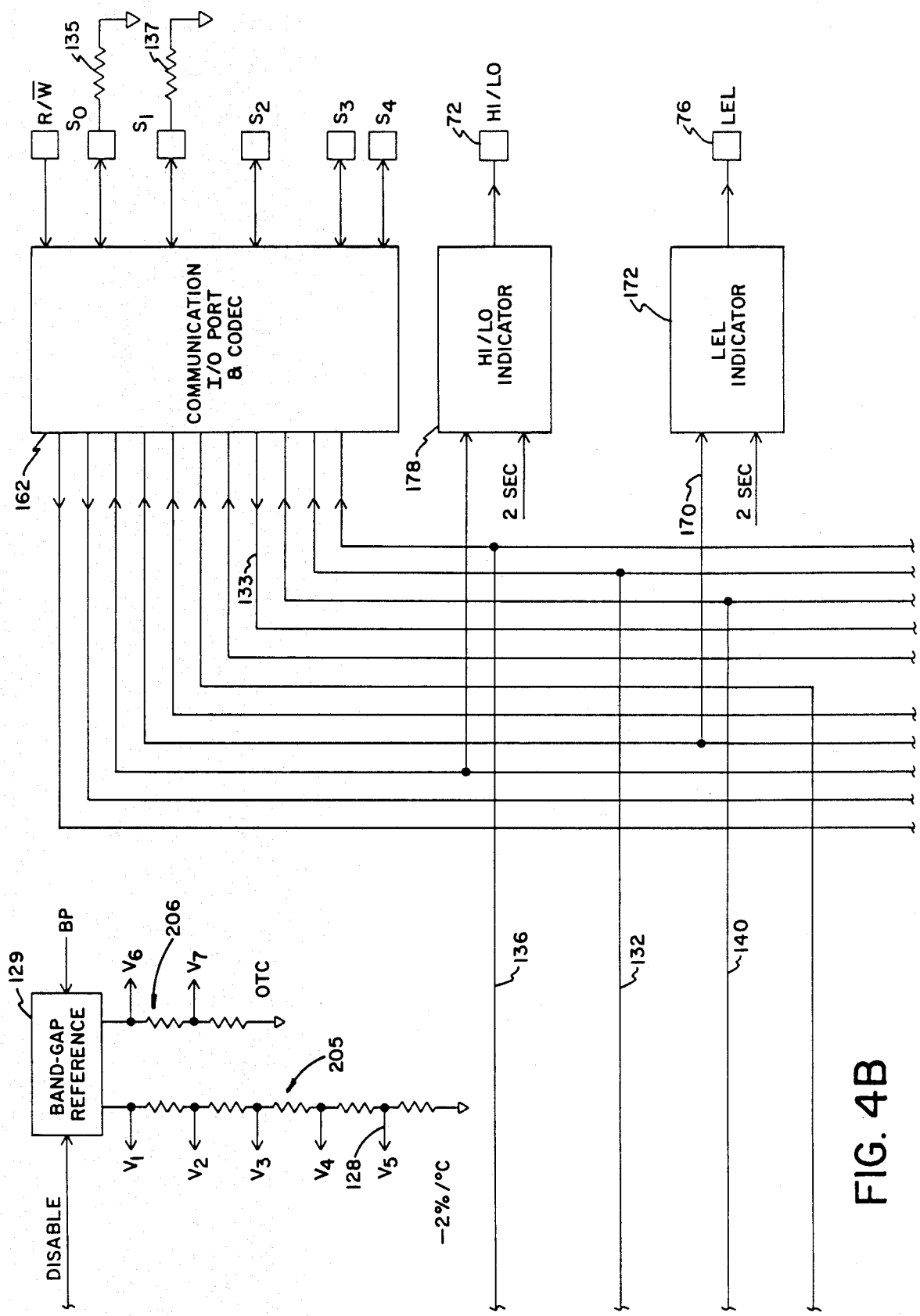
Figure 4C:
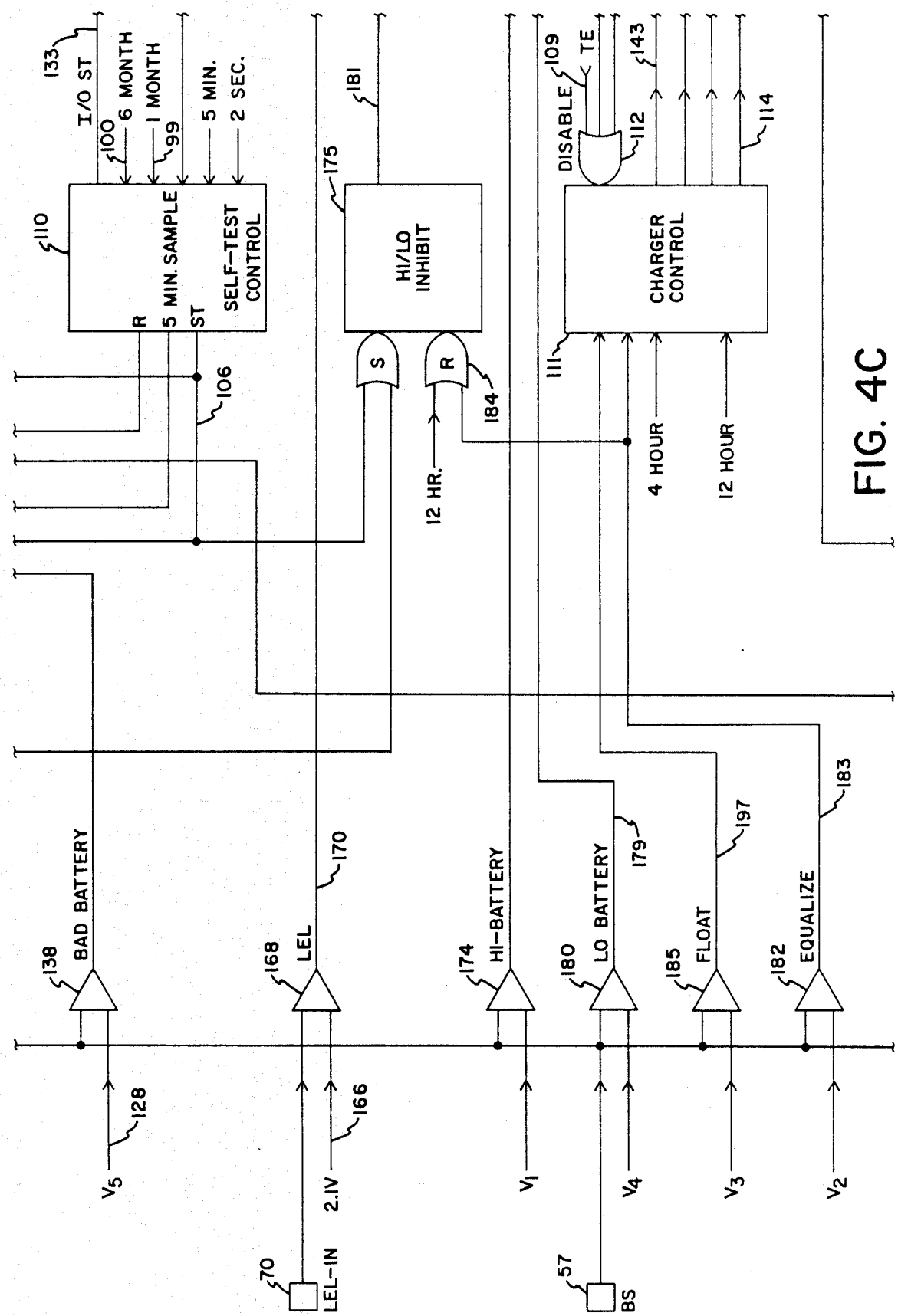
Figure 4D:
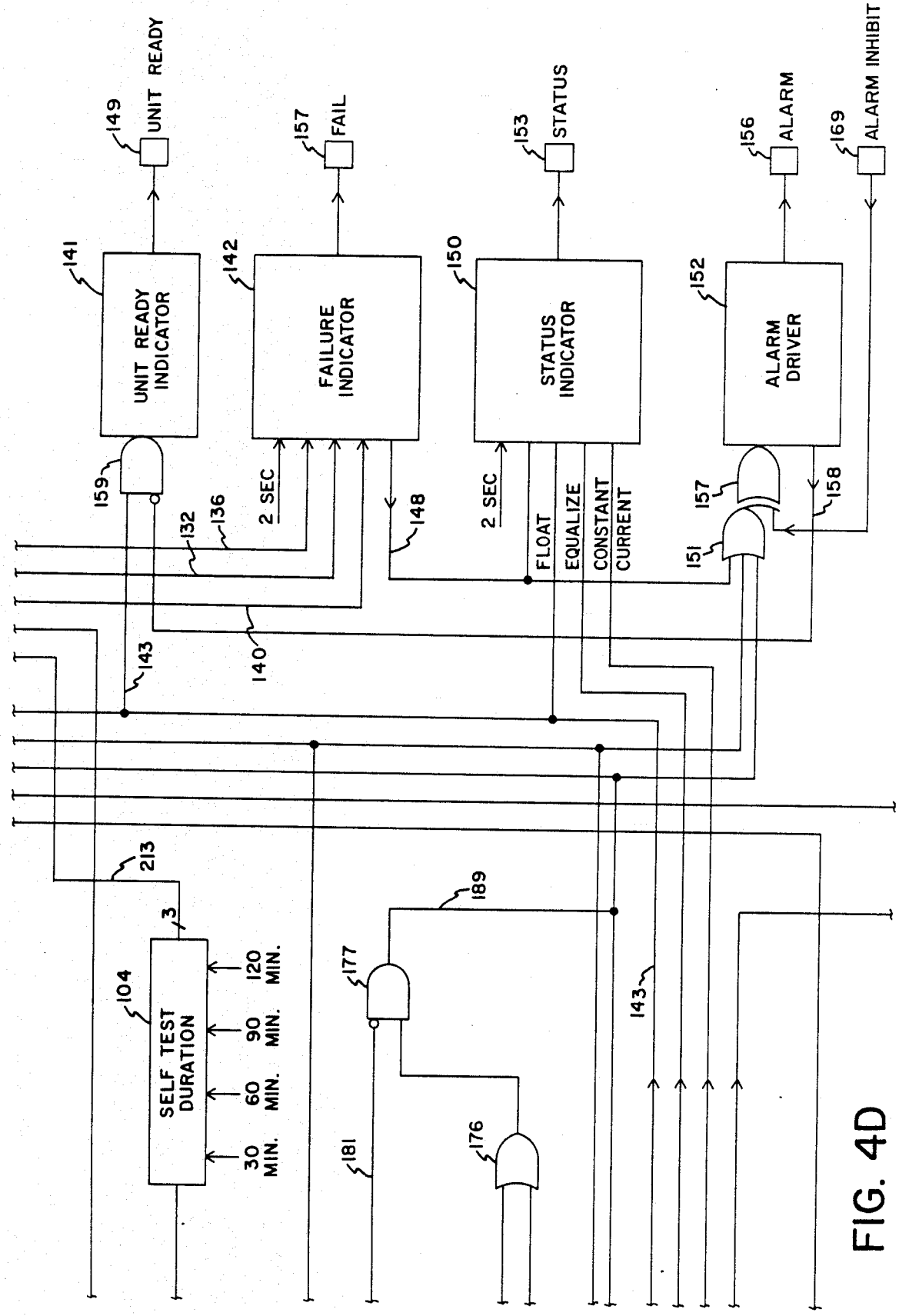
Figure 4E:
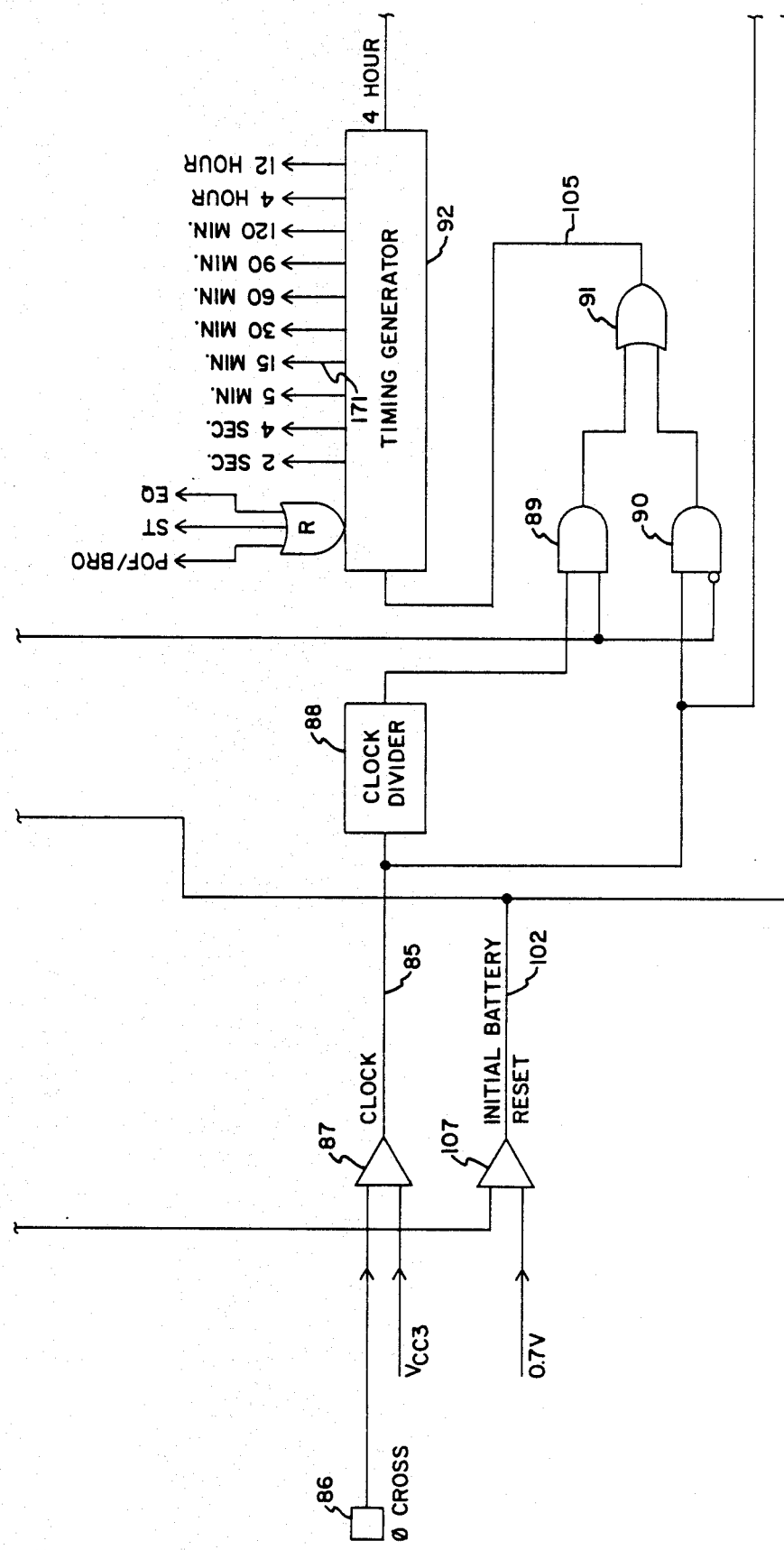

As seen in FIG. 4E, the supervisory IC uses a zero voltage cross input 86 (see also FIG. 1) in combination with comparator 87 so as to generate a 120 hertz pulsed signal on clock output 85. The comparator uses an input 103 having a voltage of one-half the battery power (BP) voltage received on line 64 (see FIG. 1).

Figure 4F:
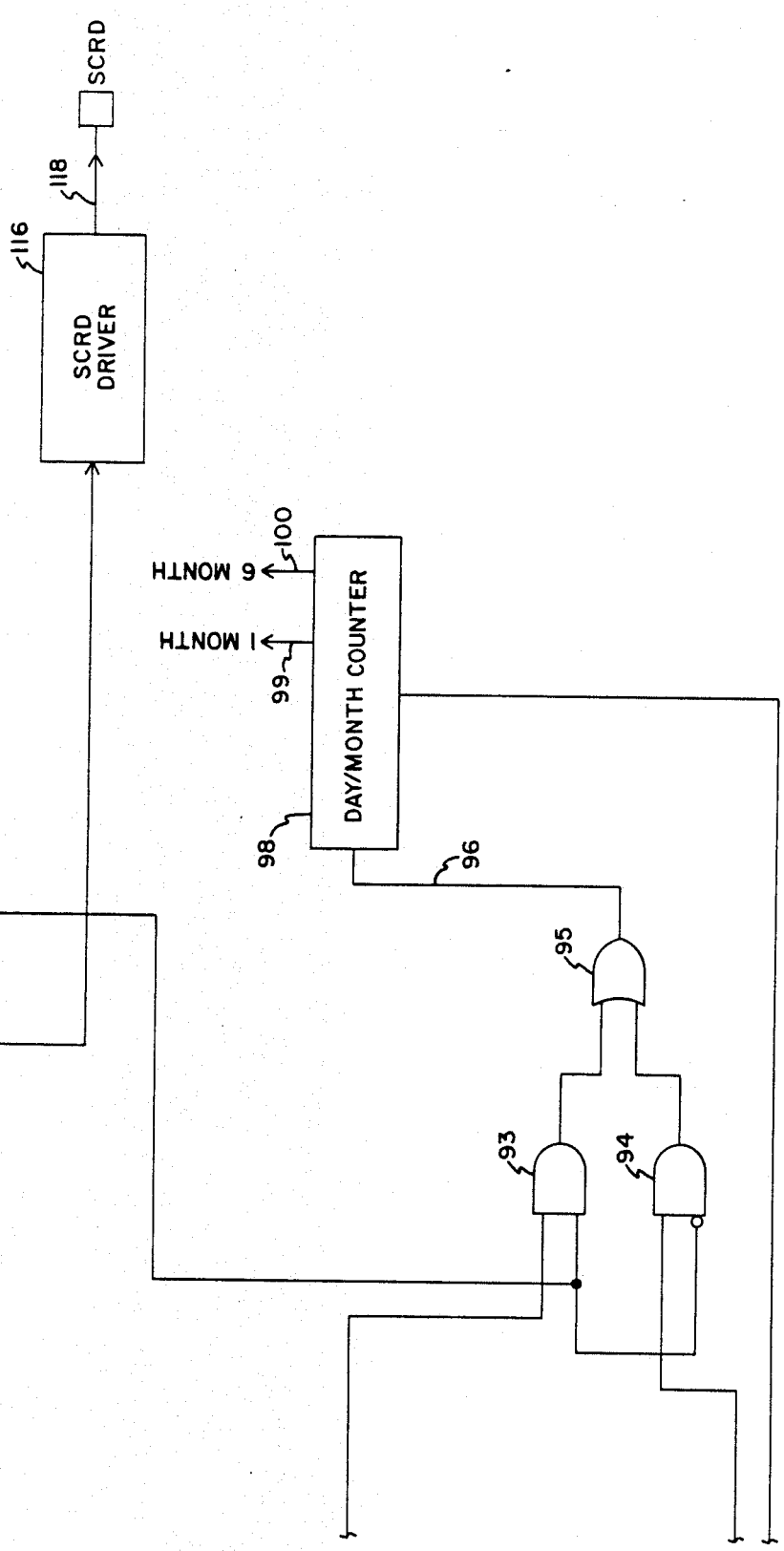
Figure 4G:
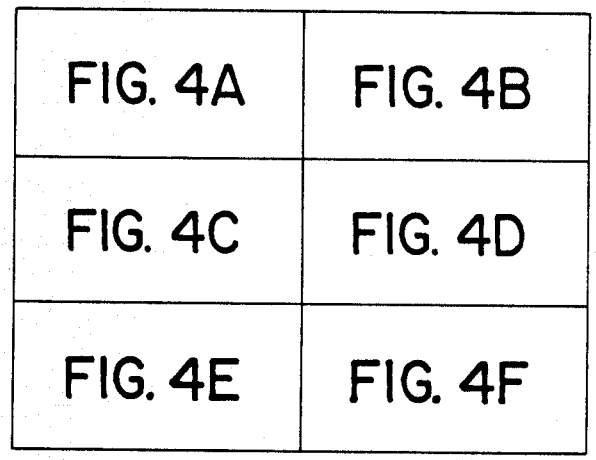
FIG. 4G is a diagram showing how

The signal on clock output 85 is presented to clock divider 88 and logic elements 89, 90 and 91 which, in turn, generate a timing signal on output 105 to timing generator 92. This generator produces outputs of 2 seconds, 4 seconds, 5 minutes, 15 minutes, 30 minutes, 60 minutes, 90 minutes, 120 minutes, 4 hours and 12 hours. As seen in FIGS. 4E and 4F, the 4-hour output is connected to logic elements 93, 94 and 95 which, in turn, produce an output 96 to a day/month counter 98 which, in turn, produces an output at approximately one-month and six-month intervals on lines 99 and 100, respectively. The day/month counter 98 can be reset by an initial battery reset signal 102 which is activated when comparator 107 first senses battery voltage via BS line 41.

As shown in FIG. 4C, the one-month and six-month outputs from counter 98 are transferred to self-test control module 110 along with the 5-minute and 2-second outputs from the timing generator 92. A self-test duration device 104 (FIG. 4D) receives the 30-minute, 60-minute, 90-minute and 120-minute outputs from timing generator 92, any of which can be selected by grounding or opening external resistors 135 and 137 as shwn in FIG. 4B. Table 5 describes the specific selection of the timing intervals for all self-test initiations.

TABLE 5

Self-Test Activation & Internal Timer

The self-test may be activated either automatically by an internal timer or by command via the remote communication circuit (signal on line 133; see FIGS. 4A and 4B). The internal timer initiates the following tests:

| Time Interval | Test Period | Conditions |
|---|---|---|
| (1) Every 28 days | 5 minutes | charger must be in float condition to initiate |
| (2) Every 6 months | selectable by external control at S1, S2 lines (no connection = 1) (47K resistor 135 and/or 137 to GRD = 0) | charger must be in float condition |

| | S1 | S2 |
|---|---|---|
| 30 minutes | 1 | 1 |
| 60 minutes | 0 | 1 |
| 90 minutes | 1 | 0 |
| 120 minutes | 0 | 0 |

(3) The communication circuit initiates the following tests:

| S0 | S1 | S2 | S3 | S4 | |
|---|---|---|---|---|---|
| X | X | X | 0 | 1 | 30 minute self-test |
| X | X | X | 1 | 1 | 5 minute self-test |

Note: X = "don't care" (0 or 1)
Longer self-test periods can be accomplished remotely by immediately repeating the desired communication self-test command. The charger does not have to be in the float mode for self-test to be initiated.

(4) A five-minute self-test is performed upon closure of switch 164 as seen in FIG. 1.

As shown in FIG. 4C, the one-month and six-month signals from counter 98 are received on lines 99 and 100, respectively. Module 110, upon receipt of a one-month or a six-month signal, initiates a self-test procedure by activating its ST output 106 which, in turn, activates the transfer enable control flipflop 108 (FIG. 4A). As shown in FIG. 1, the activation of the transfer enable (TE) output 109 causes closing of contacts 62 (called K₁) by energizing relay coil 60 which, in turn, passes battery voltage to emergency light(s) 66.

In order to properly test the circuitry, it is necessary that the charger control module 111 effectively disconnects the power supply voltage during such testing. This result is achieved by receipt of the TE output signal 109 through OR gate 112 which, in turn, turns off the charger control SCR output 114. With output 114 off, SCRD driver module 116 is deactivated, causing the SCRD output 118 to be in the off (i.e., low) state, thereby effectively disconnecting battery 46 from the rectified voltage at output 48 (see FIGS. 1 and 4F).

As best seen in FIG. 1, when lamp(s) 66 is energized, current passes through resistors 120 and 121 comprising a voltage divider with the value of this voltage at node 122 being sensed by the supervisory IC 32 at its lamp voltage sense input 122 (LVS). Similarly, the current passing through resistor 124 to ground generates a voltage at node 125 which is sensed by the lamp current sensor 125 (LIS) of supervisory circuit 32. The LIS and LVS input voltages are respectively compared to a 30 millivolt reference 127 and a V₅ output 128 from a bandgap reference module 129. Comparators 113 and 115 are respectively used to determine if the proper voltages are present on lines 122 and 125. If the proper voltage is not sensed at node 122, a bad printed circuit board output 132 is set by closure of its corresponding failure latch in failure latch module 134 (see FIG. 4A). Such a failure mode is indicative of a faulty connection between relay contacts 62 and lamp(s) 66. Similarly, if the voltage sensed at the lamp current sense node 125 is not sufficiently high in comparison to the 30 millivolt signal 127, then the bad lamp output 136 is set by closure of the appropriate latch in failure latches 134.

In addition to sensing lamp current and voltage to the lamp(s), the self-test procedure also senses battery voltage at the BS terminal 41 which is connected to the wiper of potentiometer 51 (see FIG. 1). The BS voltage is compared to voltage reference 128 ($V_5$) from the band-gap reference module 129 (see FIGS. 4B and 4C). Comparator 138 changes state if the BS voltage is below the referenced voltage. This occurrence causes bad battery output 140 of failure latches 134 to be activated (FIG. 4A).

As seen in FIGS. 4B and 4D, the bad printed circuit board output 132, the bad lamp output 136 and the bad battery output 140 all connect to a failure indicator module 142 which, depending upon the particular failed output, causes the indicator output 157 to have a state set forth in Table 3 above.

Thus, if bad battery output 140 is high—indicating a bad battery condition—the failure indicator output 157 is also high which, as shown in FIG. 1, causes activation of LED 144 on a continuous basis. This is due to current flow through LED 144 via resistor 145. If a bad lamp output 136 is high, the failure indicator causes output 157 to remain in a low voltage state which causes continuous activation of LED 146 by current flow through resistor 147 from the $V_{cc3}$ source.

An intermediate priority is obtained when a bad PCB output 132 is in a high state which causes the failure indicator module 142 to generate a pulsed signal on output 157. The pulse timing is controlled by the two-second input to the failure indicator module from timing generator 92. This intermittent high condition on output 157 causes LED 144 to be pulsated on and off at a one-half hertz rate (FIG. 1).

Failure indicator 142 generates a signal on intermodule output 148 when any failure condition is sensed. This signal is transferred to the status indicator module 150 and to logic gate 151 associated with alarm driver 152. The status indicator, upon receipt of such a failure signal, generates a pulsed high-level signal on output 153 which, as seen in FIGS. 1 and 1B, causes LED 81 to be pulsed on and off at one-second intervals due to current flow through resistor 84. This is the highest priority setting of the status indicator as indicated above in Table 3.

Upon receipt of a failure signal from output 14B, alarm driver module 152 generates a low-level signal on output 156 which, as seen in FIG. 1, causes energization of an alarm 160. This feature can be overridden by closing switch 167 and thus grounding the alarm inhibit input 169 of supervisory IC 32. As seen in FIG. 4D, this input is connected to exclusive OR gate 157 which, in turn, signals the alarm driver to remain in a deactivated state. As also shown in FIG. 4D, if alarm driver module 152 is activated, it not only energizes output 156, but also generates a signal on inter-module output 158. This output is connected to AND gate 159 and causes the unit ready module 141 to deactivate its output 149 regardless of its previous state. The unit ready indicator module generates a high output under other circumstances when the charge control module generates a signal on its float output line 143. The unit ready LED 79 is only shown in phantom in FIG. 1B since its use is optional.

Parameter Failure Indication

As described herein, various system parameters are tested by the present invention. The annunciation of any sensed failure condition is maintained even if there is a utility black-out or brown-out. As seen in FIGS. 1 and 4A–4D, the supervisory IC 32 receives battery power via line 64 (BP input). This battery power is sufficient to energize supervisory IC 32 including activation of its failure latches 134 and indicator modules 141, 142, 150, 152, 172 and 178. Thus, although the indicator LED's 74, 78, 79, 81, 82, 144 and 146 are not energized if there is a loss of utility power due to loss of $V_{cc3}$ power, they are properly energized upon return of utility power.

The one-month and six-month testing is activated by the above described circuitry for periods of time as set forth in Table 5 above.

Thus, the self-testing sub-system of the present invention periodically examines the critical parameters of an emergency lighting system for a period of time sufficient to simulate actual operation. Indeed, the six-month test which can be programmed to initiate a test from 30, 60, 90 or 120 minutes actually tests the emergency lighting system under rated time durations required by applicable building safety codes.

Not only does the self-test operation insure proper functioning of the emergency lighting system, but it also causes periodic discharge of the battery with subsequent recharging by the charger circuitry. This discharge-recharge cycling "exercises" the battery which prolongs its useful life and insures that it will have a high discharge capacity when required in an actual emergency.

Unit Ready Status

As seen in FIGS. 4C–4D in conjunction with FIGS. 1 and 1B, a unit ready indicator module 141 receives a signal on output 143 from the charger control circuit 111 when the charger control circuit is in a float voltage mode. The float voltage mode, as seen in FIG. 2, is indicative of the entire system being ready for an emergency, such as loss of utility power or a brown-out condition. The unit ready indicator module generates a signal during such times on its output 149 which, as seen in FIG. 1, thereby turns on transistor 139 which, in turn, causes the energization of light emitting diode 79. This result is visually observable as seen in FIG. 1B and can be communicated through the communication I/O module to the host computer.

Continuous Parameter Testing

In addition to performing the automatic self-testing functions, the emergency lighting supervisory system as explained above in the "Overall Operation" section, also continuously monitors the electrolyte level of the battery, the voltage on the battery and the status of the charger. As shown in FIGS. 4B–4C the LEL IN input 70 is compared with a 2.1 volt source 166 by comparator 168. If a low electrolyte level is sensed, the LEL output 170 changes state which causes LEL indicator module 172 to generate a two-second on-off pulsed signal on its output 76. This output, as shown in FIG. 1, causes pulsed activation of LED 78. The LEL output signal also turns the charger control module off so as to avoid damage to the battery.

Similarly, as shown in FIGS. 4C and 4D, the battery voltage is sensed for an over-voltage condition by interconnecting the battery sense (BS) input 57 to comparator 174 where it is compared to a voltage $V_1$ from band-gap reference module 129. If the sensed battery voltage exceeds voltage $V_1$, charger control module 111 turns off the SCRD driver module 116. This result is achieved by OR gate 176 in combination with AND gate 177. Output 189 of AND gate 177 is connected to OR gate 112 which, in turn, disables the charger control upon receipt of a high signal.

Gates 176 and 177 also cause the high/low indicator module 178 to generate a two-second on-off pulsed signal on output 72 which causes LED 74 (see FIGS. 1 and 1B) to be pulsed on and off. This high-voltage status of the battery is also transferred to the communication I/O port 162 for annunciating this condition to an interconnected host (see FIG. 6).

The sensing of a low battery voltage is achieved in an analogous manner by comparing the battery sense voltage input 57 to voltage $V_4$ from the band-gap reference module 129. Comparator 180 performs this task. The output from gate 177 again causes the high/low indicator to generate a pulsed signal on output 72 so as to annunciate this condition. Such a condition also deactivates the battery charger module. Thus, both the high or low voltage condition of the battery cause the same annunciation to occur on the high/low indicator LED 74.

The high/low battery monitoring circuit just described is inhibited for a period of twelve hours or until an equalization potential is reached, whenever a transfer from line power to battery power occurs during either an actual failure of utility power or due to the self-test situation occurring. This condition also occurs upon initial application of utility power to the system after installation. Thus, the battery can be charged even though its initial voltage is less than the low battery value examined by comparator 180.

As seen in FIGS. 4C and 4D, the equalization voltage condition is sensed by comparing the battery sense input 41 with voltage $V_2$ from the band-gap reference module 129. Comparator 182 generates a signal on output 183 when voltage $V_2$ is exceeded. This output signal is connected to OR gate 184 where it is gated with the twelve-hour output from timing generator 92. Either signal resets the high/low inhibitor module 175 and therefore makes it operational. If the battery is still in constant charge mode (mode 43 as seen in FIG. 2) when the 12-hour signal is received, the high/low module 175 generates a low signal on output 181. This signal is inverted at the input to AND gate 177 and therefore a high signal is generated on AND output 189 if LO BATTERY output 179 is high (as it would be if the battery is at a low voltage). The signal on output 181 then disables the charger control module 111.

Charger Control and SCR Driver Circuitry (FIGS. 4C, 4F)

The charger control module 111, in combination with the SCRD driver module 116, monitor and control battery charging by controlling the state of the SCRD output 118. The charger control module 111 senses the float and equalization comparator outputs 183 and 184 from comparators 182 and 185 so as to insure proper battery charging. As seen in FIGS. 4A, 4C and 4E, the reference voltages $V_3$ and $V_2$ applied to the float and equalize comparators have a negative temperature coefficient of 0.2% per degree Celsius. This temperature compensation provides close matching of the actual charging voltages to the ideal charging voltages for sealed lead acid batteries. Indeed, reference voltages $V_1$ through $V_5$ produced by band-gap reference module 129 all have a negative temperature coefficient. As seen in FIGS. 4C and 4E, voltages $V_1$, $V_4$ and $V_5$ are the respective reference voltages for hi-battery comparator 174, lo-battery comparator 180, and bad battery comparator 138 ($V_5$ is also applied to the low voltage sense comparator 113). Their negative temperature coefficients also provide more accurate determinations of faulty conditions.

The charger control module, through inputs from OR gate 112, is de-activated whenever the transfer enable output 109 is activated, when the LEL electrolyte level output 76 is activated, or when the high/low battery output 72 is activated.

Initial Battery Reset Circuitry (FIGS. 4A, 4E, 4F)

As seen in FIG. 4C, comparator 107 senses the voltage at the battery sense (ES) input 41 and from a 0.7 voltage reference. The signal on output 102 of this comparator initializes day/month counter 98 and resets failure latches 134 until utility AC power is connected to the emergency lighting system. Therefore, this circuit prevents the transfer enable module 108 from causing the system to enter emergency mode operation while the system is being installed.

Low Voltage Disconnect Control (FIG. 4A)

A low-voltage disconnect control module 187 senses, through AND gate 188, outputs 190 and 191 from low-voltage disconnect enable comparator 193 and low-voltage disconnect comparator 192. Comparator 192 receives a voltage $V_7$ from band-gap reference 129. The LVD enable output 190 is high when loss of utility power occurs. At this time, the LVD output 191 becomes high if the battery sense voltage (BS) falls below reference voltage $V_7$ established by the band-gap reference. If this occurs, the battery voltage is sufficiently low that further drain on the battery due to current flow through lamp(s) 66 and to band-gap reference module 129 should no longer occur. Such a battery disconnect is accomplished by the LVD control module 187 generating a signal on output 195 which is transferred to OR gate 196 and to the band-gap reference module 129. Upon receipt of this signal, the band-gap reference module becomes disabled so as to no longer place a load on the battery while receipt of the signal by OR gate 196 is logically combined with the fifteen-minute time signal from timing generator 92 so as to reset the transfer enable control module 108 thereby disabling its output 109 until a set signal is received through OR gate 198. Thus, both the emergency lights and the band-gap reference module are disconnected from the battery thereby preventing damage to the battery through deep discharge. The LVD control module 187 is reset upon return of utility power which causes LVD enable output 190 to change state.

The LVD control module cannot be activated during a self-test since determination of the battery state is desired. LVD enable comparator 193 achieves this result by preventing AND gate 188 from generating a high output when its output 190 is low. This output is low as long as utility power is present at normal voltages.

Transfer Enable Control Circuitry (FIG. 4A)

The transfer enable control module 108 comprises set/reset flipflops and random logic. It is set by receipt of a signal from the power failure or brown-out output 200 (BRO/POF) in FIG. 4A) which, in turn, is generated by comparators 201 and 202 in combination with OR gate 203. The brown-out signal 204 as seen in FIG. 1 is sensed by the wiper of potentiometer 69 while the power fail signal actually is the $V_{cc3}$ input from line 39 (see FIG. 1). As seen in FIG. 4A, this signal is compared to one-half the battery power signal (BP/2) from input 206. As mentioned above with respect to the low-voltage disconnect description, the transfer enable control is disabled when a low-voltage battery condition is sensed.

Time Delay Relay Circuitry (FIGS. 4A, 4E)

As best seen in FIGS. 4A and 4E, timing generator 92 produces a 15-minute signal on output 171. This output is connected to one of the inputs of OR gate 196 which, in turn, resets the transfer enable control module 108 upon receipt of a pulse signal from this output. Until this signal is received, the transfer enable control module remains activated after an emergency power condition has been sensed by the system. Thus, return of normal utility power will not remove battery power until expiration of approximately 15 minutes. This time lag between restoration of utility power and extinguishing the emergency lamps allows high intensity discharge (HID) lamps commonly used in commercial establishments to come up to full brightness before the emergency lamps are deactivated.

Band-Gap Voltage Reference 129 (FIG. 4B)

The band-gap voltage reference module 129 generates voltage outputs $V_1$ through $V_7$. Voltages $V_6$ (also called $V_F$) and $V_7$ have a zero temperature co-efficient for the LVD comparator 192, the LVD enable comparator 193 and the initial battery reset comparator 107, while voltages $V_1$ through $V_5$ for use respectively in the high-battery comparator 174, the equalize comparator 182, the float comparator 185, the low-battery comparator 180 and the bad-battery comparator 138 have a $-0.2\%/C°$ temperature coefficient. This negative temperature coefficient adjustment to these reference voltages provides appropriate modification to the battery charger float voltage so as to approximate the optimal charger voltage to the battery depending upon the ambient temperature of the system. Resistive networks 205 and 206 are used to generate these voltages by voltage dividing the band-gap generated reference voltages.

Bias Circuitry (FIG. 4A)

Figure 5A:
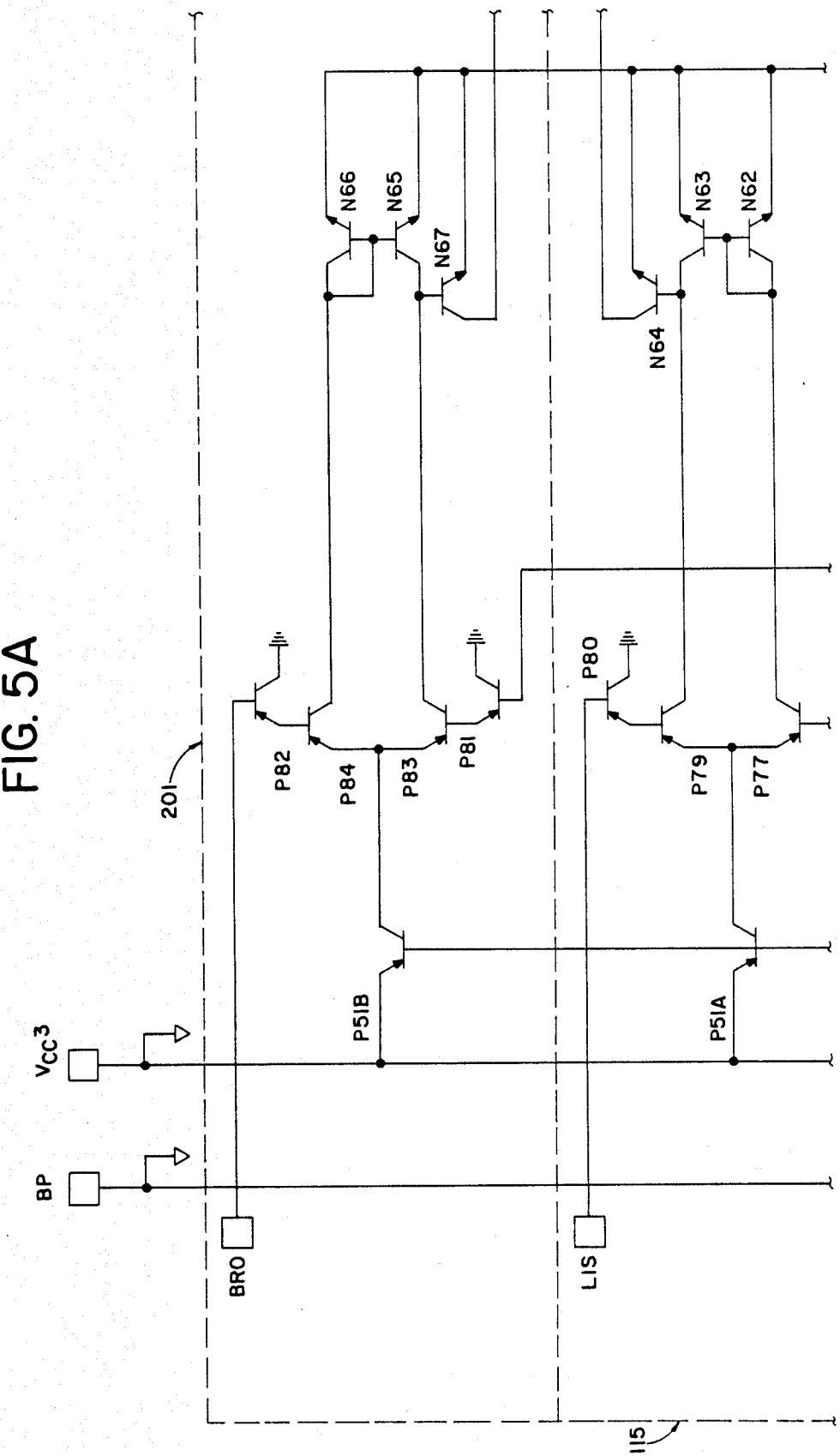
FIGS. 5A–5AW form a schematic diagram of the integrated circuit modules used in the supervisory circuit shown in FIGS. 4A–4F.
Figure 5B:
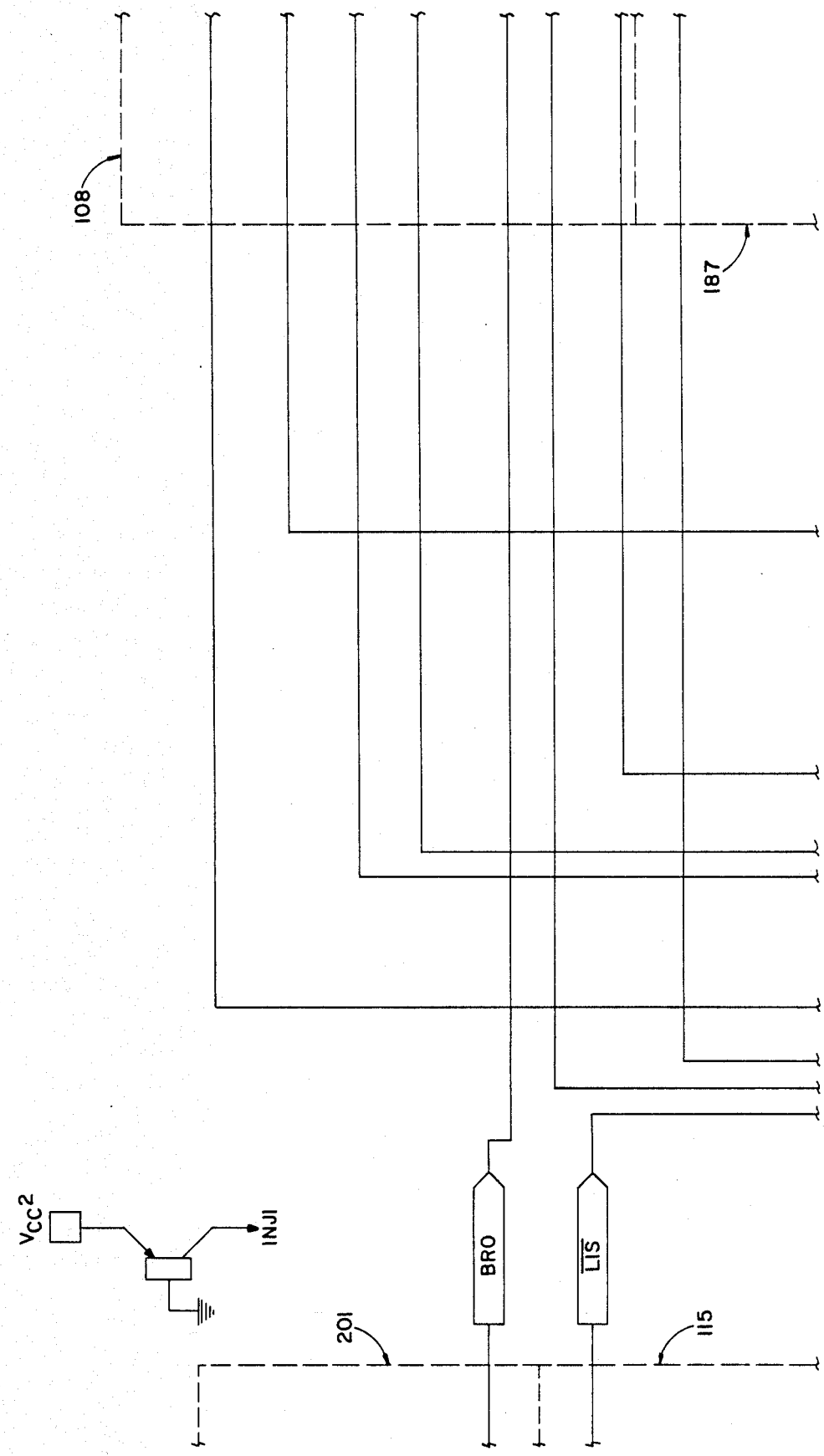
Figure 5C:
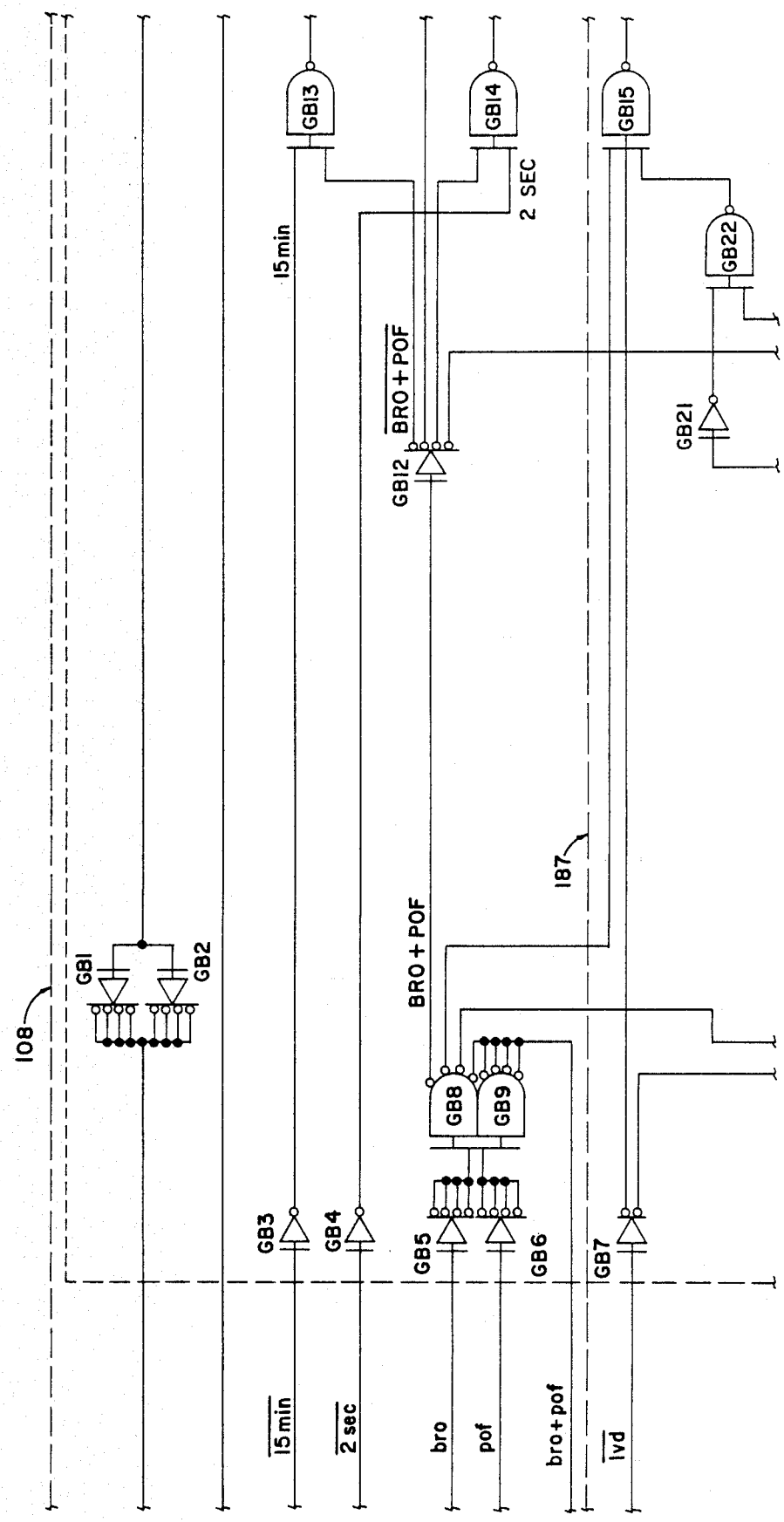
Figure 5D:
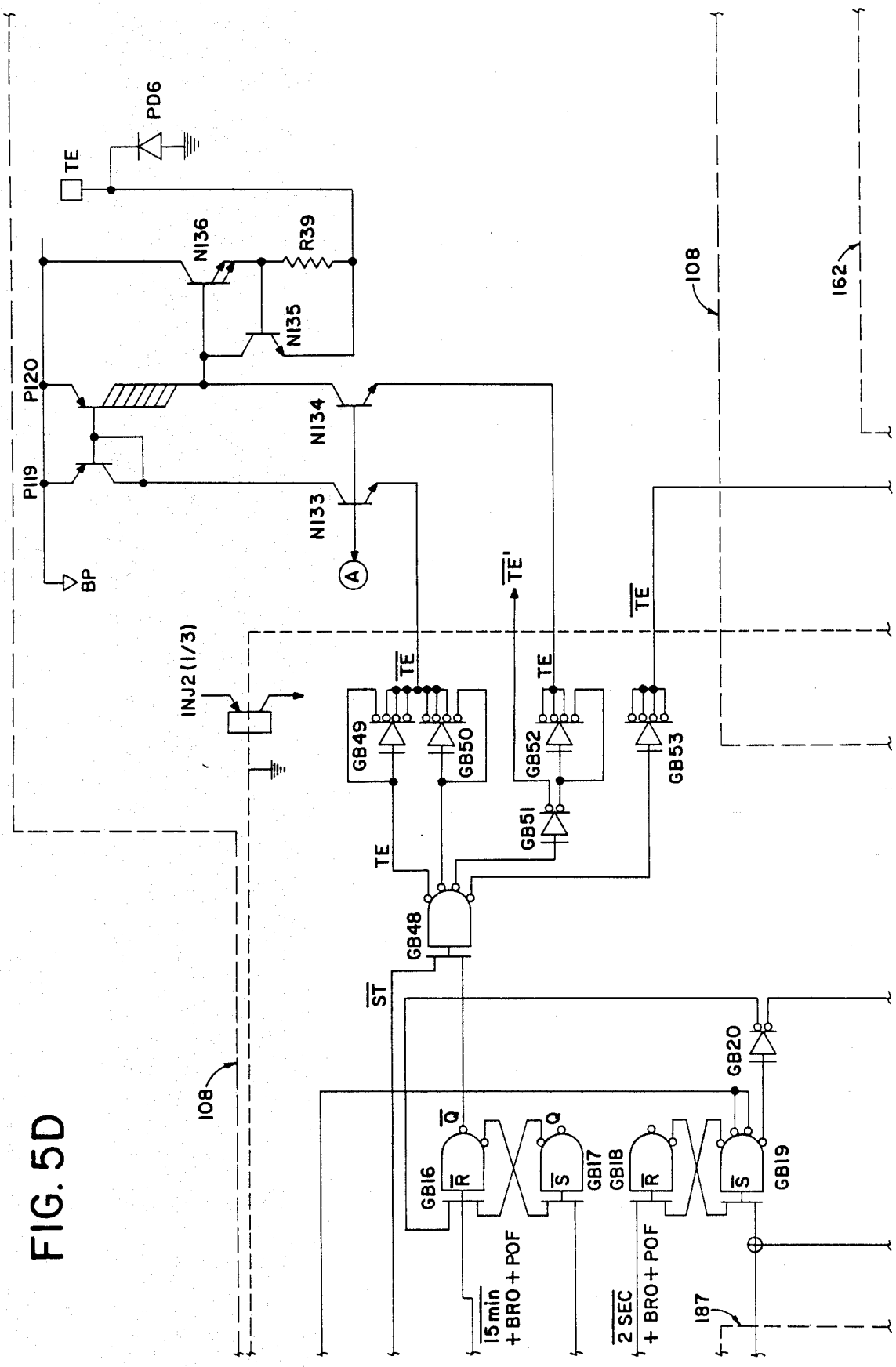
Figure 5E:
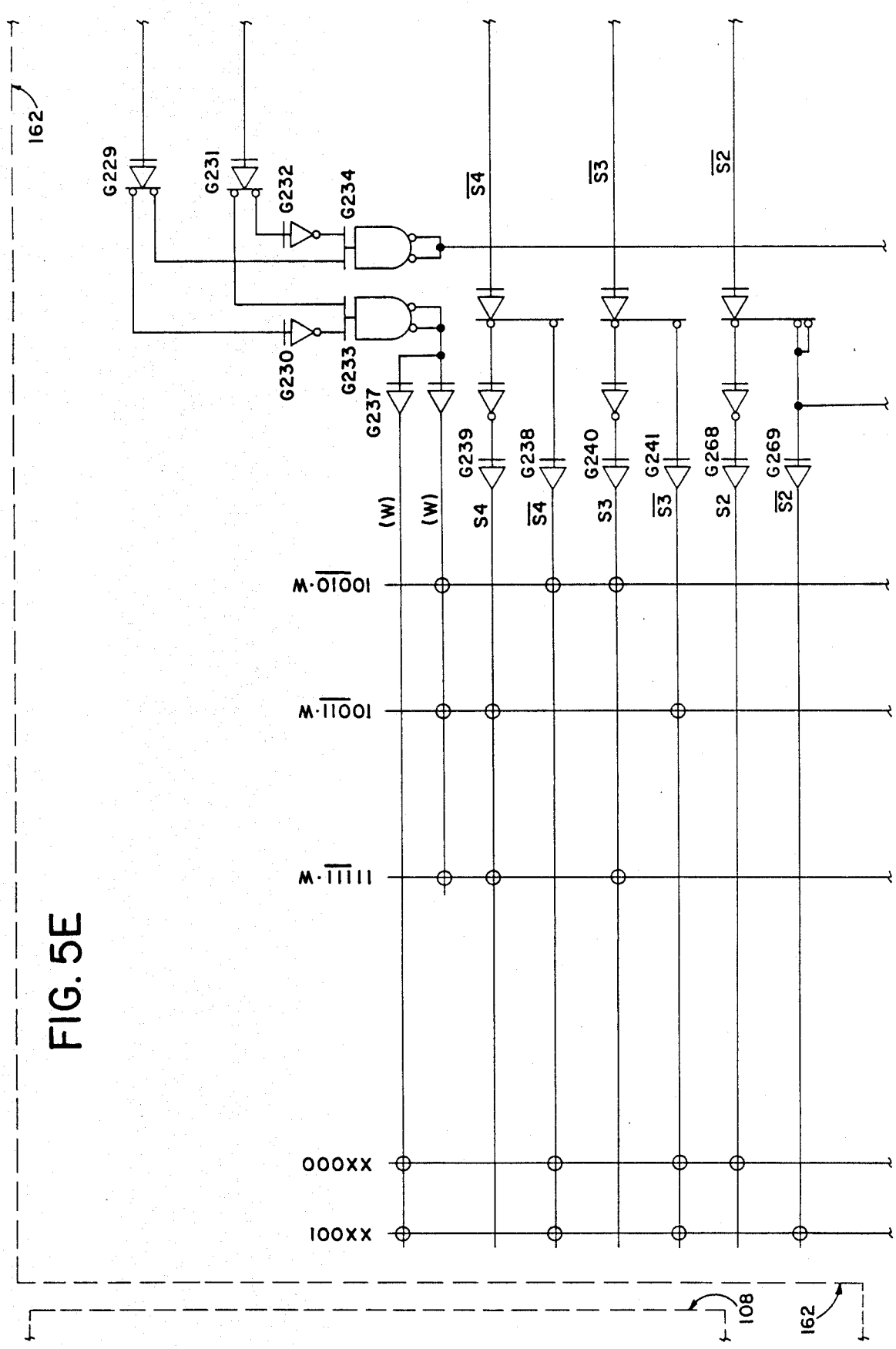
Figure 5F:
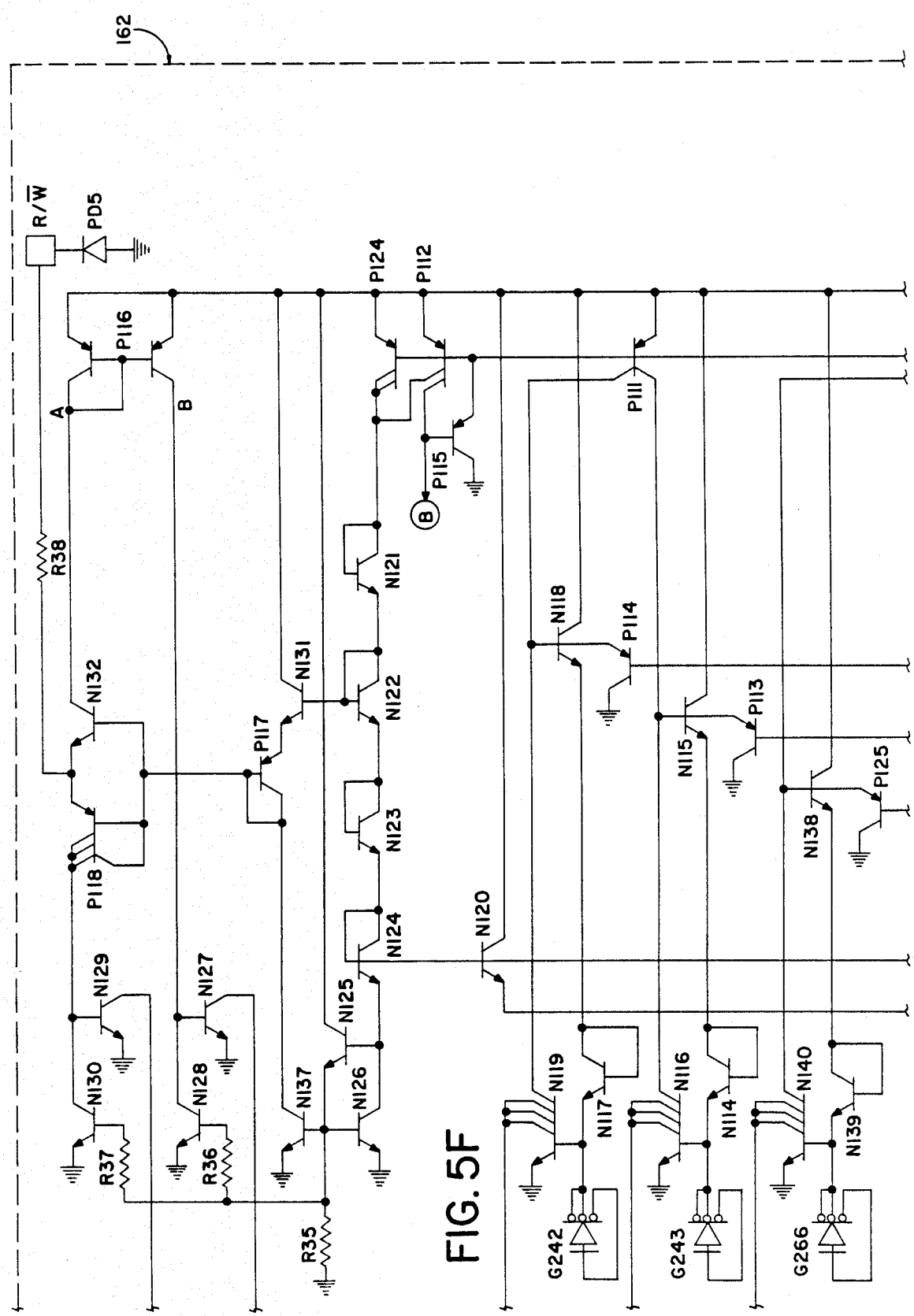
Figure 5G:
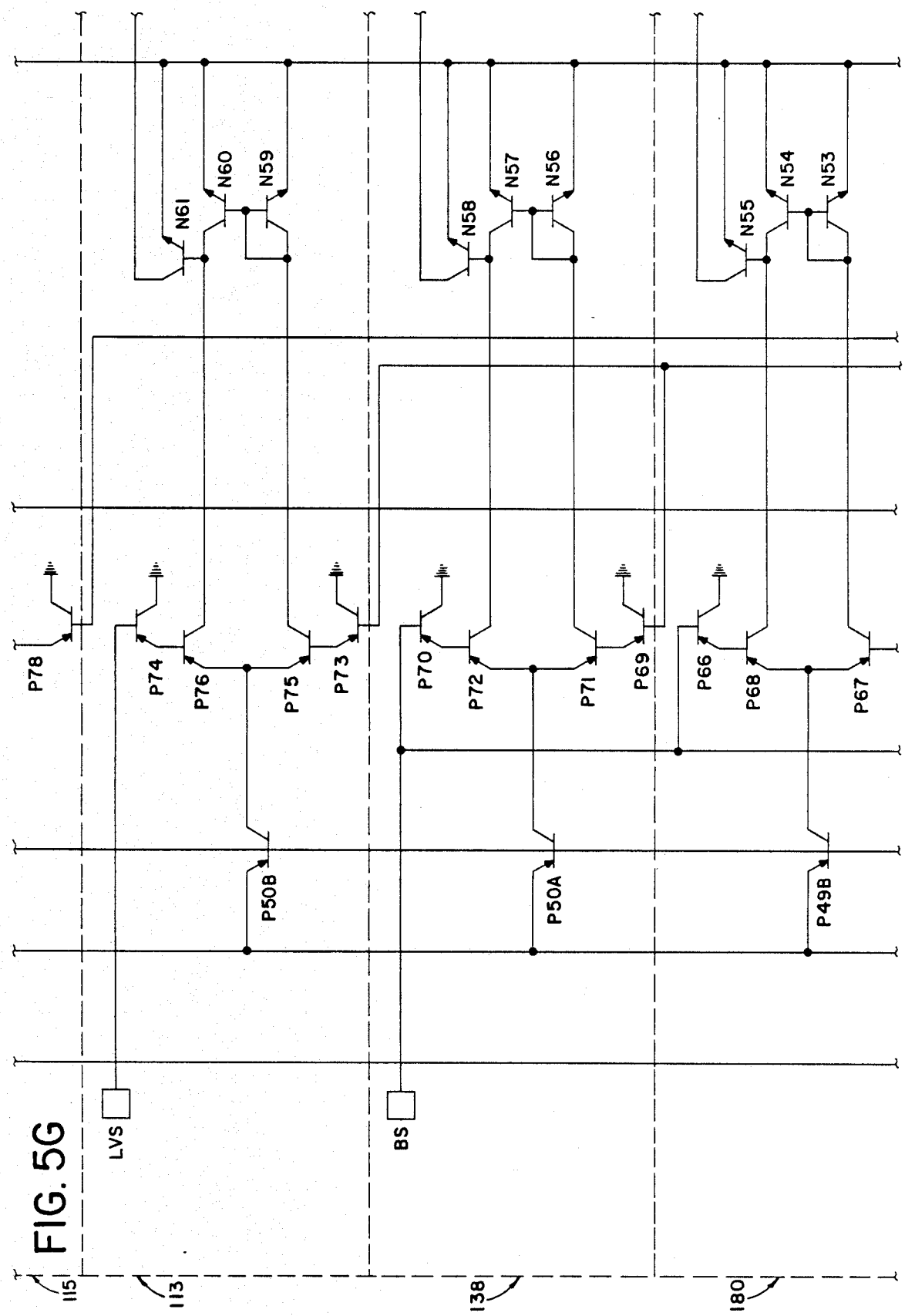
Figure 5H:
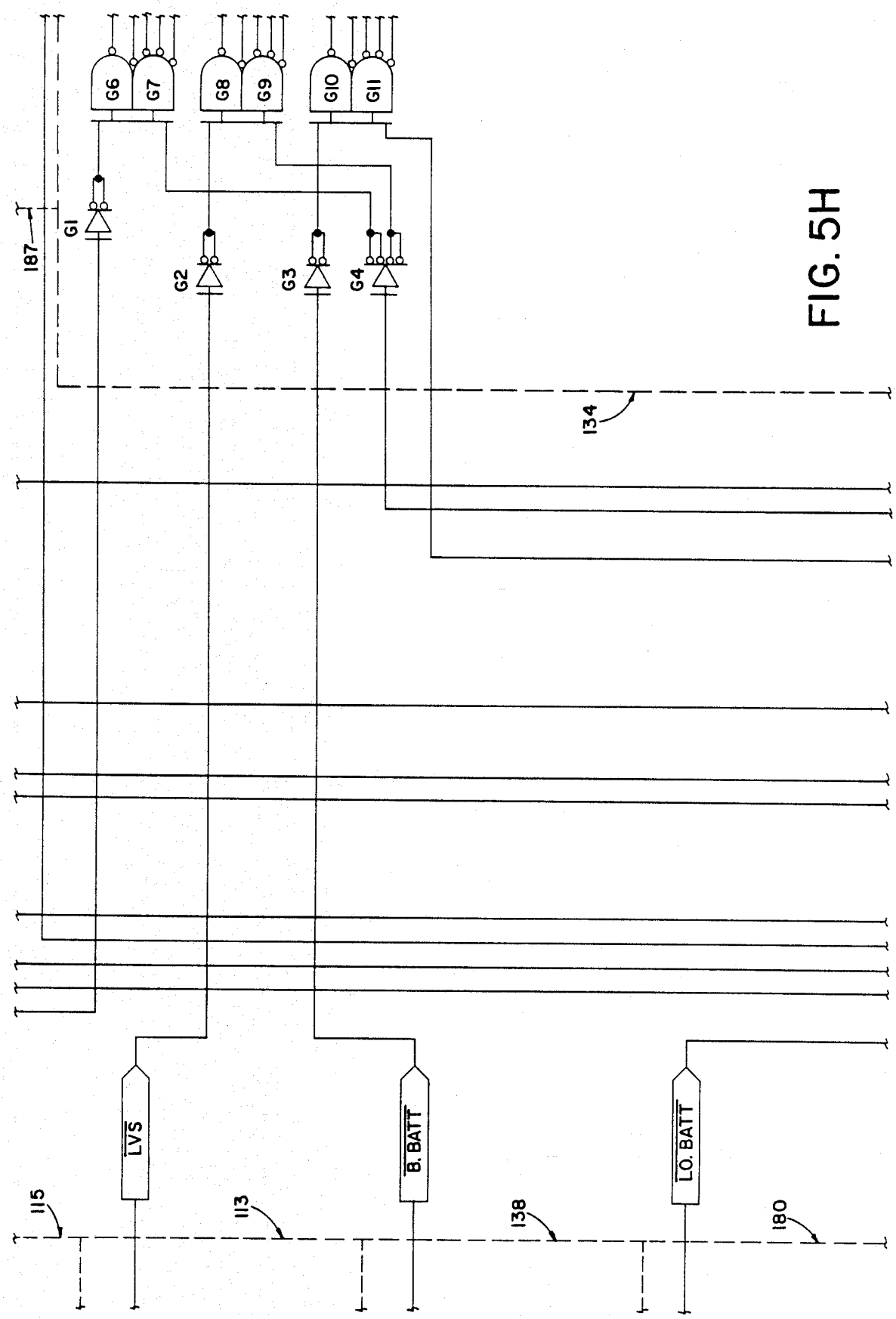
Figure 5I:
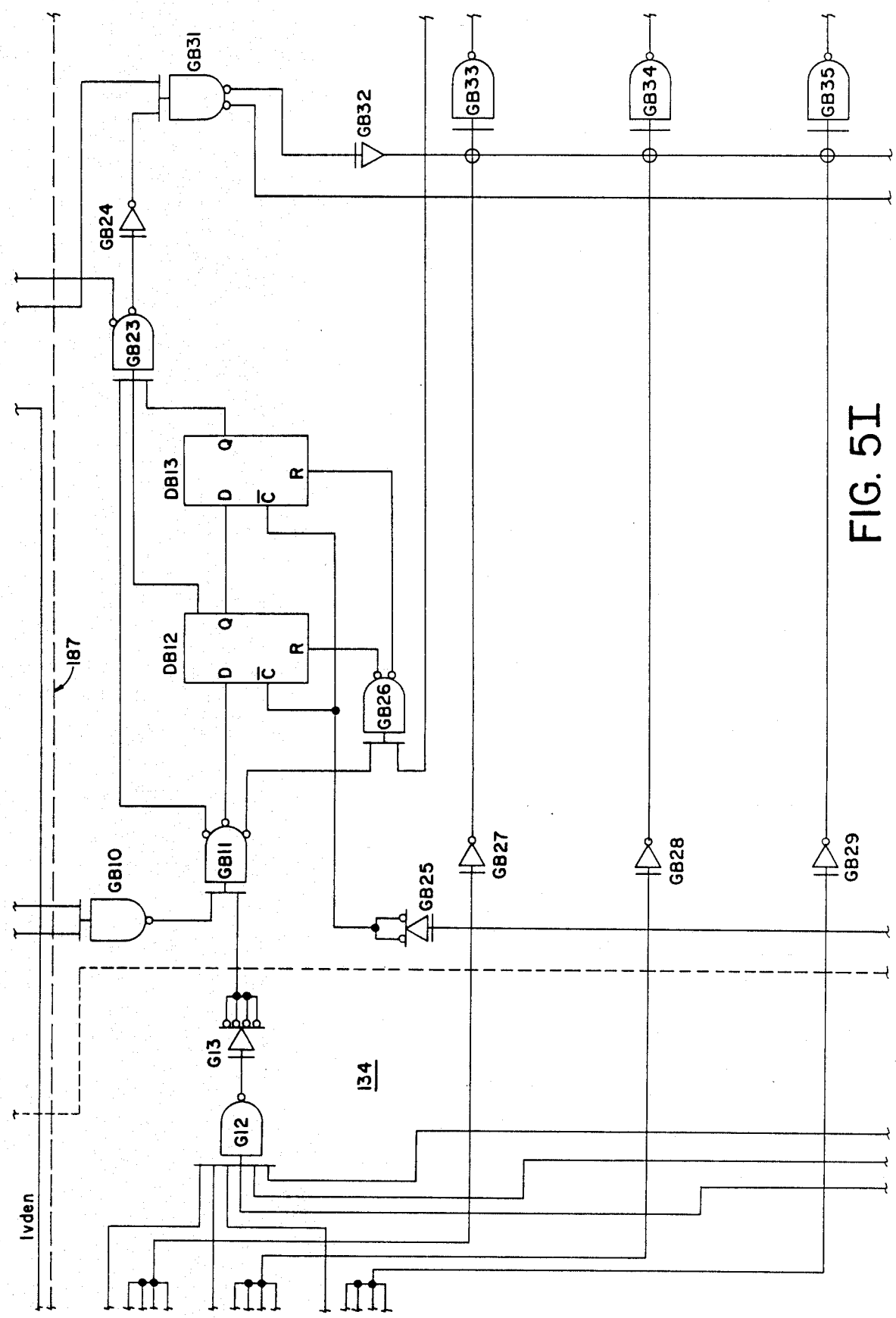
Figure 5J:
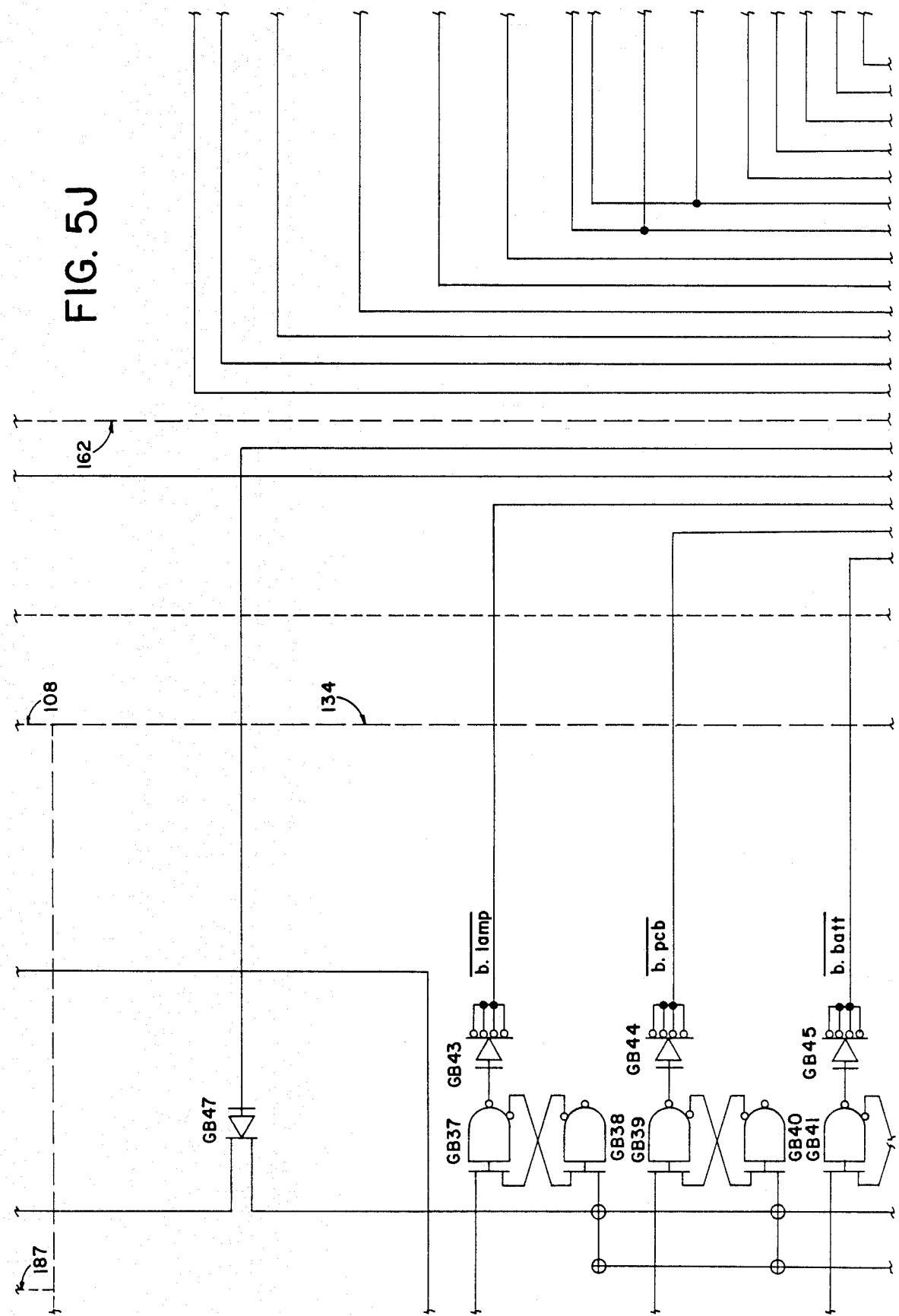
Figure 5K:
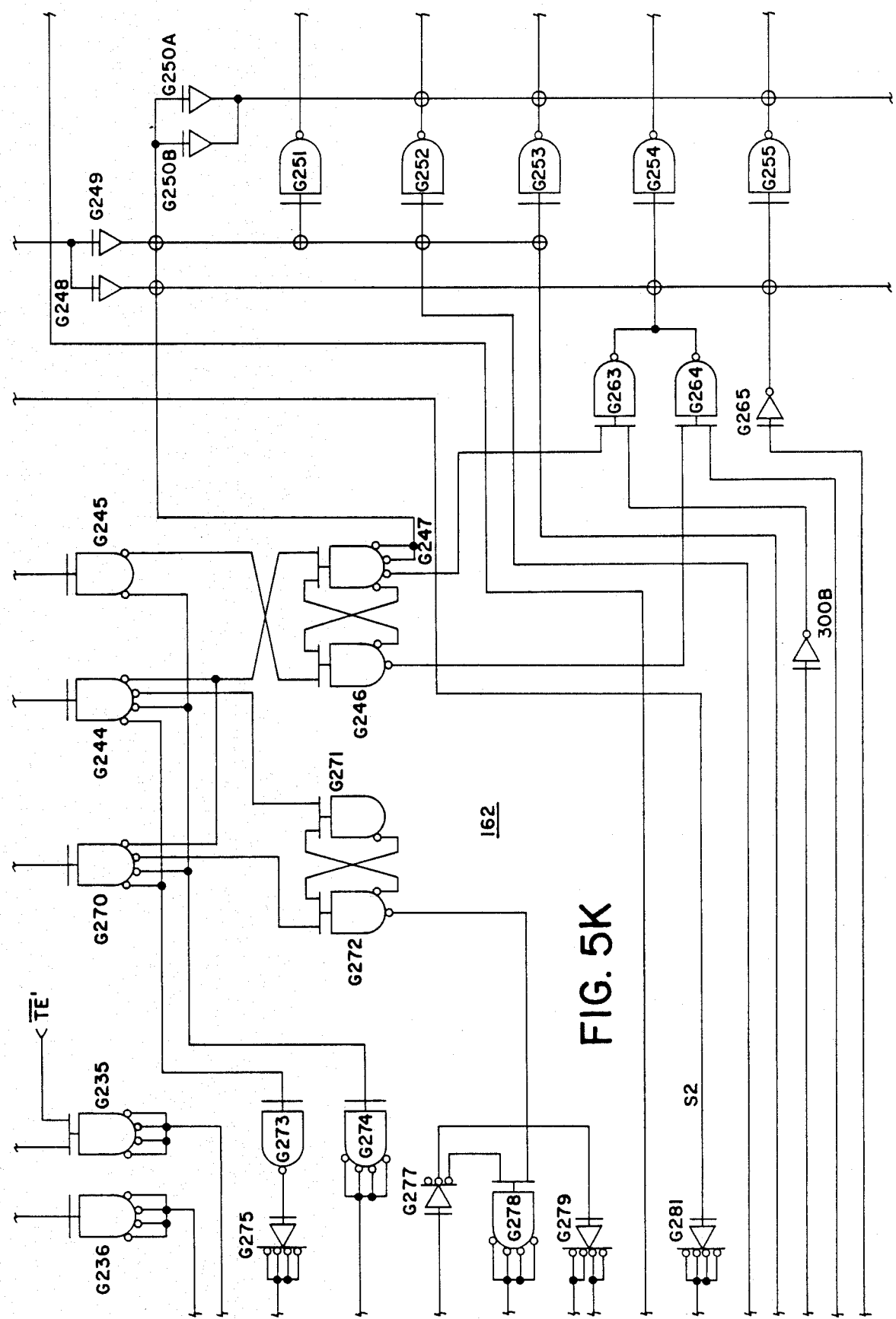
Figure 5L:
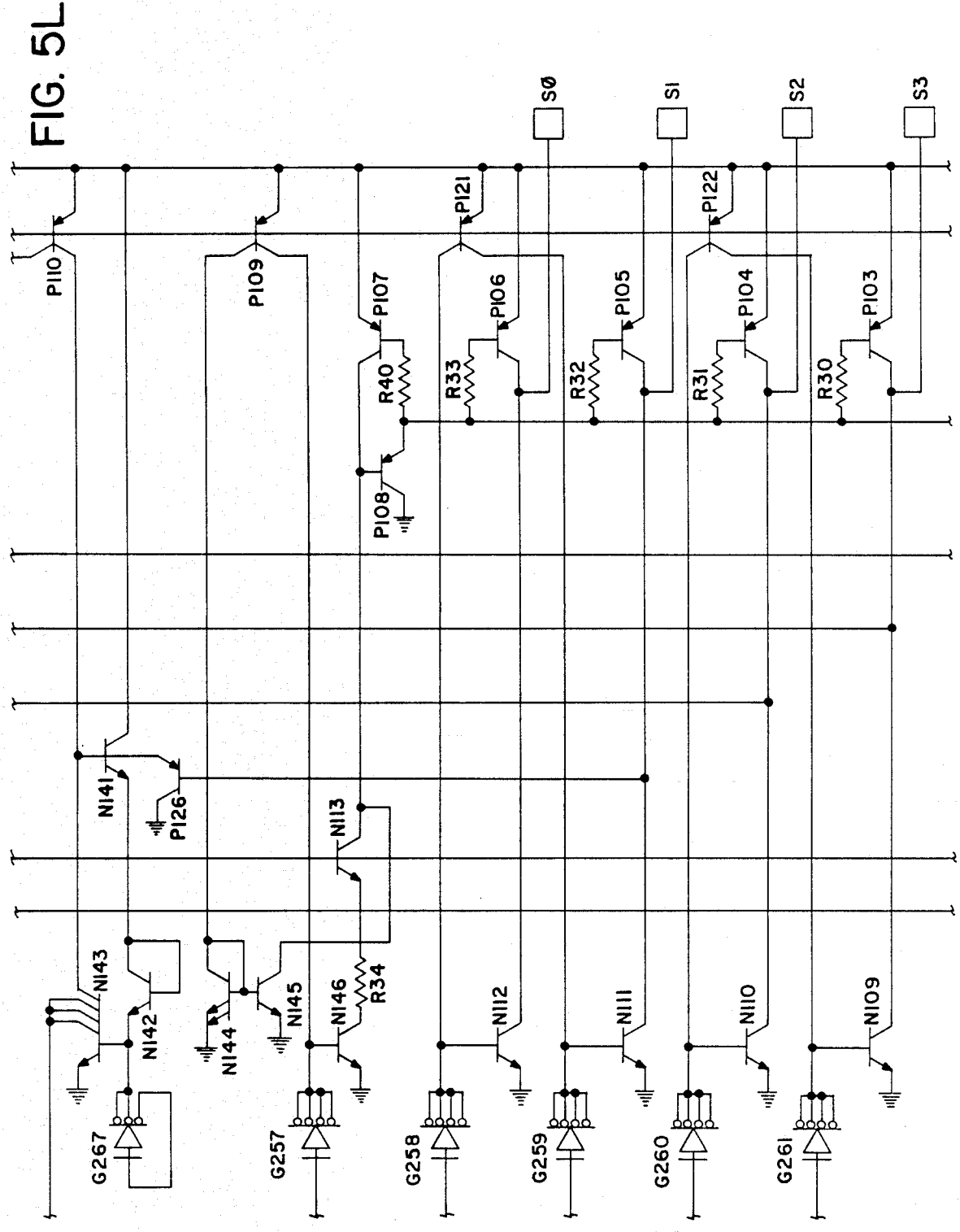
Figure 5M:
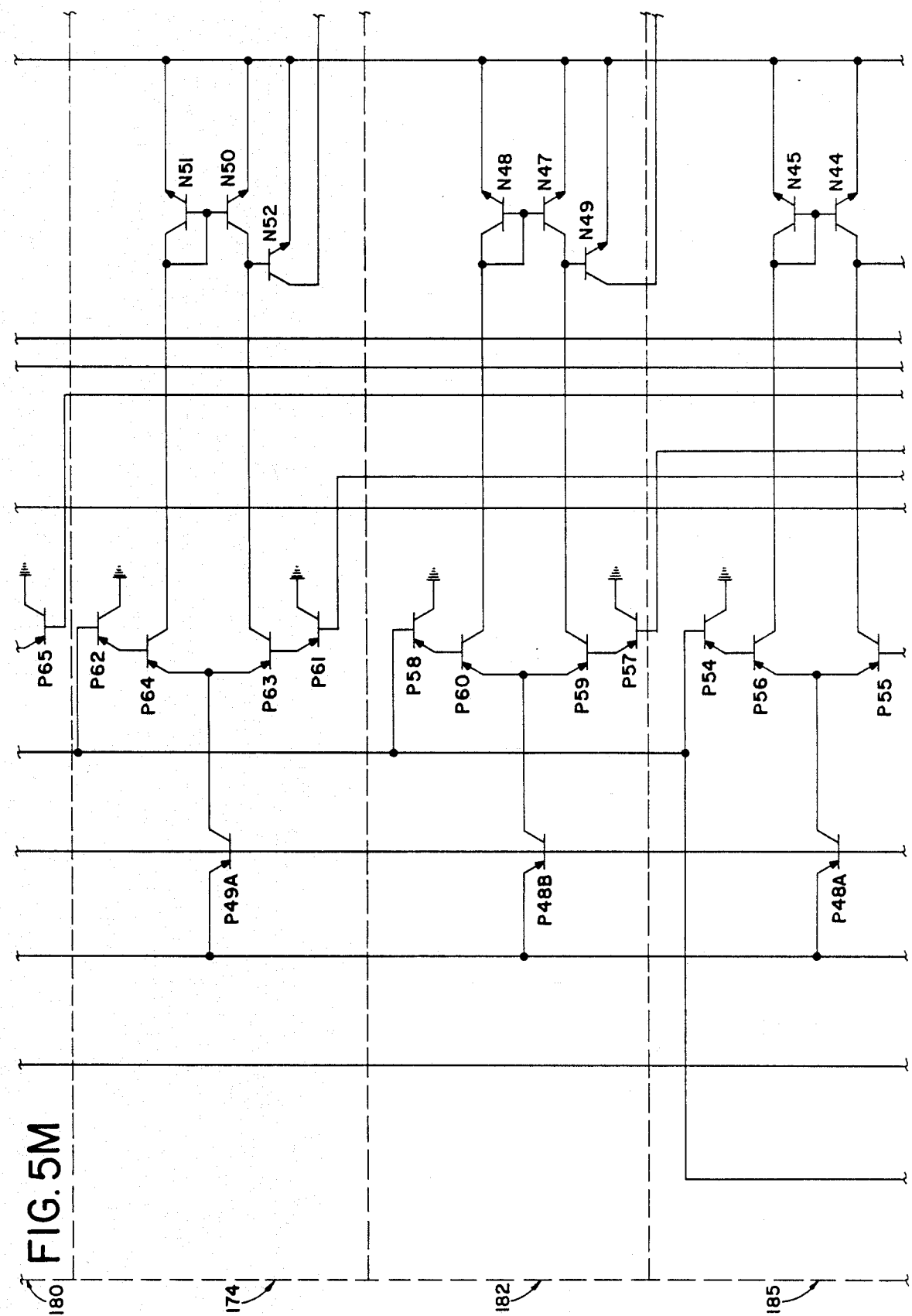
Figure 50:
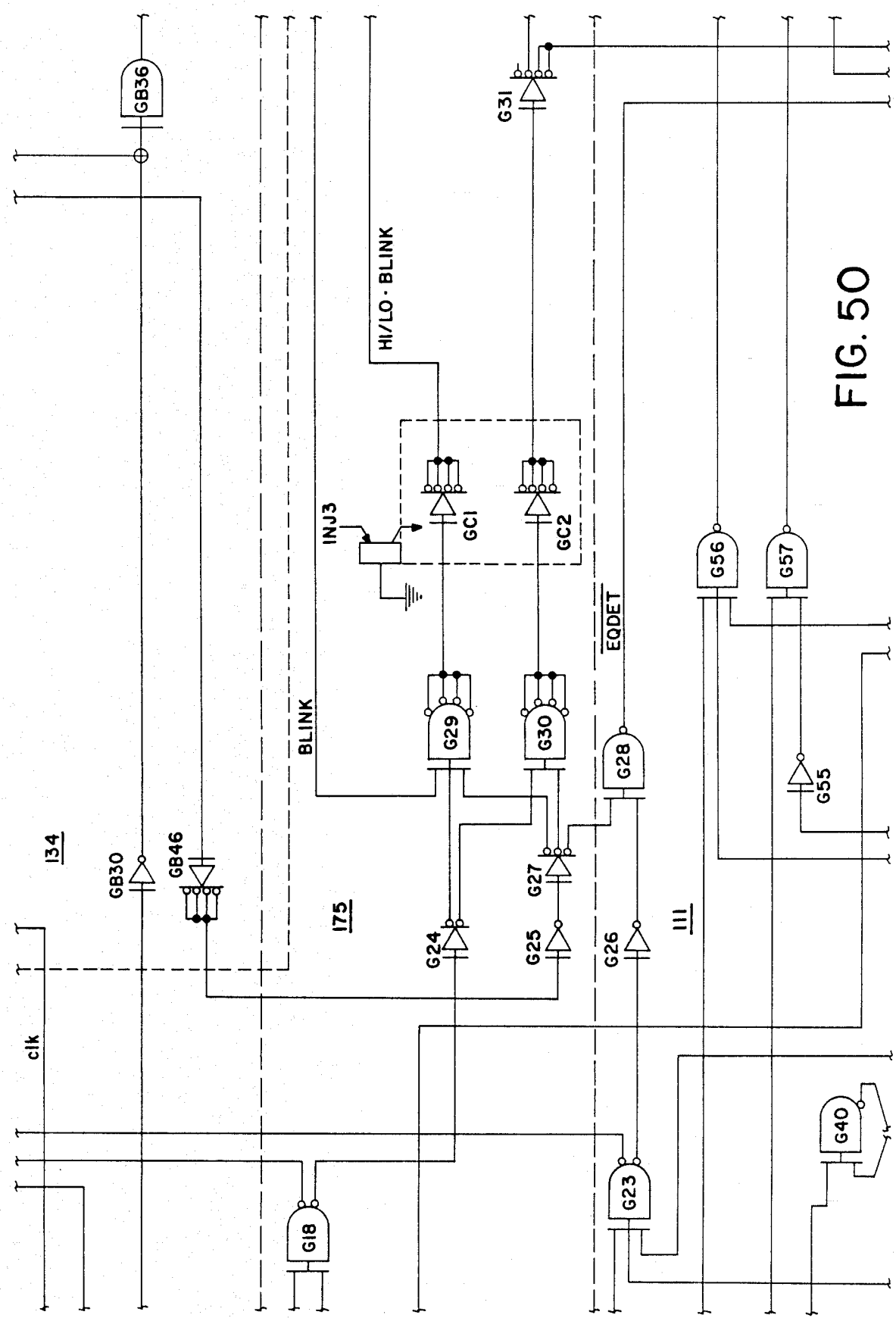
Figure 5P:
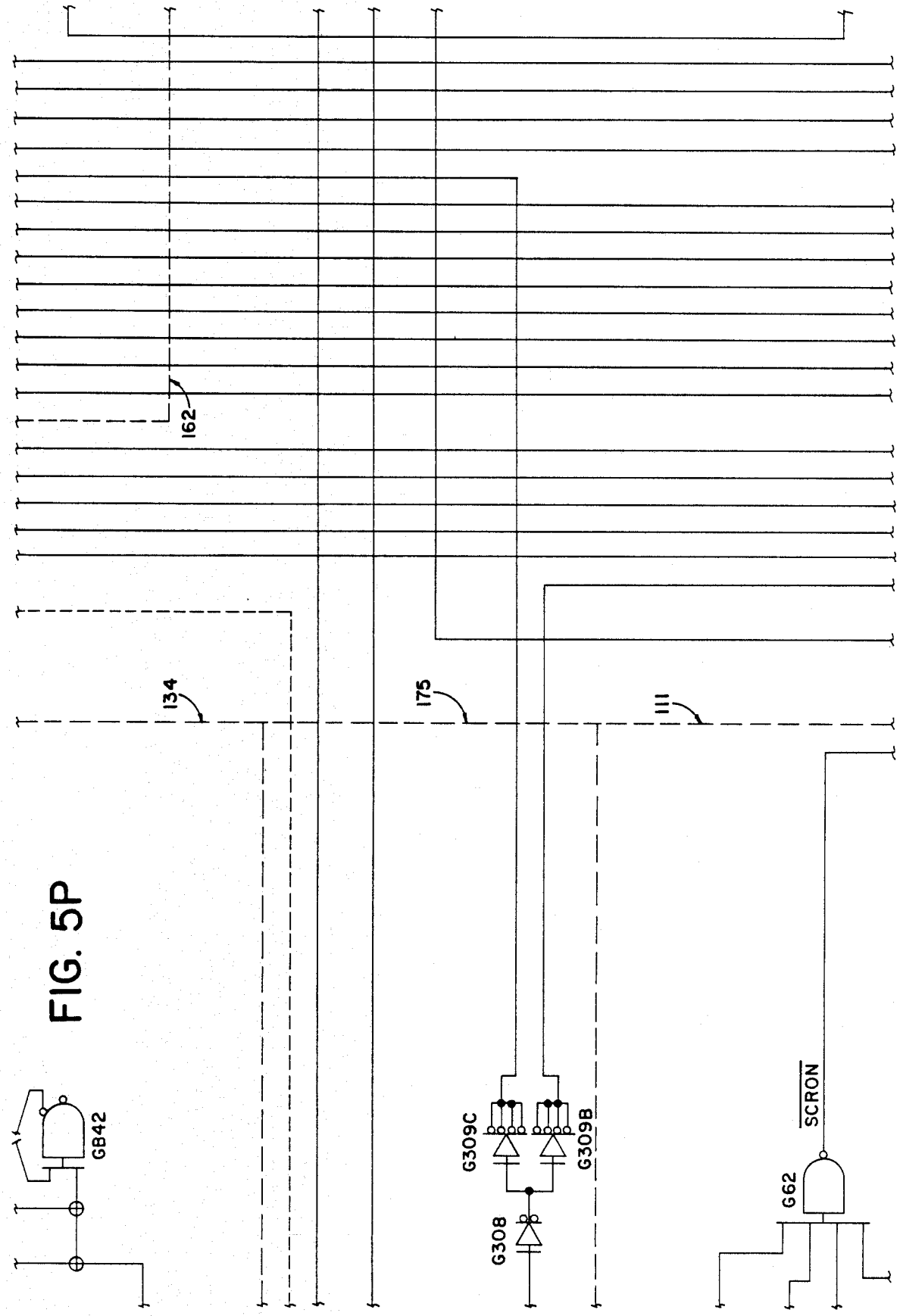
Figure 5Q:
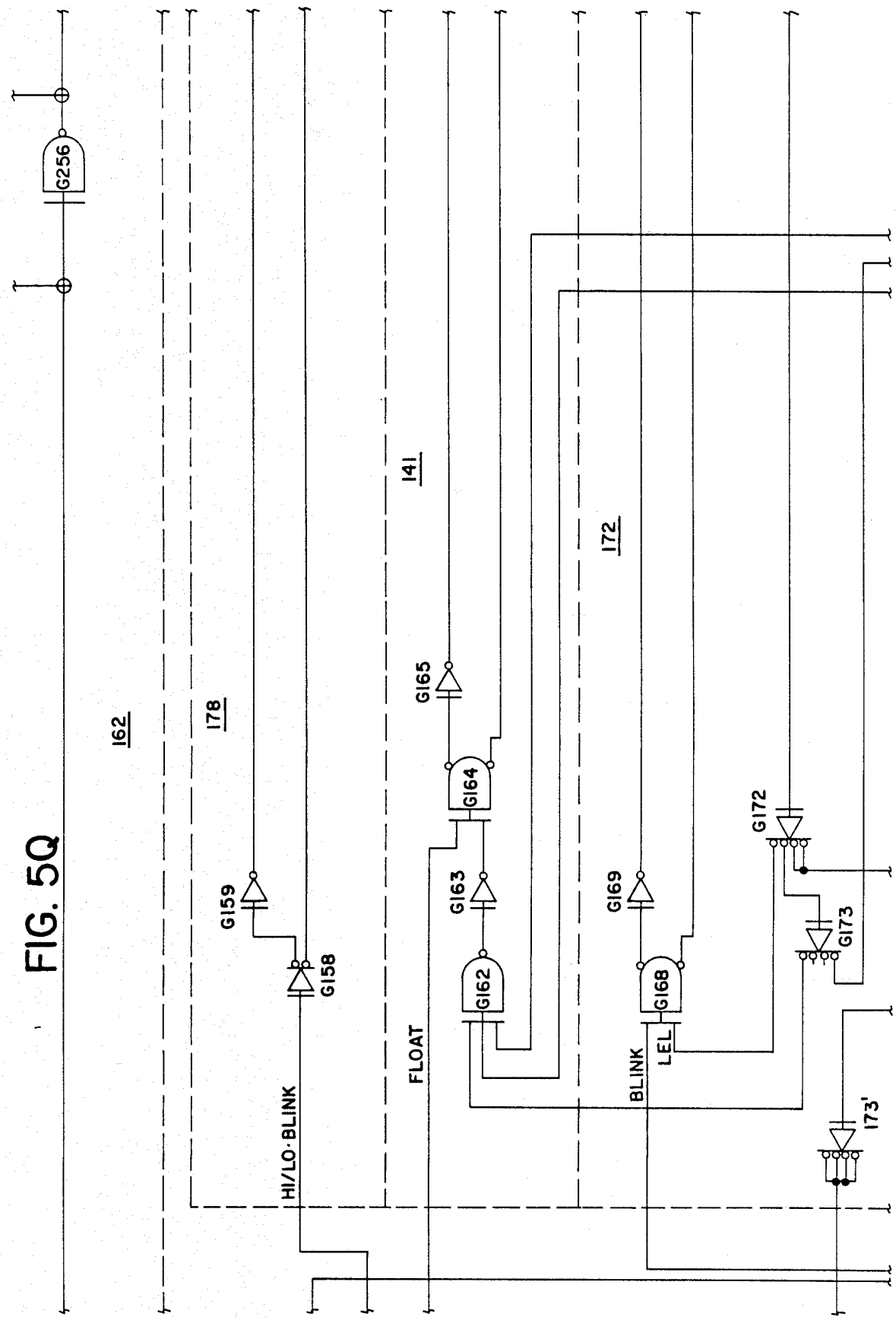
Figure 5R:
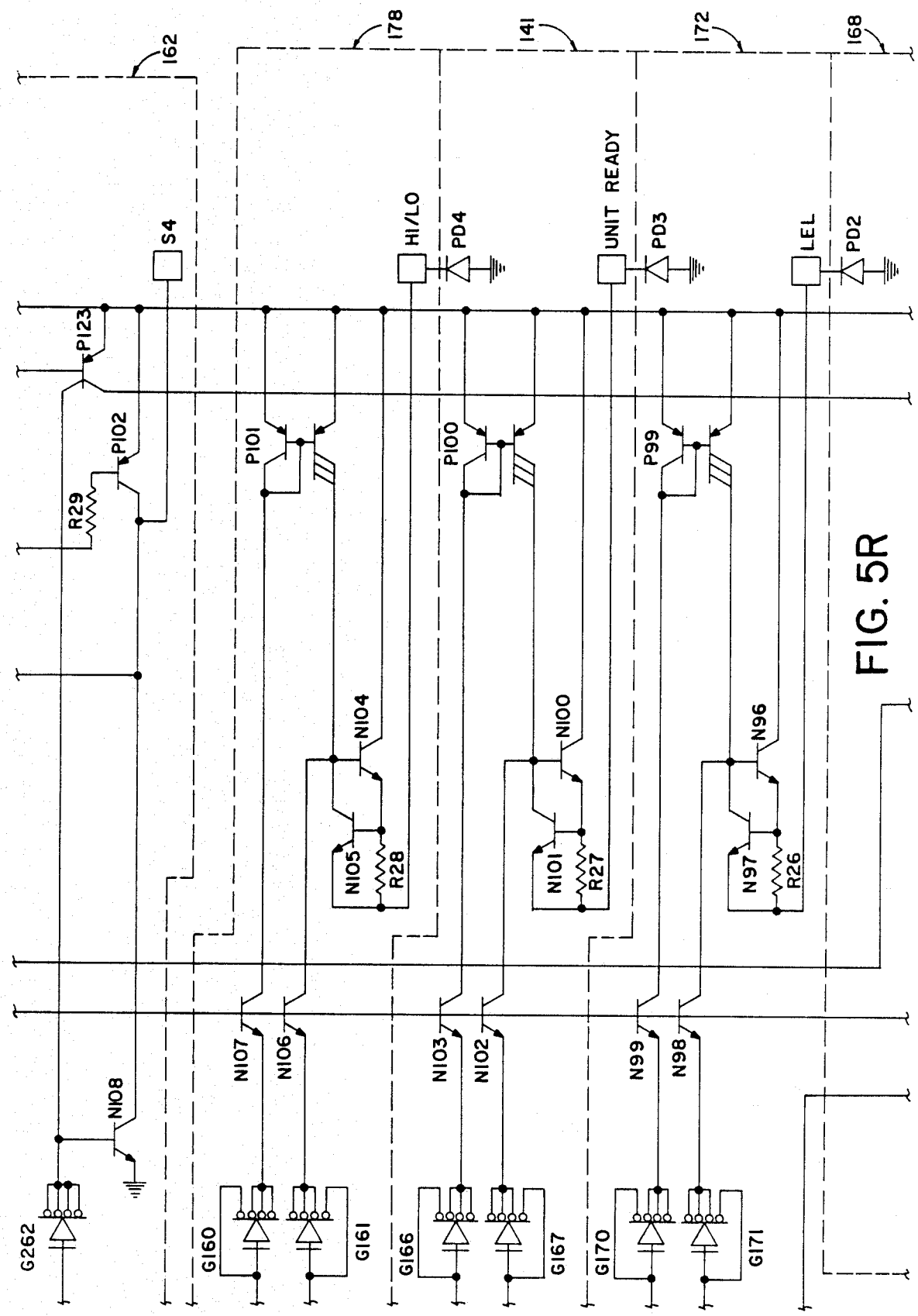
Figure 5S:
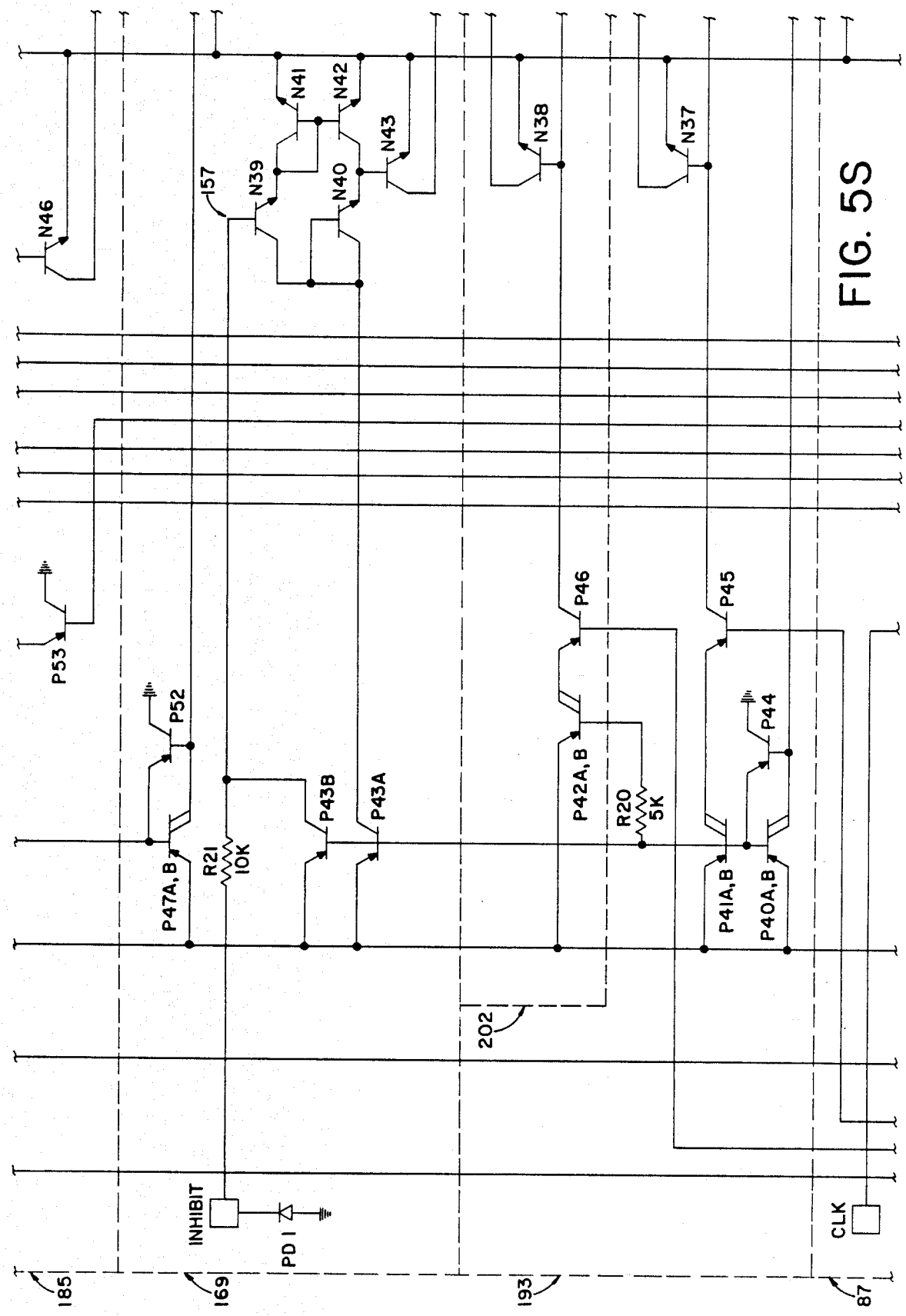
Figure 5T:
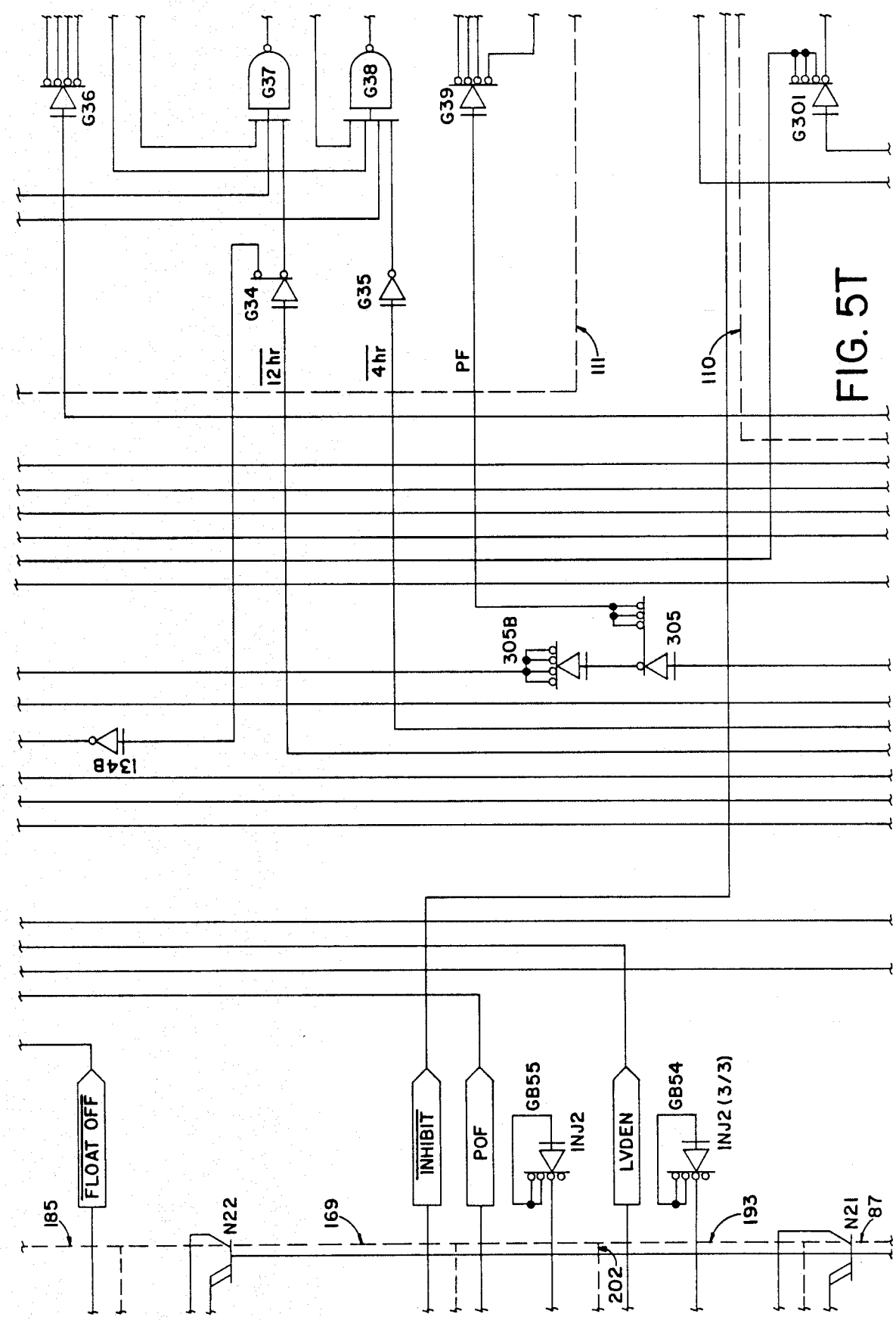
Figure 5U:
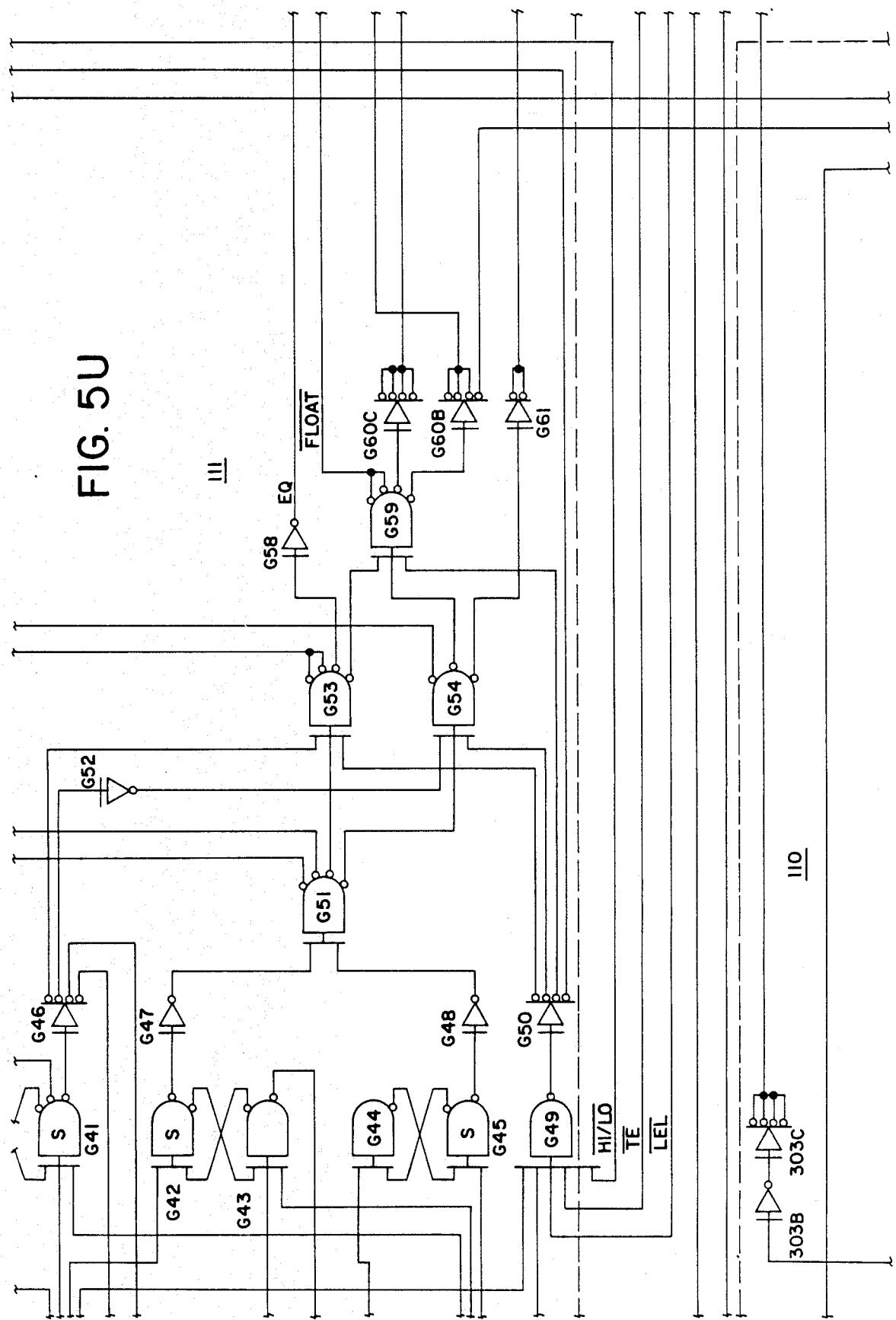
Figure 5V:
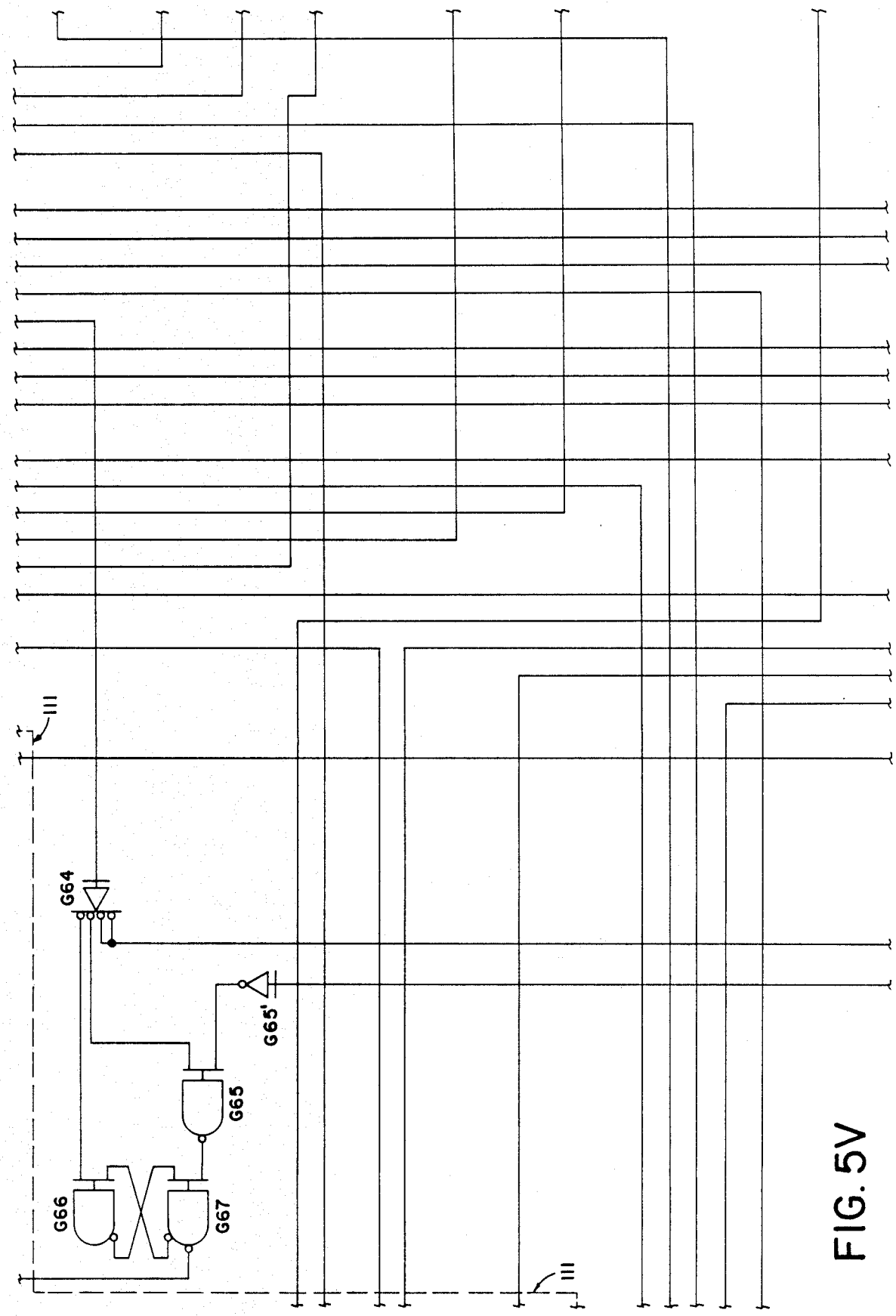
Figure 5W:
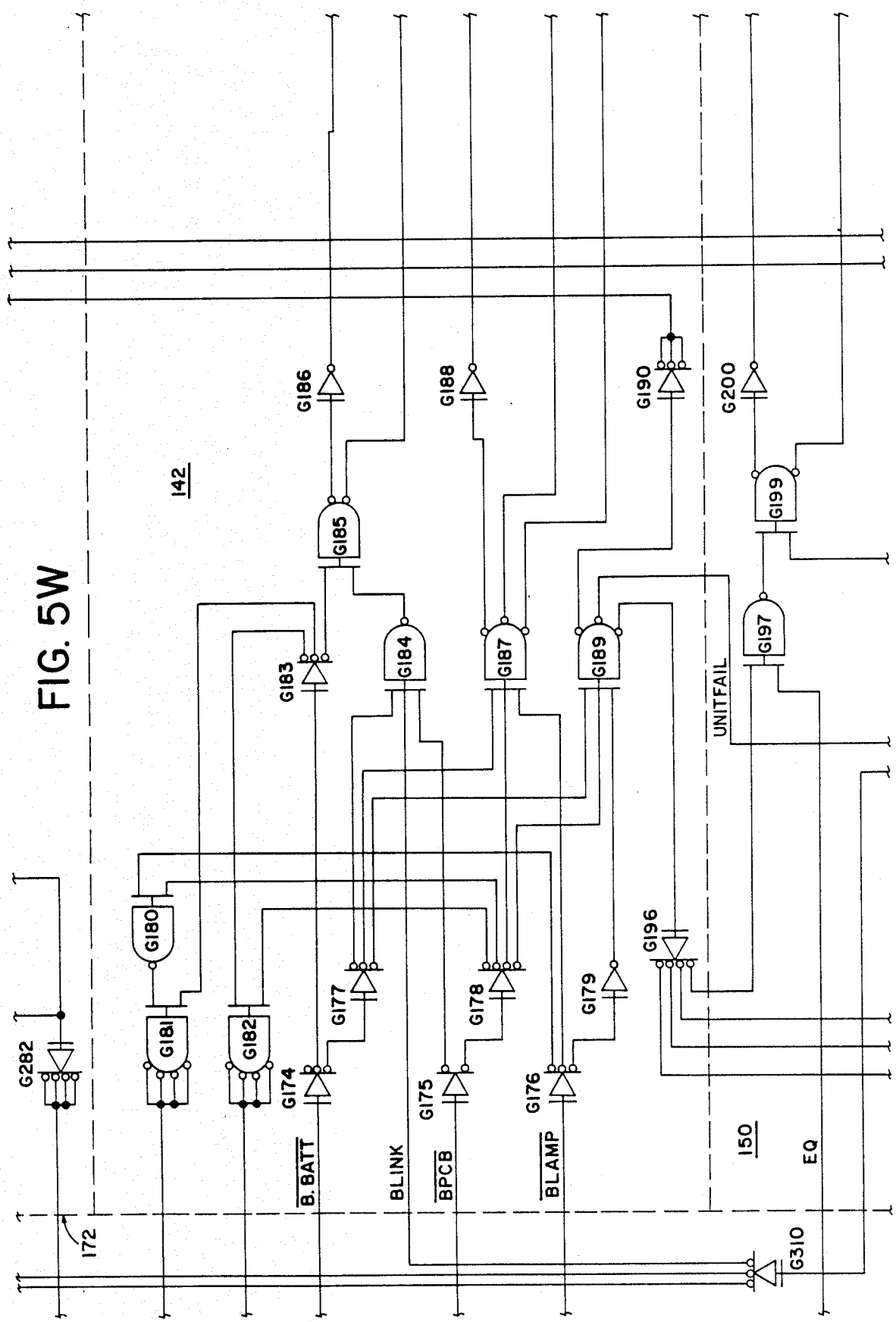
Figure 5Z:
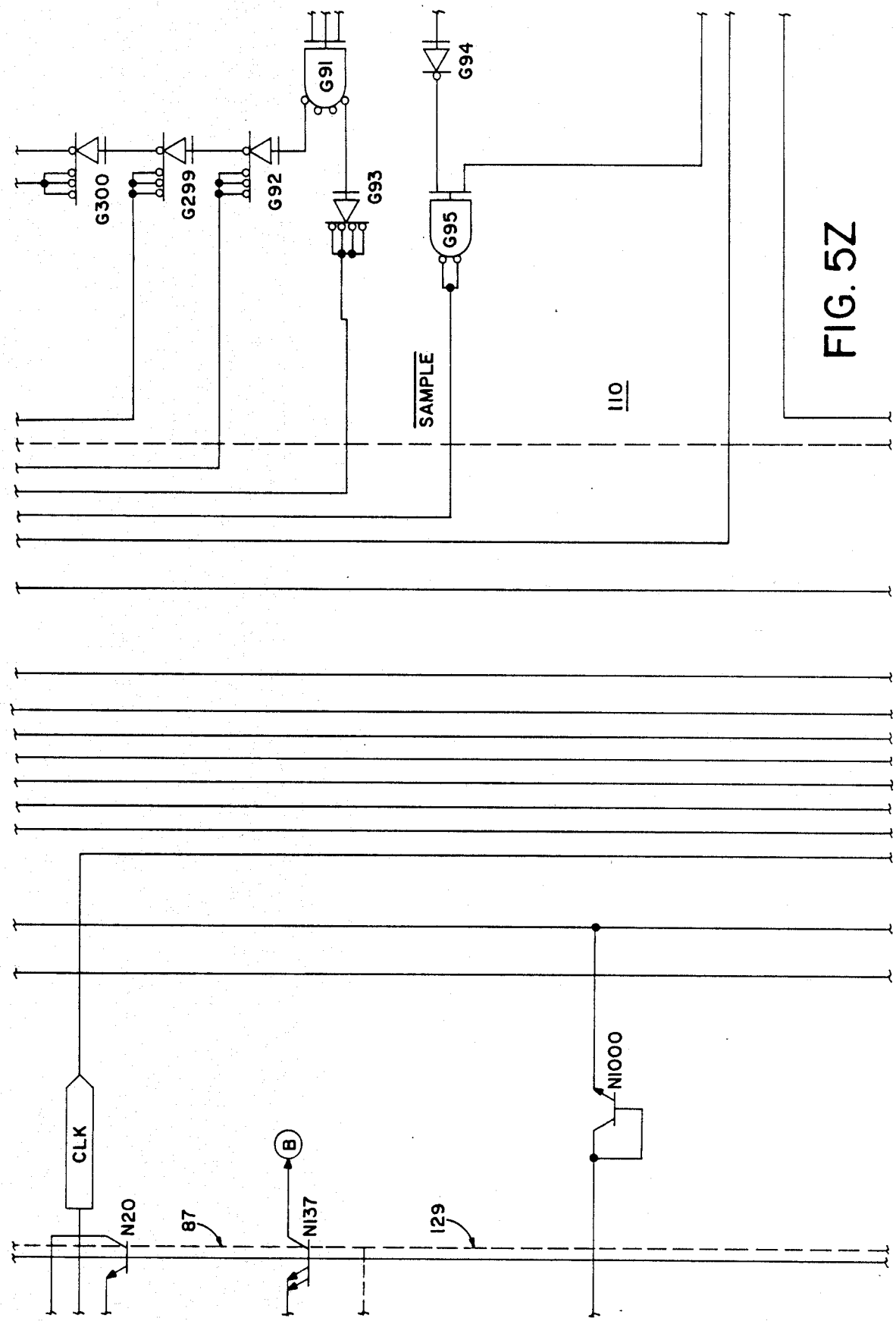
Figure 5A:
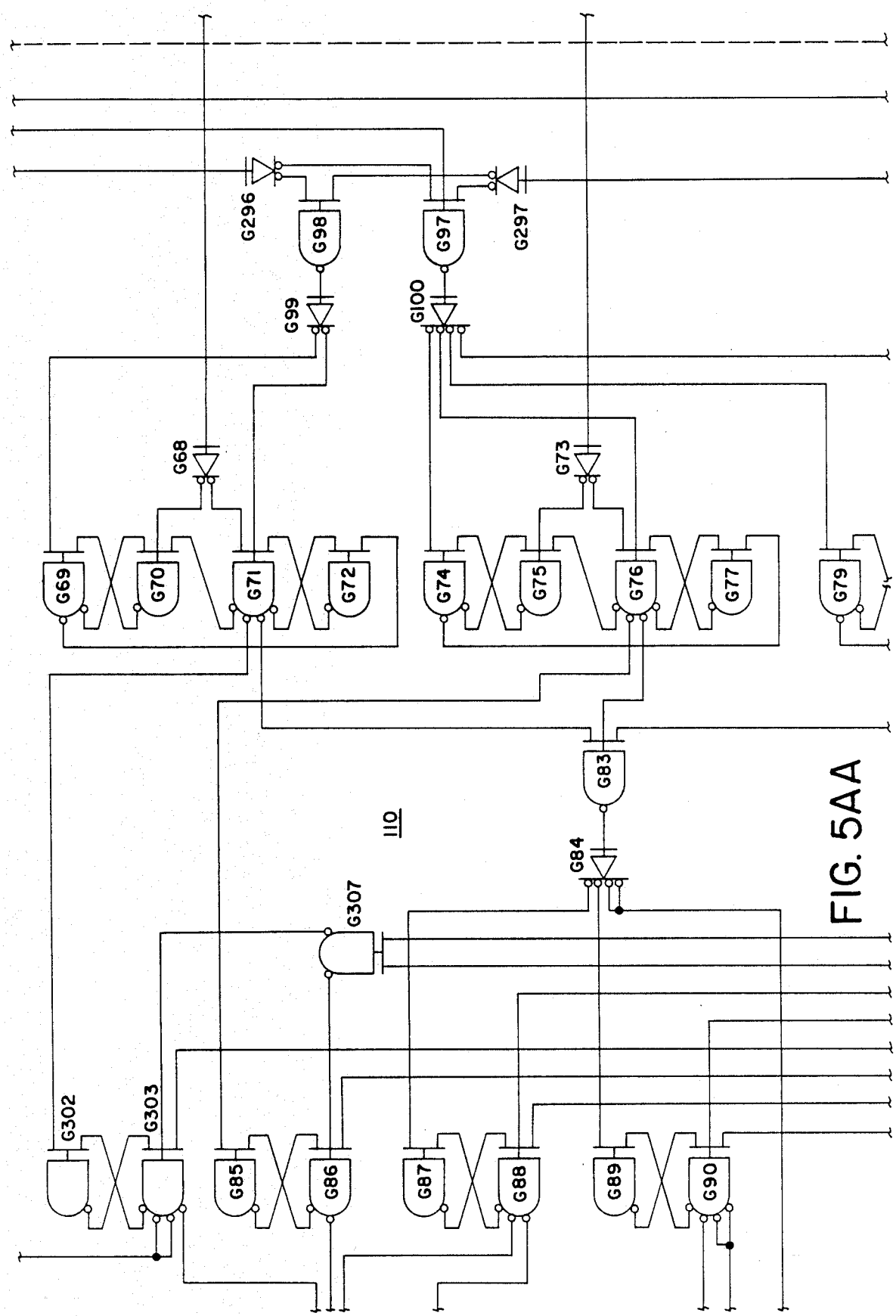
Figure 5A:
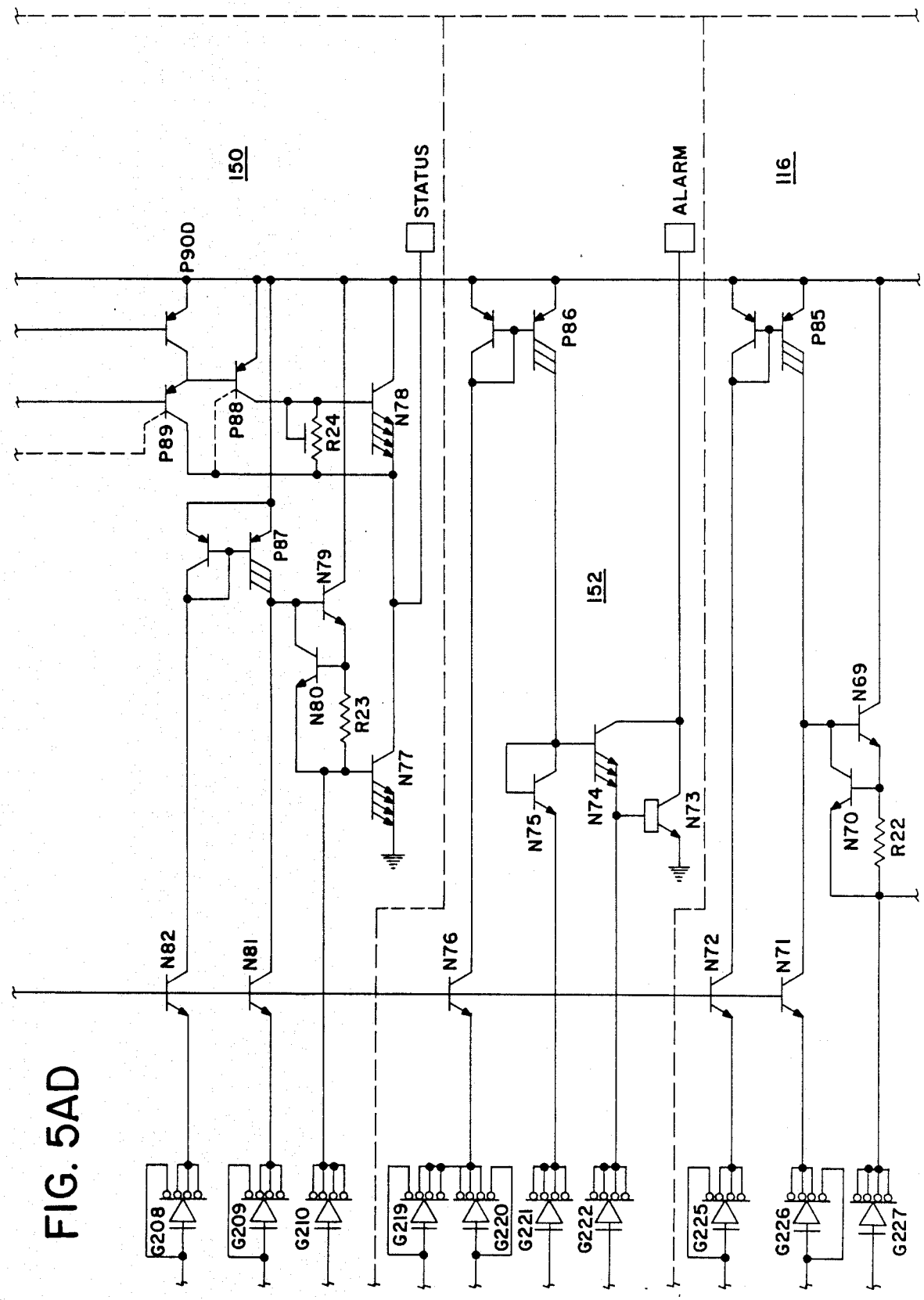
Figure 5A:
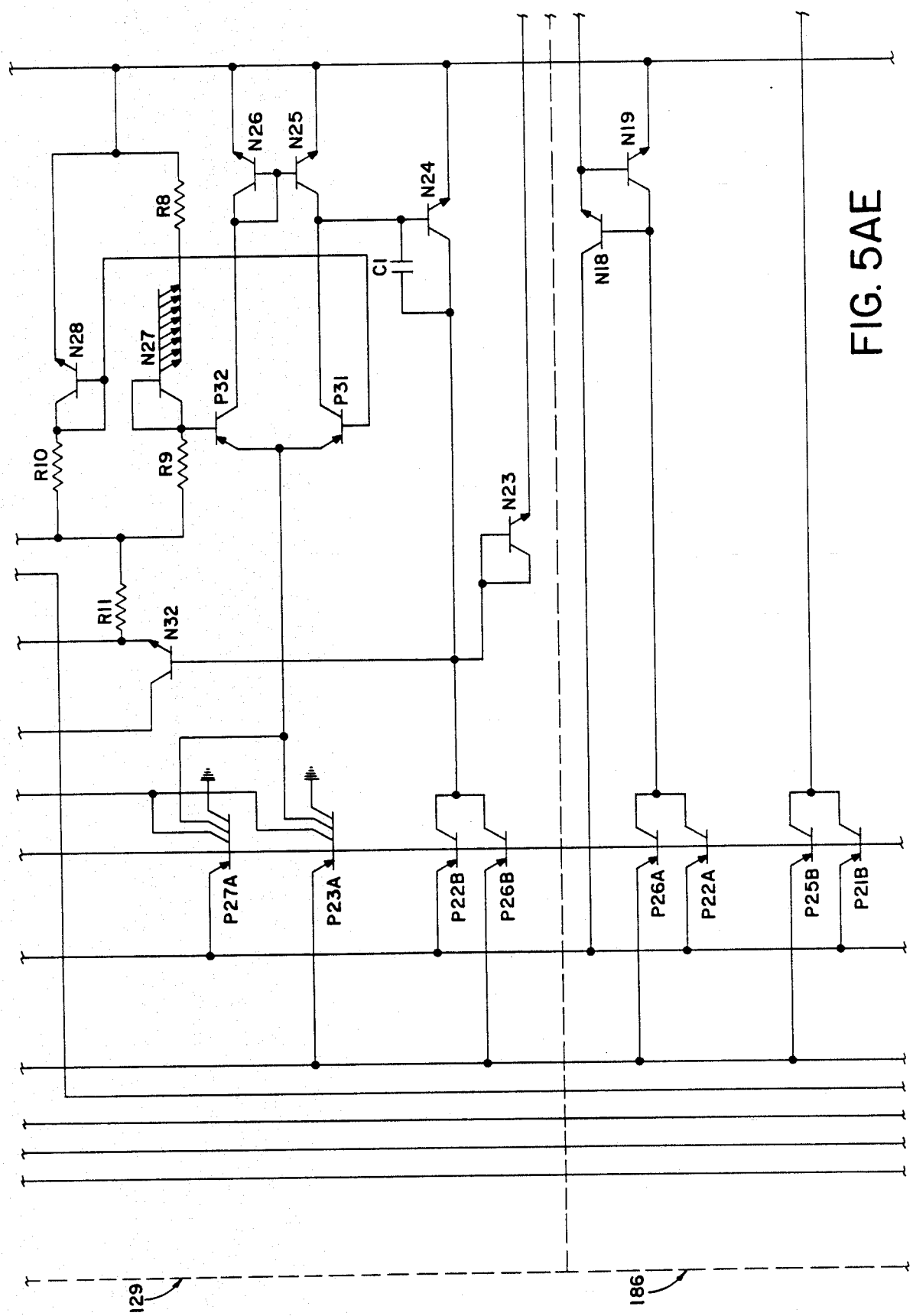
Figure 5A:
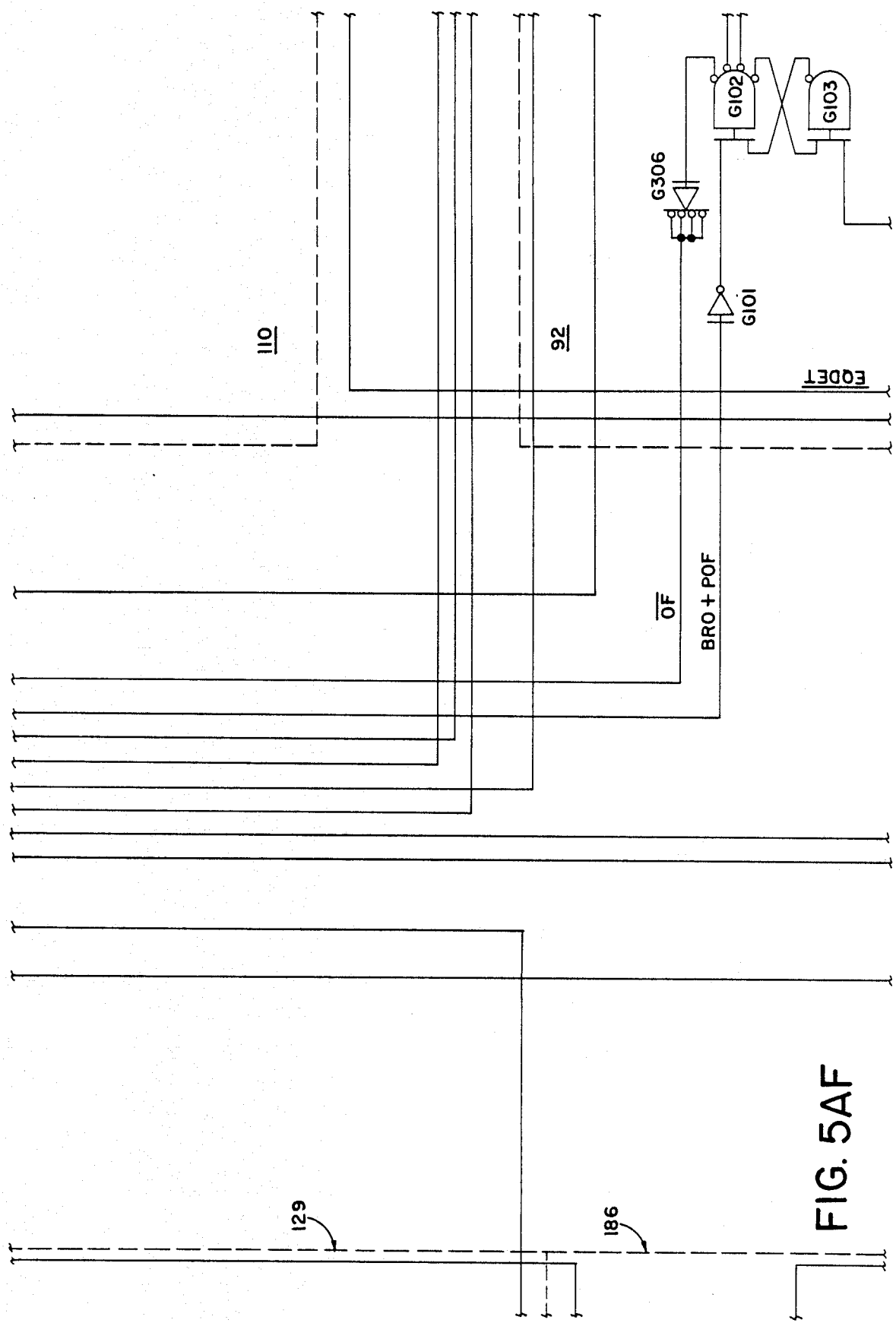
Figure 5A:
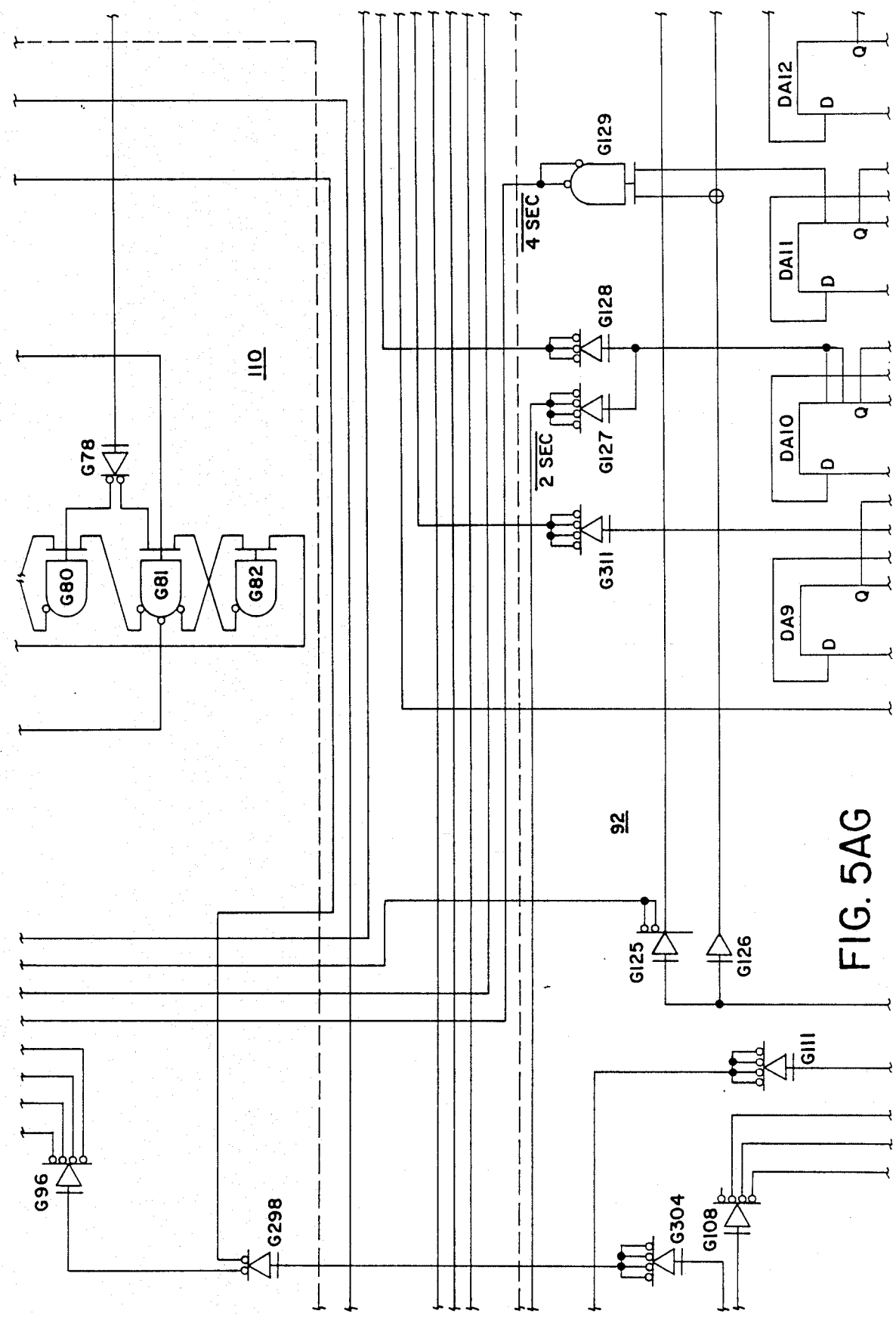
Figure 5A:
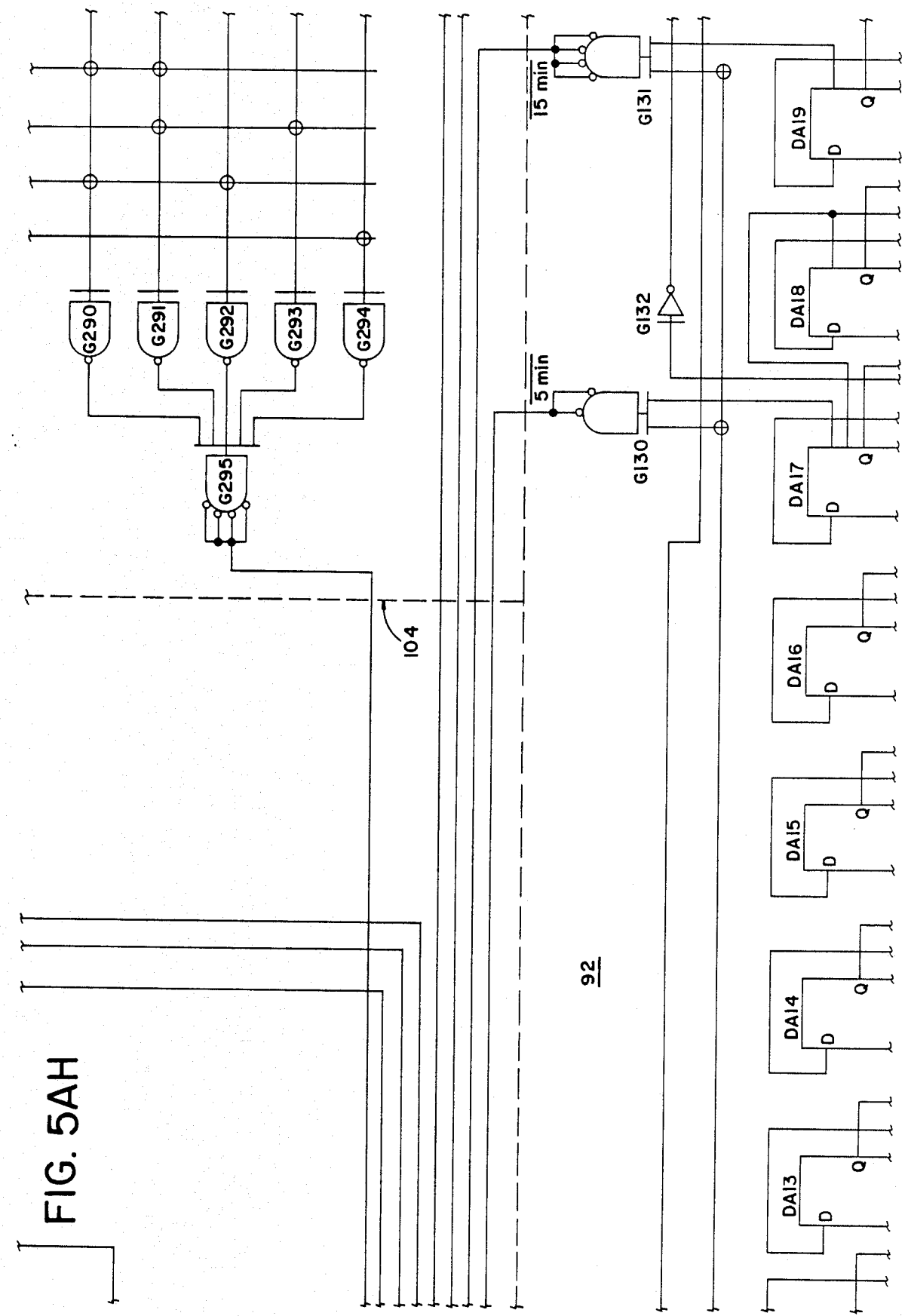
Figure 5A:
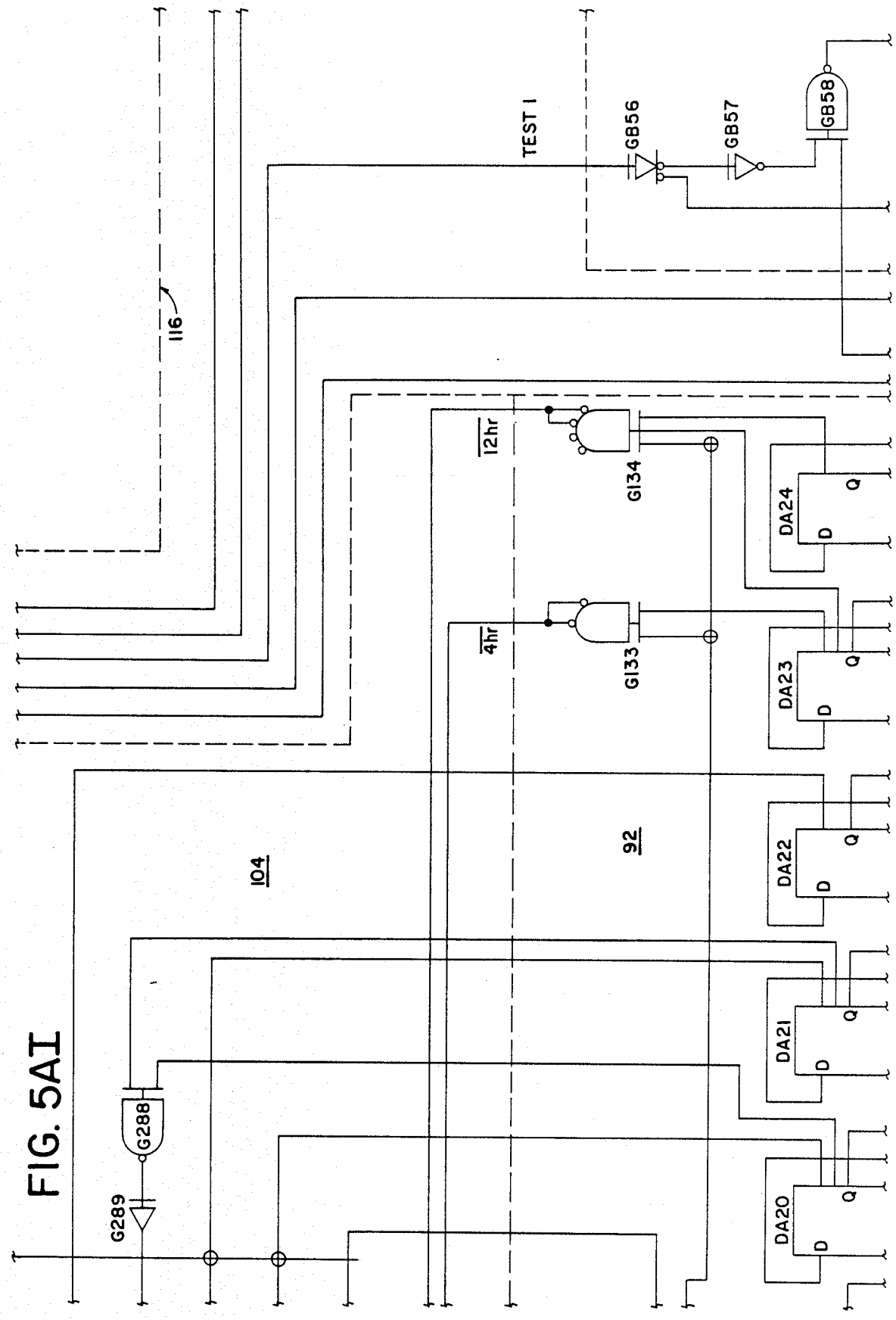
Figure 5A:
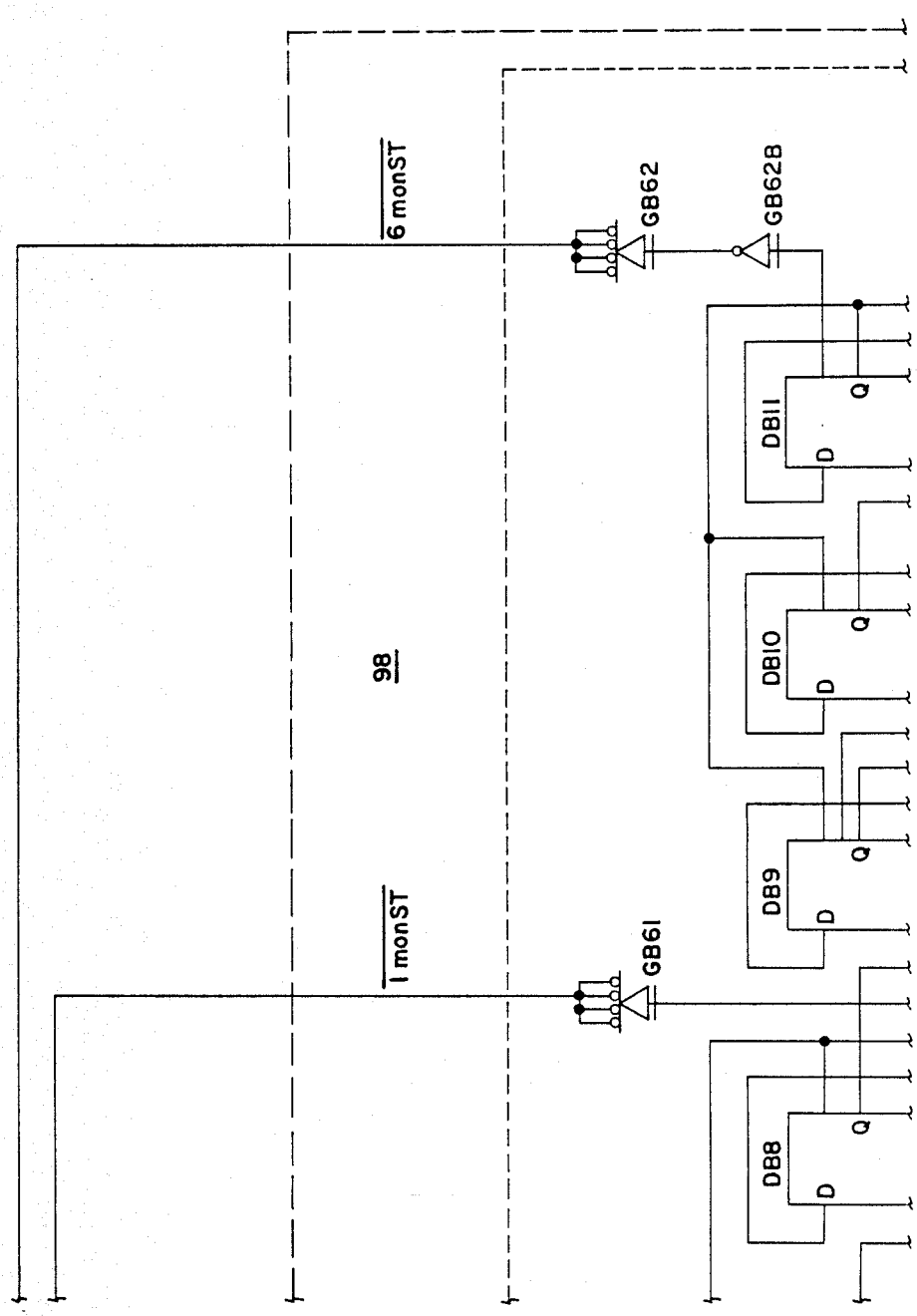
Figure 5A:
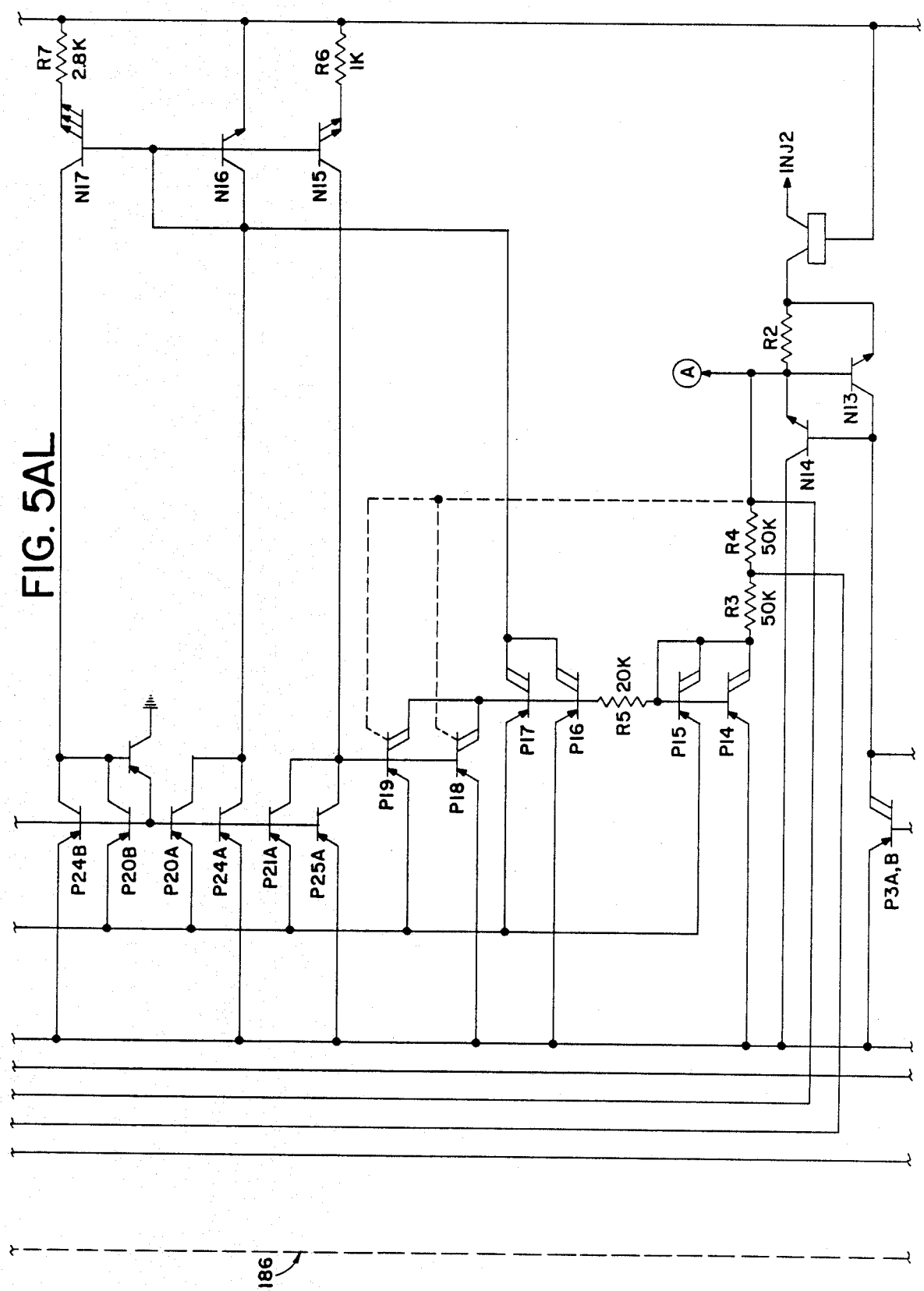
Figure 5A:
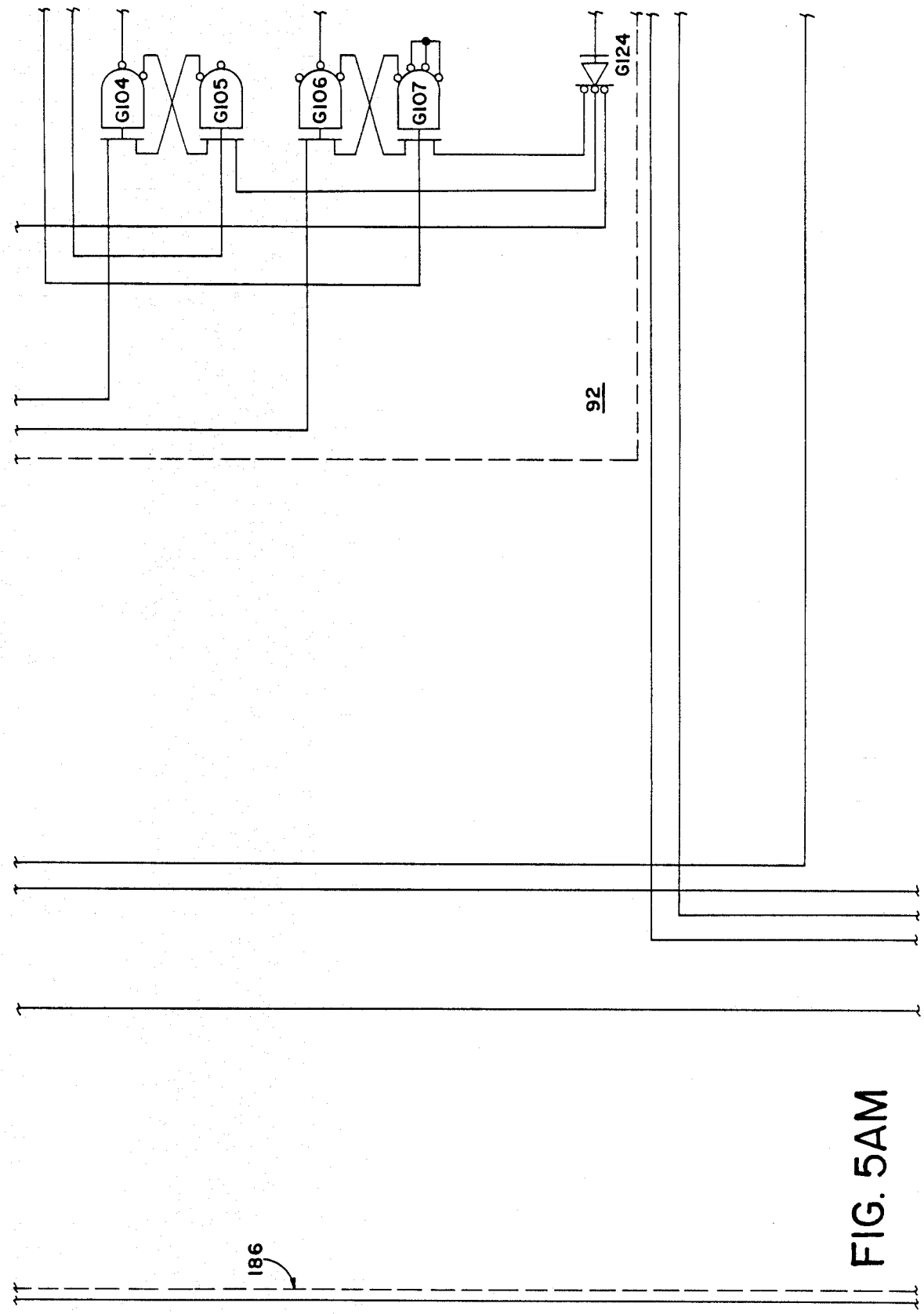
Figure 5A:
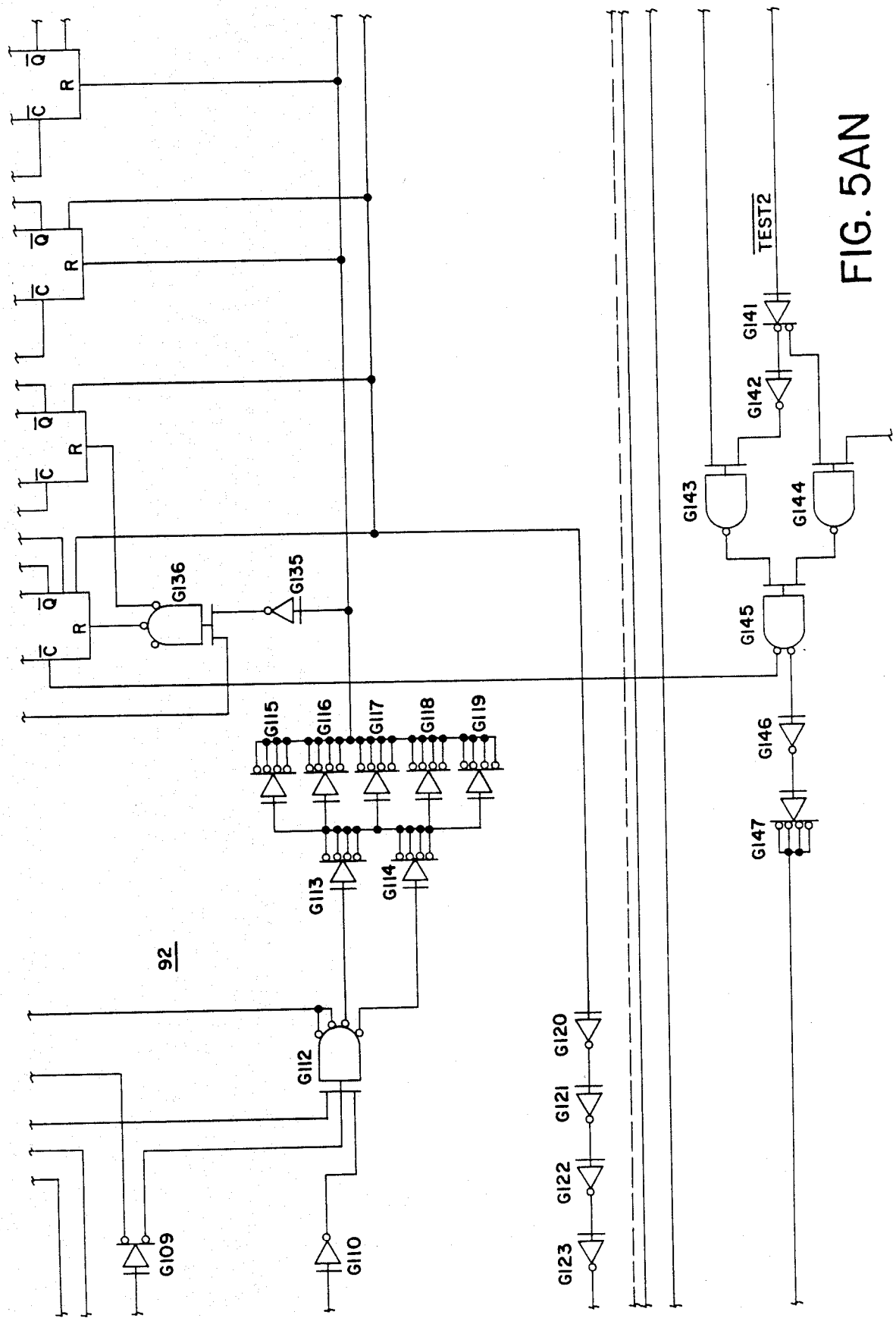
Figure 5A:
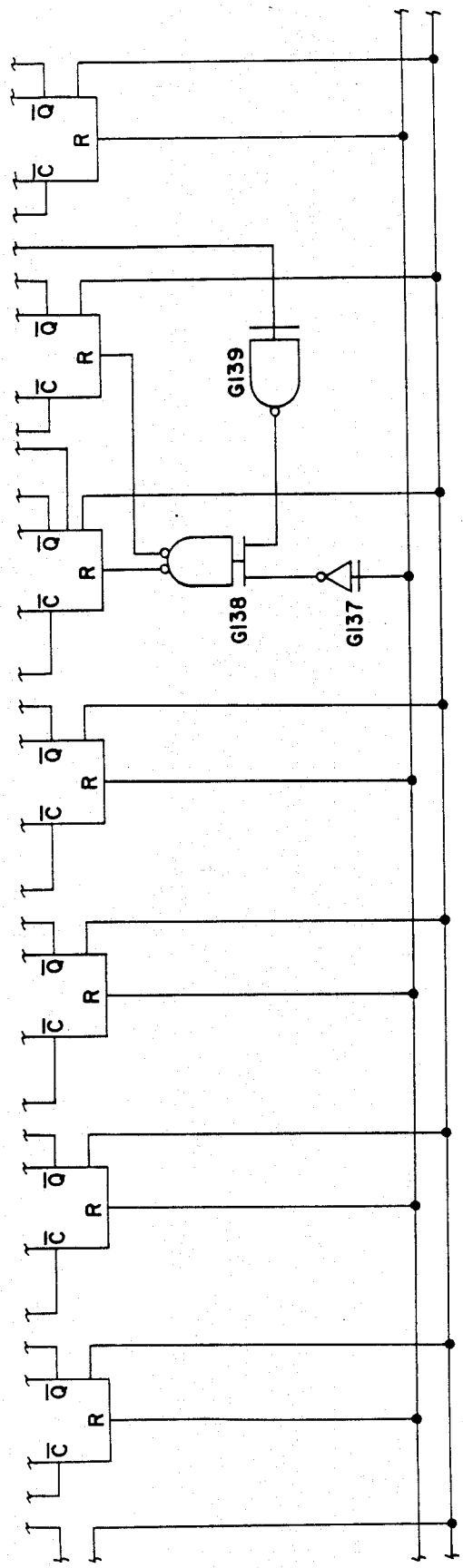
Figure 5A:
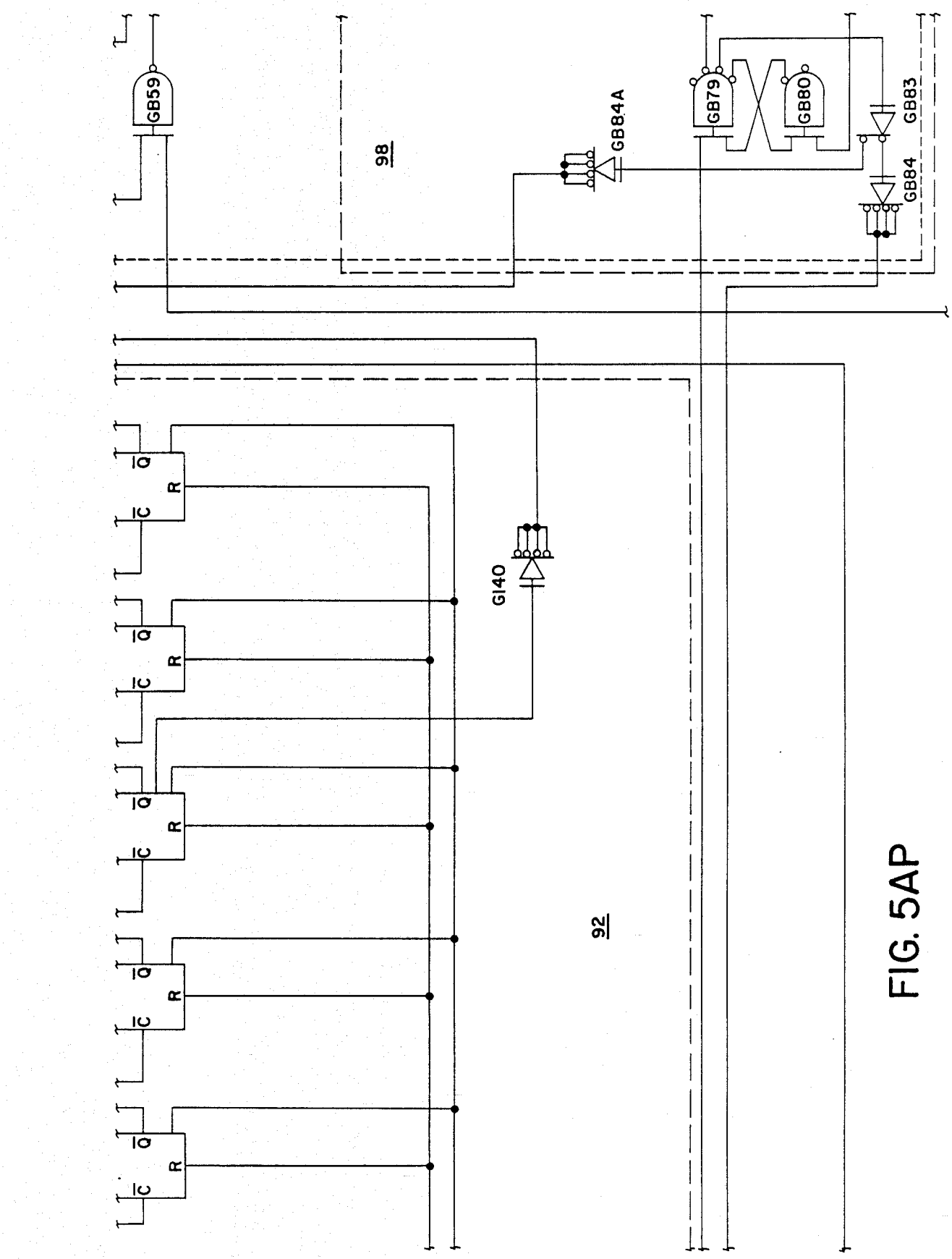
Figure 5A:
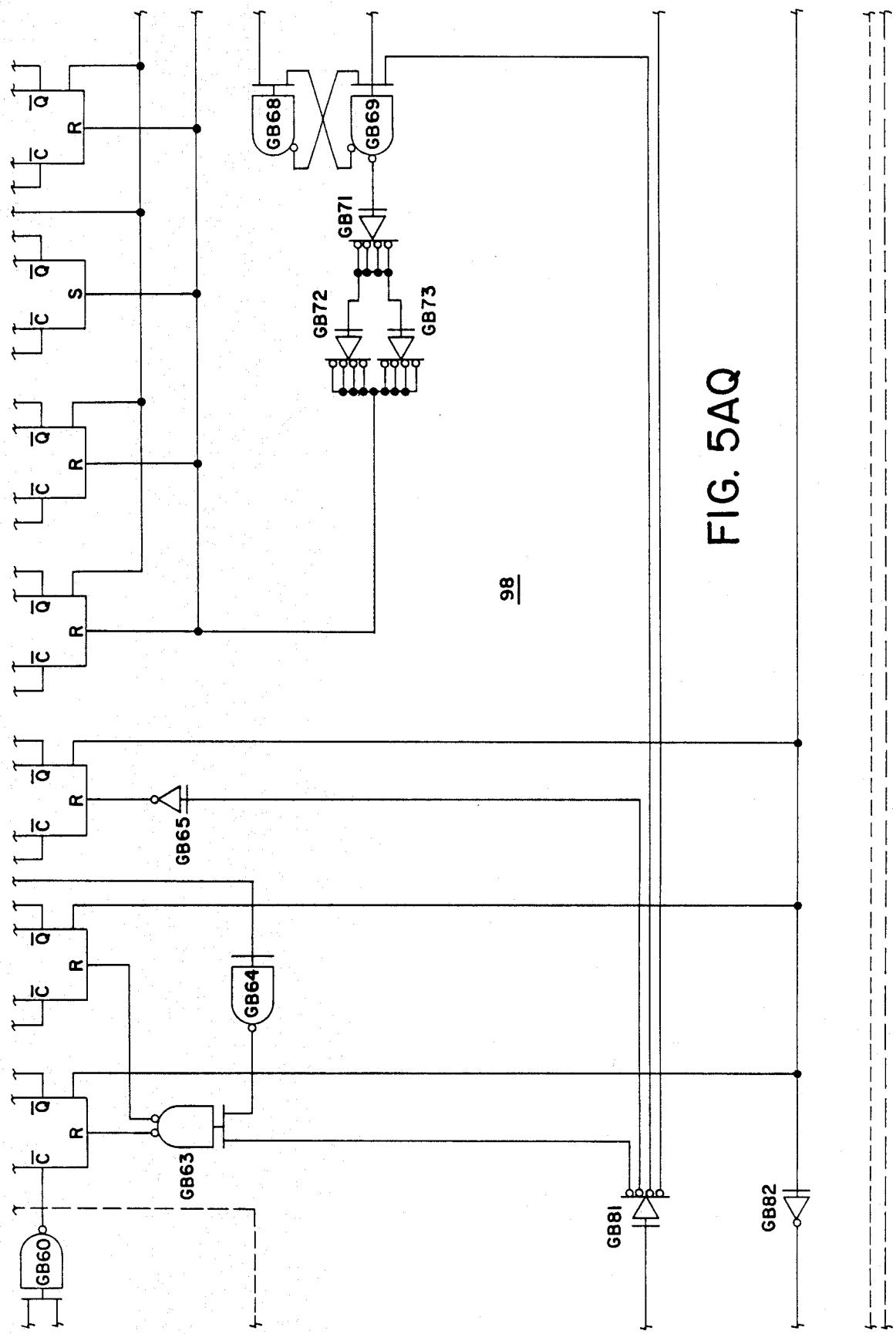
Figure 5A:
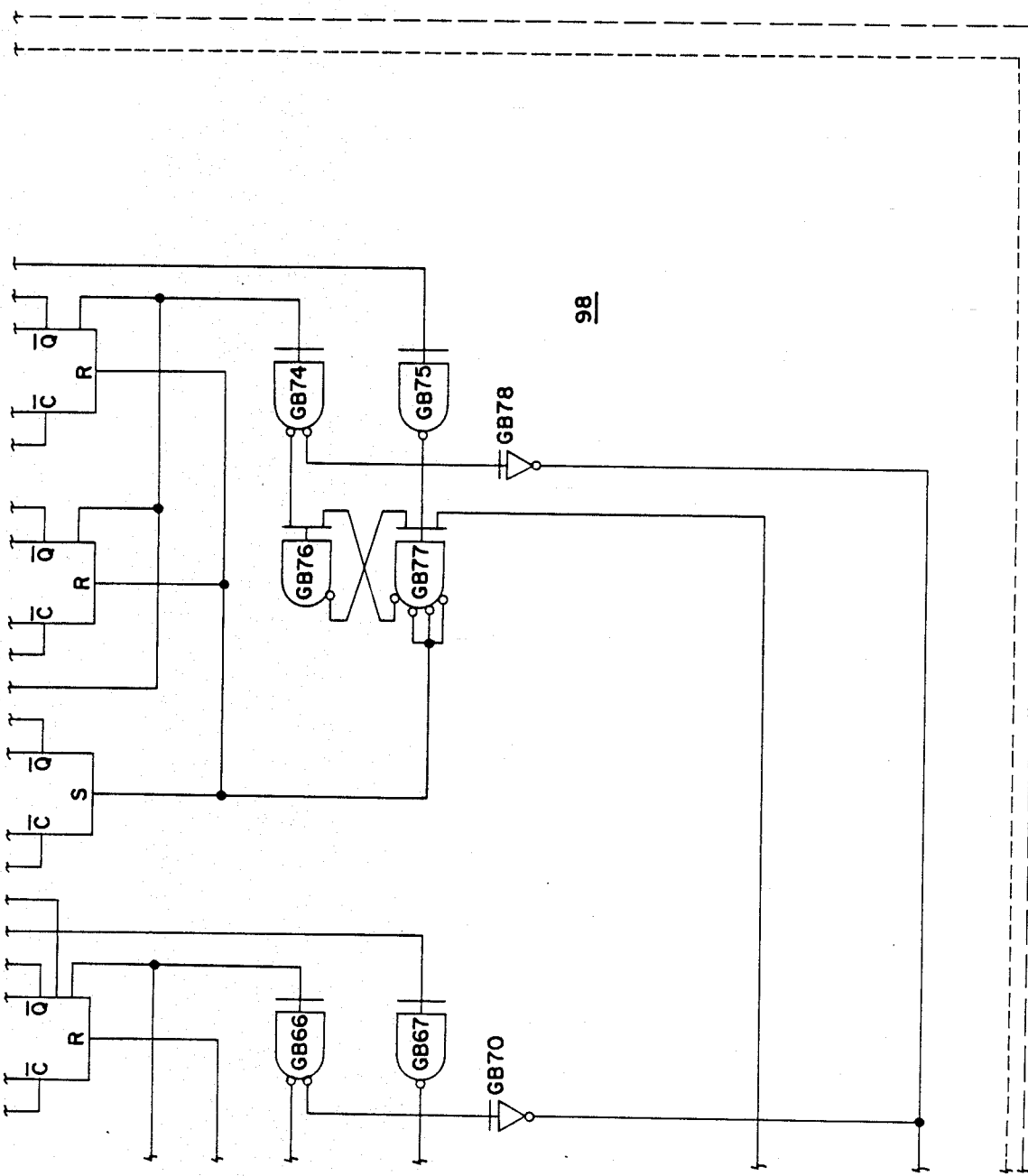
Figure 5A:
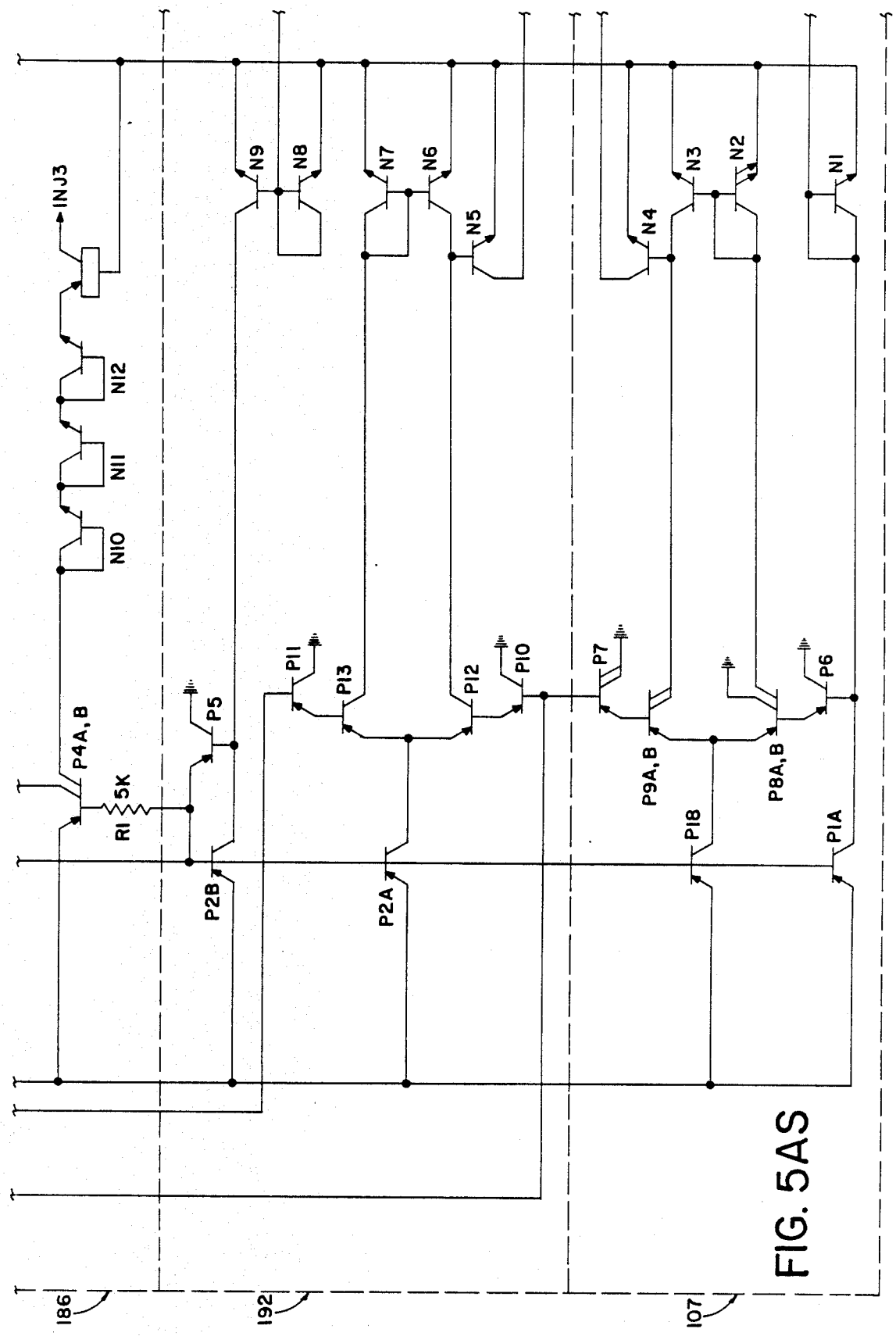
Figure 5A:
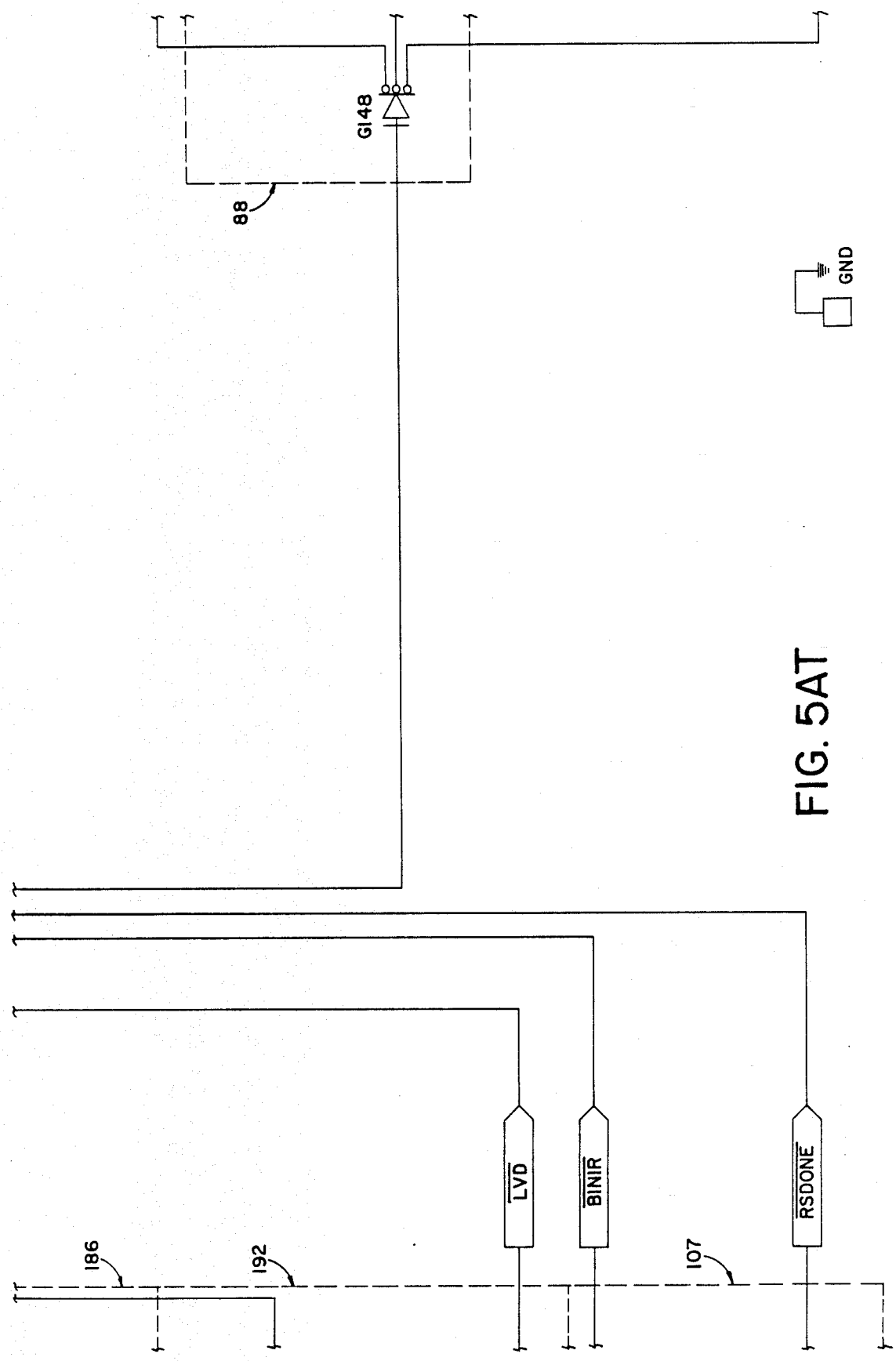
Figure 5A:
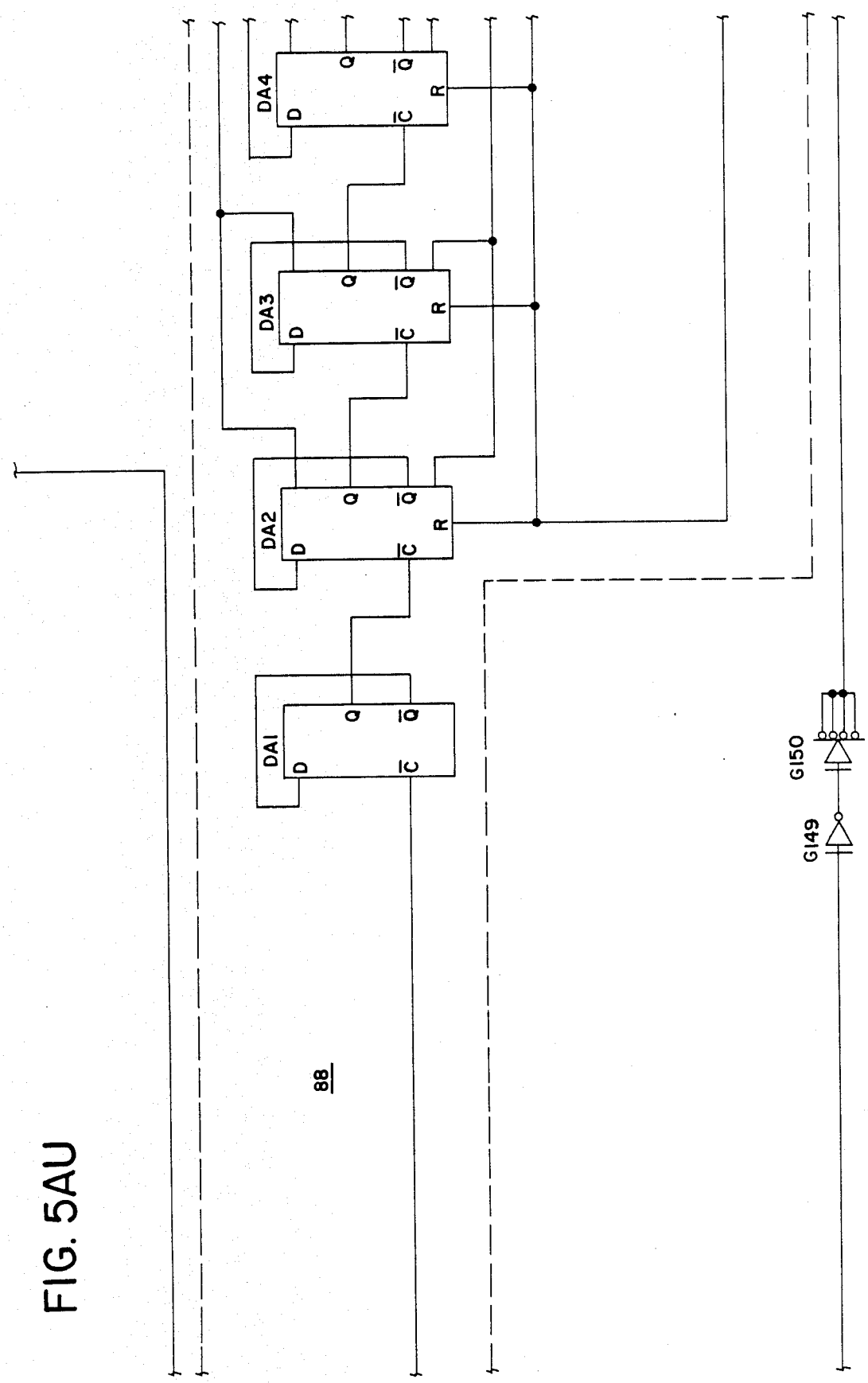
Figure 5A:
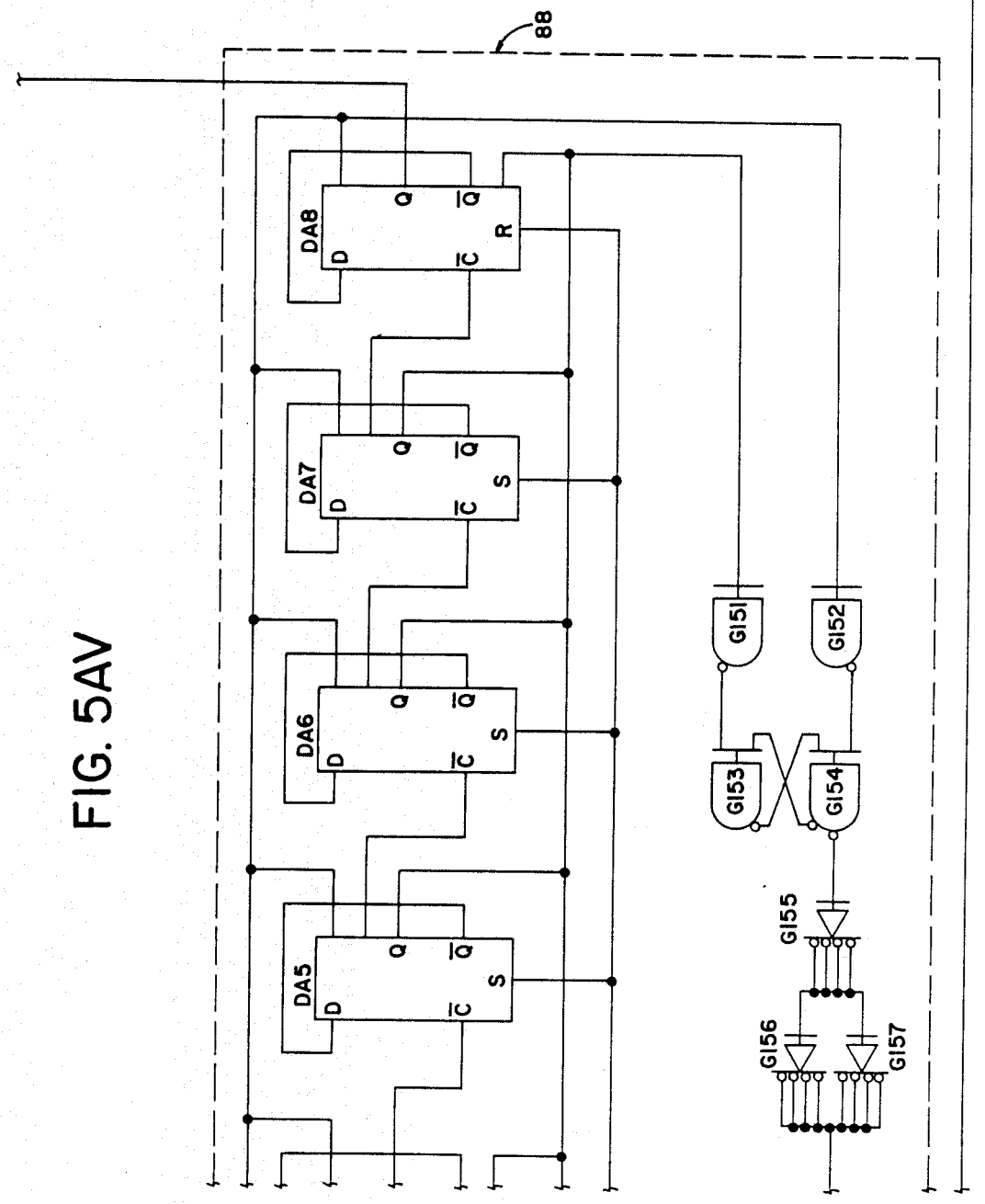
Figure 5A:
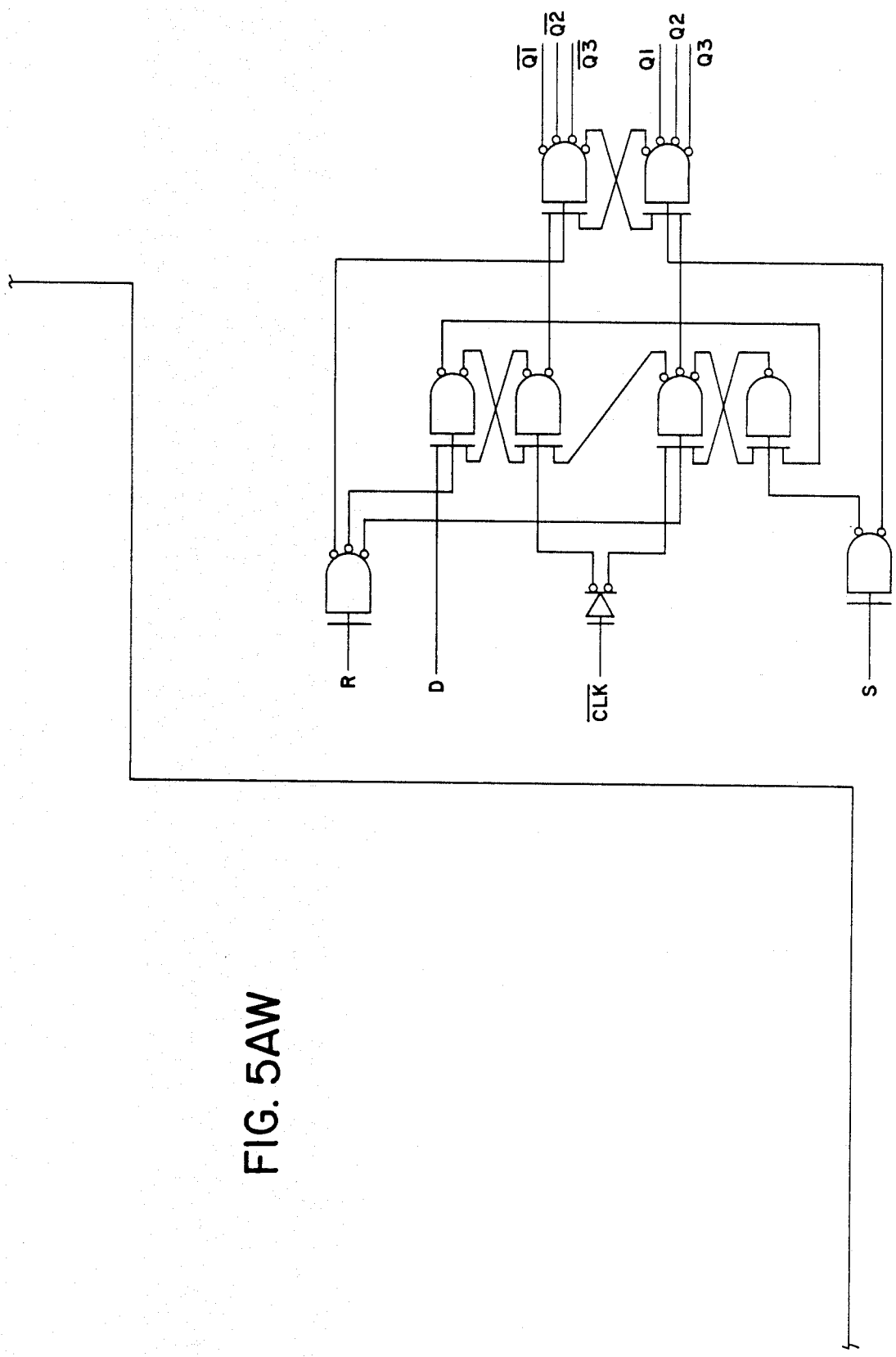

FIGS. 4A and 5AE, 5AF, 5AL, 5AM, 5AS and 5AT illustrate the bias circuitry module 186. This module generates the current sources necessary for driving the logic circuitry within supervisory IC 32.

Communication Input/Output Port and CODEC 162 (FIGS. 4B-4C)

Figure 6:
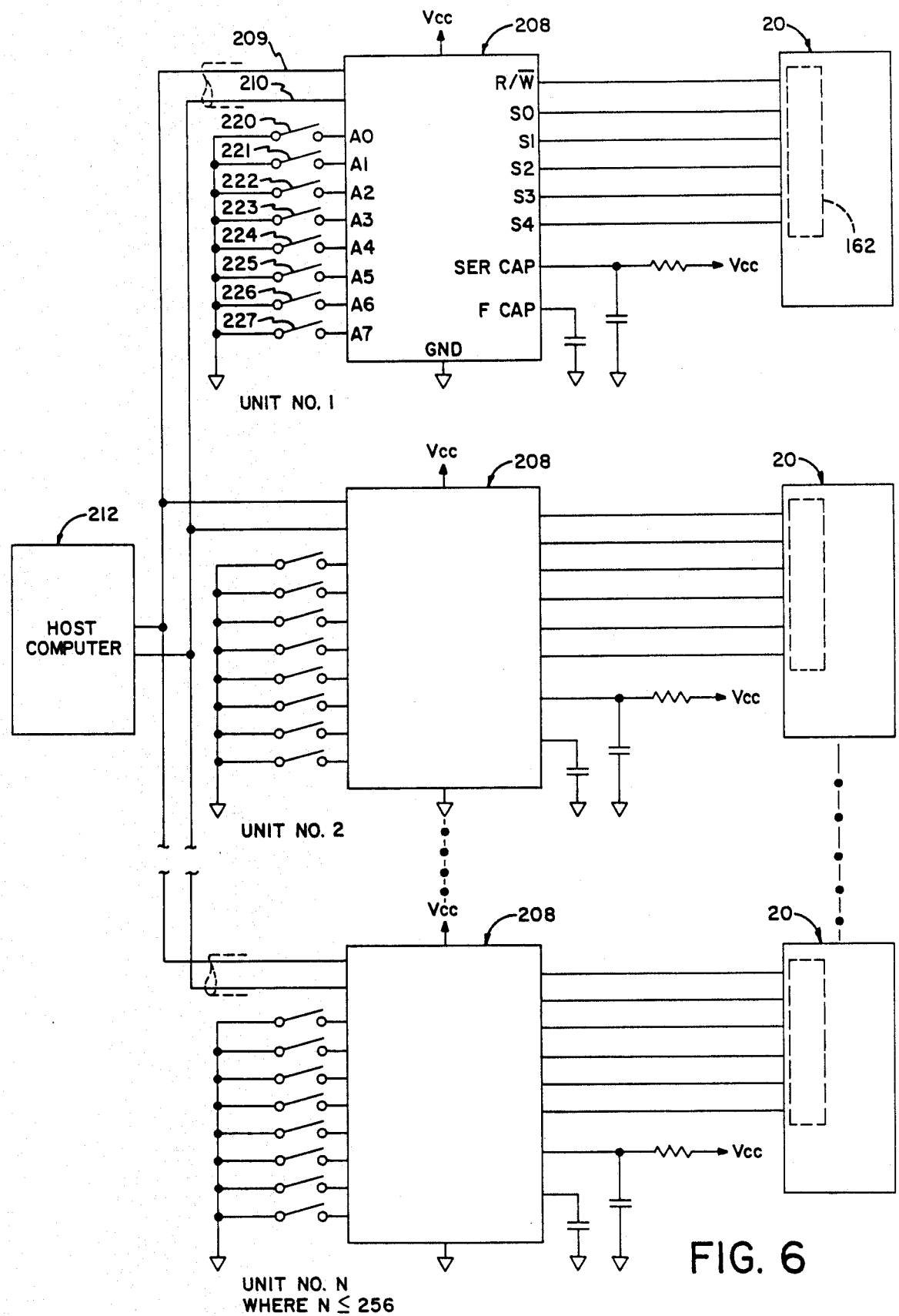
FIG. 6 is a diagrammatic representation of a plurality of emergency lighting supervisory circuits interconnected by communication circuit modules to a remote host computer or data acquisition device.

The communication input/output I/O port and CODEC module (code-decode) 162 shown in FIG. 4B monitors the six parallel input/output lines R/W, $S_0$, $S_1$, $S_2$ and $S_4$ from an associated communication circuit. As seen in FIG. 6, a communication circuit module 208 converts the parallel data on the $S_0$ through $S_4$ lines and the commands and responses on the R/W line into serial data on output bus comprising lines 209 and 210. As seen in FIG. 6, a plurality of emergency lighting supervisory systems 20 with their associated communication circuit module 208 can be attached to the serial bus and thereby can be accessed by a host computer system 212. The communication modules can be physically separated by hundreds of feet and thus the interconnected supervisory systems can monitor all the emergency lighting and exit signs in an office building or other commercial or industrial establishment.

The host computer system can ascertain the results of self-tests performed by the individual emergency lighting supervisory systems as well as initiate these self-tests through individually accessing the supervisory systems 20.

In operation, each of the six lines connected between the supervisory system 20 and the communication circuit 208 have three states; that is, they may be high, low or high impedance. When the R/W line is pulsed low by the communication circuit 208, the emergency lighting supervisory circuit, through the communication I/O port and code-decode module 162, is ready to receive data over the $S_0$ through $S_4$ lines. This data is decoded by module 162 into such messages as:

Start a 5-minute self-test.
Start a 30-minute self-test.
Report status.

If a start self-test message is sent, it is communicated to the self-test control module 102 via line 133. The duration of the test is controlled by the coded information received on lines 213 to the self-test duration module 204. When a self-test is started by the emergency lighting supervisory circuit, a "self-test started message" is transferred to the $S_0$–$S_4$ data lines which can then be interrogated by the host computer 212 (FIG. 5) by pulsing the R/W line.

Upon receipt of a "report status" message, the emergency supervisory lighting system transmits data on the $S_0$–$S_4$ lines concerning the status of the high/low indicator 178, the level comparator output 170, along with the output from the self-test failure latches (bad lamp output 136, bad printed circuit board output 132 and bad battery output 140). The actual encoded data on the $S_0$–$S_4$ lines as well as the command or response communicated on the R/W line is presented in Table 6 below:

TABLE 6

| Parallel Data Bit Codes | | | | | | |
|---|---|---|---|---|---|---|
| Bits | | | | | Command/ | |
| S0 | S1 | S2 | S3 | S4 | Respond | Meaning |
| Group I Messages | | | | | | |
| X | X | X | 0 | 1 | C | Start 30-minute self-test |
| X | X | X | 1 | 1 | C | Start 5-minute self-test |
| 0 | 0 | 1 | 0 | 0 | R | Self-test started |
| 0 | 0 | 0 | 0 | 0 | R | Self-test not started |
| Group II Messages | | | | | | |
| X | X | X | 1 | 0 | C | Report status |
| 1 | X | X | X | X | R | Hi/Lo battery |
| X | 1 | X | X | X | R | Charger in float mode |
| X | X | 1 | 1 | X | R | Bad battery |
| X | X | 1 | 0 | X | R | Bad PC board |
| X | X | 0 | 1 | X | R | Bad bulb |
| X | X | X | X | 1 | R | Low electrolyte |

TABLE 6-continued

| | Bits | | | | Parallel Data Bit Codes Command/ | |
|---|---|---|---|---|---|---|
| S0 | S1 | S2 | S3 | S4 | Respond | Meaning |
| 0 | 1 | 0 | 0 | 0 | R | Unit ready |

X = don't care condition

Communication Operation

As best seen in FIGS. 3A and 3B in conjunction with FIG. 6, communication between the emergency lighting supervisory circuit 20 and the communication circuit 208 is performed in a prescribed manner. In particular, FIG. 3A shows that for serial communication by the communication module 208 onto serial lines 209 and 210, 18 bits of binary information (18 baud) must be transmitted for either receiving a message from a particular communication module by the host computer or for sending a message from the host computer to a selected communication module. This serial information specifically includes 2 start bits for identifying the beginning of a message, followed by 14 bits comprising the message, and 2 stop bits indicating the end of the message.

The 14 message bits are further broken down into 8 bits which are directed to addressing one of the possible 256 communication circuit modules 208 that can be attached to the serial bus (lines 209 and 210), 5 bits for determining the status of the $S_0$ through $S_4$ lines and 1 bit for parity. The 8 bits of address can either be a 1 or 0 and therefore $2^8$ (that is, 2 raised to the 8th power) is equal to 256. This accounts for the maximum number of communication chips which can be connected to one serial line and still be individually addressable.

The 5 data bits correspond to the on or off condition of each of the $S_0$ through $S_4$ lines while the parity bit is a bit which is either on or off depending upon the state of the 8 address bits and 5 $S_0$–$S_4$ data bits. Parity is used to help insure that the data transmitted is accurately received.

The actual communication between the communication circuit module 208 and the communication I/O port and CODEC module 162 of the emergency lighting supervisory system 20 is best understood with reference to FIG. 3B taken in conjunction with FIG. 6. In FIG. 6, the actual transfer of information can be to or from the supervisory system I/O module 162 depending upon whether a read or write command is in effect; that is, whether the particular communication circuit module 208 is to read information from the emergency lighting supervisory system 20 or is to write information to the emergency lighting supervisory circuit. The $S_0$ through $S_4$ and R/W lines actually can transfer information in either direction.

FIG. 3B shows that for each baud time there is both a write interval where data transfer is from the communication circuit module 208 to the supervisory I/O module 162, and a read interval whwere the data transfer is from the supervisory I/O module 162 to the communication circuit module 208. Consequently, these data transfers occur during a much shorter period of time than that which accounts for one baud. Specifically, it is seen that if the R/W line has a negative going pulse 216, the data lines $S_0$–$S_4$ will transmit data from the communication circuit to the supervisory circuit during the period of time ($t_a$) that this write pulse is in effect, which as seen in FIG. 3B is for a period of 1/32nd of one baud time.

For the transfer of data from the communication I/O module 162 to the communication circuit 208, the positive going read pulse on the R/W line 218 also occurs for 1/32nd of one baud time with the data to be transmitted occurring during that period of time (time period $t_b$). It should be noted that during such transfer of information by the $S_0$–$S_4$ lines, any particular line may have a high or low state representing a "1" or a "0" depending upon the message being transmitted as fully shown in Table 6. Thus, the total data transfer interval between the communication circuit and the communication I/O module 162 equals one baud time although communication between the two circuits only occurs if the particular communication circuit has been selected for either receipt or transfer of information by the host computer. In actuality, each communication module receives the address information (the first 8 bits of the message proper) but ony accepts the data bits if the address information coincides with its address.

As seen in FIG. 6, the determination of whether a particular communication circuit is to receive or transmit information is based upon its address. Its address is determined by the position of switches 220, 221, 222, 223, 224, 225, 226 and 227 which correspond to the $A_0$ through $A_7$ address lines of the communication circuit. Provided that each communication circuit has a unique arrangement for these switches, each communication circuit can be individually selected by the host computer. Therefore, each supervisory system can be individually selected.

It is therefore possible with the communication circuitry used with the present invention that emergency lighting units and exit signs throughout an entire building may be selectively interrogated and tested by a remote host computer, thereby greatly alleviating the maintenance required for such lighting units and exit sign units while insuring that they remain in an operational state.

It is therefore seen that the emergency lighting supervisory circuit according to the present invention achieves a new level of sophistication in the emergency lighting art by performing automatic self-testing under full-load conditions of critical system parameters as well as continuous monitoring of other parameters that are indicative of the overall status of the emergency lighting supervisory system. In addition to performing automatic self-test and continual monitoring of critical system parameters, the present invention is also able, under command from an external host, to initiate tests and to report status from those tests as well as from its continuously monitored parameters. The emergency lighting supervisory system further annunciates such information on a display panel so as to provide a visual and audible indication of its status, the audible indication occurring when an alarm condition exists.

The emergency lighting supervisory circuit also includes automatic battery disconnect when a low-voltage battery condition is sensed. In addition, through periodic self-testing, battery capacity is maintained at optimal levels.

It is therefore seen that the objects set forth above, and those made apparent from the preceding description, are efficiently attained, and since certain changes may be made in the above system without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention described, and all statements of the scope of the invention which, as a matter of language, might be said to fall therebetween.

Having described the invention, what is claimed is:

1. An emergency lighting supervisory system for entering emergency mode operation that causes at least one emergency lamp to be energized from emergency battery power upon sensing an emergency condition such as utility power failure comprising:
   A. a battery for providing emergency power:
   B. a battery charger for maintaining the battery in a fully charged state; the battery charger comprising means for providing a constant current charging of the battery upon system installation or after the battery has provided emergency power, thereafter providing an equalization voltage to the battery having a value greater than the nominal charging voltage presented to the battery, wherein this equalization voltage is provided for a set period of time, and thereafter providing a float voltage having a value equal to the nominal charging voltage to the battery, such charging continuing until a transfer to emergency battery power is needed;
   C. at least one lamp to be illuminated by the battery when emergency power is provided;
   D. means, interconnected to the utility power, the battery and the lamp, for sensing the utility power voltage and for initiating the transfer from utility power to battery emergency power when utility power is not present, when the utility power voltage falls below a threshold value, or when self-testing of the emergency lighting system is performed;
   E. means for performing periodic self-testing of emergency lighting supervisory system parameters, said means including
      1. timer generating means including means for generating outputs which occur on a multi-day basis,
      2. self-test control means responsive to said timing output for initiating a self-test for a period of time, said means including means for activating the transfer means so as to place the system in a simulated emergency operating mode, and
      3. means for monitoring and displaying the status of system parameters when the self-test condition is activated, including means for determining current flow through the lamp so as to ascertain if the lamp is operating properly, said current flow means including means for visually annunciating the determination of an improperly operating lamp, means for determining if a battery induced voltage is applied to the lamp so as to determine if transfer of battery power has occurred, said applied voltage determining means including means for visually annunciating the determination of improper transfer of battery power to the lamp, and means for determining if the battery voltage is below a predetermined level indicative of a faulty battery condition, said battery voltage determining means including means for visually annunciating the determination of a faulty battery condition; and
   F. communication means for transfer of the status of the system parameters from the self-test procedure to an interconnected device as well as to provide for initiation of a self-test procedure upon receipt of a request from an interconnected device.

2. An emergency lighting supervisory system as defined in claim 1 wherein the communication means comprises input/output means for receipt and transfer of information between the emergency lighting supervisory system and an external communicating device, as well as code/decode circuitry for translating received information into appropriate inputs to the system as well as sensed system parameters coding for transfer to the external communicating device.

3. An emergency lighting supervisory system as defined in claim 2 wherein the communicating means incorporates a read/write line for controlling receipt and transmission of information to the external communicating device as well as five data lines representative of the on or off state of information to be received or transmitted by the communicating means.

4. An emergency lighting supervisory system as defined in claim 1 wherein the means for monitoring and displaying the status of the system comprises a status indicator for annunciating the battery charging status, including whether the charger is in the constant current, equalization, or float voltage modes, and also whether any sensed system parameter has failed during a self-test procedure.

5. An emergency lighting supervisory system as defined in claim 4 wherein the means for monitoring and displaying the status of the system comprises means for annunciating a bad lamp, a bad printed circuit board, or a bad battery condition sensed during the self-test procedure and wherein said means includes means for signalling the status indicator of this condition.

6. An emergency lighting supervisory system as defined in claim 1 further comprising means for adjusting the float and equalization charging voltages inversely proportional to the ambient temperature of the system so as to minimize the probability of overcharging or undercharging the battery.

7. An emergency lighting supervisory system as defined in claim 1 wherein the communication means includes means for decoding a received message indicative of the length of time that the self-test procedure is to occur, and wherein the self-test control means is responsive to such a decoded message so as to set the period of time of the self-test to the decoded message value.

8. An emergency lighting supervisory system as defined in claim 1 wherein the timer generating means of the periodic self-testing means generates an output on an approximately one-month and six-month basis, wherein the one-month output causes the self-test control means to initiate a self-test for a period of approximately five minutes and wherein the six-month output causes the self-test control means to initiate a self-test for a period of 30, 60, 90 or 120 minutes.

9. An emergency lighting supervisory system as defined in claim 8, further comprising circuit connectable resistors for selecting a 30-, 60-, 90- or 120-minute self-test duration.

10. An emergency lighting supervisory system as defined in claim 1 wherein the means for performing periodic self-testing of emergency lighting supervisory system parameters further includes an externally activated switch for initiating the self-test control means for a predetermined length of time.

11. An emergency lighting supervisory system as defined in claim 10 wherein the predetermined length of time for the externally activated self-test is approximately five minutes.

12. An emergency lighting supervisory system as defined in claim 1 wherein the means for monitoring system parameters when the self-test condition is activated includes means for maintaining the status of the tested parameters even if there is a subsequent loss of utility power.

13. An emergency lighting supervisory system as defined in claim 12 further comprising battery reset means for resetting said maintaining means when a system is initially installed or a new battery is installed.

14. An emergency lighting supervisory system as defined in claim 12 wherein the maintaining means includes electronic latches.

15. An emergency lighting supervisory system as defined in claim 1 further including means for disconnecting the battery from the lamp normally illuminated by the battery during loss of utility power if the battery voltage falls below a predetermined level, whereby over-discharge of the battery is prevented.

16. An emergency lighting supervisory system as defined in claim 15 further comprising means for inhibiting the operation of the battery charger if the sensed battery voltage is above or below predetermined values.

17. An emergency lighting supervisory system as defined in claim 16 further comprising means for annunciating the condition of the battery voltage being above or below the predetermined values of the inhibiting means.

18. An emergency lighting supervisory system as defined in claim 17 further comprising initial battery reset means for sensing the resetting of the battery such as occurs when an emergency lighting system is installed, wherein the battery reset means prevents activation of the battery inhibitor for a set predetermined length of time or until equalization charging of the battery occurs if such equalization charging occurs before expiration of said set predetermined length of time.

19. An emergency lighting supervisory system as defined in claim 16 further comprising means for adjusting the predetermined values against which the sensed battery voltage is compared, wherein said adjusting is inversely proportional to the ambient temperature of the system.

20. An emergency lighting supervisory system as defined in claim 1 further comprising means for inhibiting the operation of the battery charger if the sensed battery voltage is above or below predetermined values.

21. An emergency lighting supervisory system as defined in claim 1 further including means for sensing the level of electrolyte in the battery and for annunciating a low electrolyte level if the sensed level is below a predetermined amount.

22. An emergency lighting supervisory system as defined in claim 21 further comprising means for inhibiting the battery charger if a low electrolyte level is sensed.

23. An emergency lighting supervisory system as defined in claim 1 further including an alarm driver for activating an external alarm wherein the alarm driver is activated whenever a sensed parameter is outside of a normal operating value.

24. An emergency lighting supervisory system as defined in claim 23 further including a manually operable switch for disabling the alarm driver if desired.

25. An emergency lighting supervisory system as defined in claim 1 wherein a supervisory circuit integrated circuit incorporates the means for performing periodic self-testing of the emergency lighting supervisory system parameters as well as at least a portion of the means for monitoring system parameters when the self-test condition is activated.

26. An emergency lighting supervisory system as defined in claim 1 further comprising a unit ready indicator which generates an output indicative of proper operation of the unit when the battery charger is in a float voltage mode and no sensed parameter is outside of its acceptable value.

27. An emergency lighting supervisory system for entering emergency mode operation that causes at least one emergency lamp to be energized from emergency battery power upon sensing an emergency condition such as utility power failure comprising:
   A. a battery for providing emergency power;
   B. a battery charger for maintaining the battery in a fully charged state; wherein the battery charger comprises means for providing a constant current charging of the battery upon system installation or after the battery has provided emergency power, thereafter providing an equalization voltage to the battery having a value greater than the nominal charging voltage presented to the battery, wherein this equalization voltage is provided for a set period of time, and thereafter providing a float voltage having a value equal to the nominal charging voltage to the battery, such charging continuing until a transfer to emergency battery power is needed;
   C. at least one lamp to be illuminated by the battery when emergency power is provided;
   D. means, interconnected to the utility power, the battery and the lamp, for sensing the utility power voltage and for initiating the transfer from utility power to battery emergency power when utility power is not present or when self-testing of the emergency lighting system is performed; and
   E. means for performing periodic self-testing of emergency lighting supervisory system parameters, said means including
      1. timer generating means including means for generating outputs which occur on a multi-day basis,
      2. self-test control means responsive to said timing outputs for initiating a self-test for a period of time, said means including means for activating the transfer means so as to place the system in a simulated emergency operating mode, and
      3. means for monitoring the status of system parameters when the self-test condition is activated wherein said means include means for determining if the battery voltage is below a predetermined level indicative of a faulty battery condition, means for determining current flow through the lamp so as to ascertain if the lamp is operating properly and means for determining if a battery induced voltage is applied to the lamp so as to determine if transfer of battery power has occurred.

28. An emergency lighting supervisory system as defined in claim 27 further comprising communication means for transfer of the status from the self-test procedure to an interconnected device as well as to provide for initiation of a self-test procedure upon receipt of a request from an interconnected device.

29. An emergency lighting supervisory system as defined in claim 27 wherein a supervisory circuit integrated circuit incorporates the means for performing periodic self-testing of the emergency lighting supervisory system parameters as well as at least a portion of the means for monitoring system parameters when the self-test condition is activated.

30. An emergency lighting supervisory system as defined in claim 27 further including an alarm driver for activating an external alarm wherein the alarm driver is activated whenever a sensed parameter is outside of a normal operating value.

31. An emergency lighting supervisory system as defined in claim 30 further including a manually operable switch for disabling the alarm driver if desired.

32. An emergency lighting supervisory system as defined in claim 2 further including means for sensing the level of electrolyte in the battery and for annunciating a low electrolyte level if the sensed level is below a predetermined amount.

33. An emergency lighting supervisory system as defined in claim 32 further comprising means for inhibiting the battery charger if a low electrolyte level is sensed.

34. An emergency lighting supervisory system as defined in claim 27 wherein the timer generating means of the periodic self-testing means generates an output on an approximately one-month and six-month basis, wherein the one-month output causes the self-test control means to initiate a self-test for a period of approximately five minutes and wherein the six-month output causes the self-test control means to initiate a self-test for a period of 30, 60, 90 or 120 minutes.

35. An emergency lighting supervisory system as defined in claim 34 further comprising circuit selectable resistors for selecting a 30-, 60-, 90- or 120-minute self-test duration.

36. An emergency lighting supervisory system as defined in claim 27 wherein the means for performing periodic self-testing of emergency lighting supervisory system parameters further includes an externally activated switch for initiating the self-test control means for a predetermined length of time.

37. An emergency lighting supervisory system as defined in claim 36 wherein the predetermined length of time is approximately five minutes.

38. An emergency lighting supervisory system as defined in claim 27 further including means for disconnecting the battery from the lamp normally illuminated by the battery during loss of utility power if the battery voltage falls below a predetermined level, whereby over-discharge of the battery is prevented.

39. An emergency lighting supervisory system as defined in claim 38 further comprising means for inhibiting the operation of the battery charger if the sensed battery voltage is above or below predetermined values.

40. An emergency lighting supervisory system as defined in claim 39 further comprising means for annunciating the condition of the battery voltage being above or below the predetermined values of the inhibiting means.

41. An emergency lighting supervisory system as defined in claim 40 further comprising initial battery reset means for sensing the resetting of the battery such as occurs when an emergency lighting system is installed, wherein the battery reset means prevents activation of the battery inhibitor for a set predetermined length of time or until equalization charging of the battery occurs if such equalization charging occurs before expiration of said set predetermined length of time.

42. An emergency lighting supervisory system as defined in claim 39 further comprising means for adjusting the predetermined values against which the sensed battery voltage is compared, wherein said adjusting is inversely proportional to the ambient temperature of the system.

43. An emergency lighting supervisory system as defined in claim 27 further comprising means for inhibiting the operation of the battery charger if the sensed battery voltage is above or below predetermined values.

44. An emergency lighting supervisory system for entering emergency mode operation that causes at least one emergency lamp to be energized from emergency battery power upon sensing an emergency condition such as utility power failure comprising:
A. a battery for providing emergency power;
B. a battery charger for maintaining the battery in a fully charged state; wherein the battery charger comprises means for providing a constant current charging of the battery upon system installation or after the battery has provided emergency power, thereafter providing an equalization voltage to the battery having a value greater than the nominal charging voltage presented to the battery, wherein this equalization voltage is provided for a set period of time, and thereafter providing a float voltage having a value equal to the nominal charging voltage to the battery, such charging continuing until a transfer to emergency battery power is needed;
C. at least one lamp to be illuminated by the battery when emergency power is provided;
D. means, interconnected to the utility power, the battery and the lamp, for sensing the utility power voltage and for initiating the transfer from utility power to battery emergency power when utility power is not present or when self-testing of the emergency lighting system is performed;
E. means for performing periodic self-testing of emergency lighting supervisory system parameters, said means including
  1. timer generating means including means for generating outputs which occur on a multi-day basis,
  2. self-test control means responsive to said timing outputs for initiating a self-test for a period of time, said means including means for activating the transfer means so as to place the system in a simulated emergency operating mode, and
  3. means for monitoring the status of system parameters when the self-test condition is activated wherein said means include means for determining if the battery voltage is below a predetermined level determining current flow through the lamp so as to ascertain if the lamp is operating properly and means for determining if a battery induced voltage is applied to the lamp so as to determine if transfer of battery power has occurred; and
F. communication means for transfer of the status of the system parameters from the self-test procedure to an interconnected device as well as to provide for initiation of a self-test procedure upon receipt of a request from an interconnected device.

45. An emergency lighting supervisory system as defined in claim 44 wherein the means for monitoring system parameters when the self-test condition is activated includes means for maintaining the status of the tested parameters even if there is a subsequent loss of utility power.

46. An emergency lighting supervisory system as defined in claim 45 further comprising battery reset means for resetting said maintaining means when a system is initially installed or a new battery is installed.

47. An emergency lighting supervisory system as defined in claim 46 wherein the maintaining means includes electronic latches.

48. An emergency lighting supervisory system as defined in claim 44 further including means for disconnecting the battery from the lamp normally illuminated by the battery during loss of utility power if the battery voltage falls below a predetermined level, whereby over-discharge of the battery is prevented.

49. An emergency lighting supervisory system as defined in claim 48 further comprising means for inhibiting the operation of the battery charger if the sensed battery voltage is above or below predetermined values.

50. An emergency lighting supervisory system as defined in claim 49 further comprising means for annunciating the condition of the battery voltage being above or below the predetermined values of the inhibiting means.

51. An emergency lighting supervisory system as defined in claim 50 further comprising initial battery reset means for sensing the resetting of the battery such as occurs when an emergency lighting system is installed, wherein the battery reset means prevents activation of the battery inhibitor for a set predetermined length of time or until equalization charging of the battery occurs if such equalization charging occurs before expiration of said set predetermined length of time.

52. An emergency lighting supervisory system as defined in claim 44 further comprising means for inhibiting the operation of the battery charger if the sensed battery voltage is above or below predetermined values.

53. An emergency lighting supervisory system as defined in claim 52 further comprising means for adjusting the predetermined values against which the sensed battery voltage is compared, wherein said adjusting is inversely proportional to the ambient temperature of the system.

54. An emergency lighting supervisory system as defined in claim 44 further including means for sensing the level of electrolyte in the battery and for annunciating a low electrolyte level if the sensed level is below a predetermined amount.

55. An emergency lighting supervisory system as defined in claim 54 further comprising means for inhibiting the battery charger if a low electrolyte level is sensed.

56. An emergency lighting supervisory system as defined in claim 44 further including an alarm driver which is activated whenever a sensed parameter is outside of a normal operating value.

57. An emergency lighting supervisory system as defined in claim 56 further including a manually operable switch for disabling the alarm driver if desired.

58. An emergency lighting supervisory system as defined in claim 89 wherein the communication means comprises input/output means for receipt and transfer of information between the emergency lighting supervisory system and an external communicating device, as well as code/decode circuitry for translating received information into appropriate inputs to the system as well as sensed system parameters coding for transfer to the external communicating device.

59. An emergency lighting supervisory system as defined in claim 58 wherein the communicating means incorporates a read/write line for controlling receipt and transmission of information to the external communicating device as well as five data lines representative of the on or off state of information to be received or transmitted by the communicating means.

60. An emergency lighting supervisory system as defined in claim 44 further comprising a status indicator for annunciating the battery charging status, including whether the charger is in the constant current, equalization, or float voltage modes, and also whether any sensed system parameter has failed during a self-test procedure.

61. An emergency lighting supervisory system as defined in claim 60 further comprising a failure indicator which annunciates the bad lamp, bad printed circuit board, or bad battery condition sensed during the self-test procedure and wherein said indicator includes means for signalling the status indicator of this condition.

62. An emergency lighting supervisory system as defined in claim 61 wherein the communication means includes means for decoding a received message indicative of the length of time that the self-test procedure is to occur, and wherein the self-test control means is responsive to such a decoded message so as to set the period of time of the self-test to the decoded message value.

63. An emergency lighting supervisory system as defined in claim 62 wherein the timer generating means of the periodic self-testing means generates an output on an approximately one-month and six-month basis, wherein the one-month output causes the self-test control means to initiate a self-test for a period of approximately five minutes and wherein the six-month output causes the self-test control means to initiate a self-test for a period of 30, 60, 90 or 120 minutes.

64. An emergency lighting supervisory system as defined in claim 63, further comprising circuit connectable resistors for selecting a 30-, 60-, 90- or 120-minute self-test duration.

65. An emergency lighting supervisory system as defined in claim 64 wherein the means for performing periodic self-testing of emergency lighting supervisory system parameters further includes an externally activated switch for initiating the self-test control means for a predetermined length of time.

66. An emergency lighting supervisory system as defined in claim 65 wherein the predetermined length of time for the externally activated self-test is approximately five minutes.

67. An emergency lighting supervisory system as defined in claim 66 wherein the means for monitoring system parameters when the self-test condition is activated includes means for maintaining the status of the tested parameters even if there is a subsequent loss of utility power.

68. An emergency lighting supervisory system as defined in claim 67 further comprising battery reset means for resetting said maintaining means when a system is initially installed or a new battery is installed.

69. An emergency lighting supervisory system as defined in claim 68 wherein the maintaining means includes electronic latches.

70. An emergency lighting supervisory system as defined in claim 44 wherein a supervisory circuit integrated circuit incorporates the means for performing periodic self-testing of the emergency lighting supervisory system parameters as well as at least a portion of the means for monitoring system parameters when the self-test condition is activated.

* * * * *